US012169268B2

(12) United States Patent
Ohtake et al.

(10) Patent No.: US 12,169,268 B2
(45) Date of Patent: Dec. 17, 2024

(54) MAGNIFICATION-VARIABLE OPTICAL SYSTEM, OPTICAL APPARATUS, AND METHOD FOR MANUFACTURING MAGNIFICATION-VARIABLE OPTICAL SYSTEM

(71) Applicant: Nikon Corporation, Tokyo (JP)

(72) Inventors: Fumiaki Ohtake, Tokyo (JP); Azuna Nonaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 256 days.

(21) Appl. No.: 17/432,368

(22) PCT Filed: Dec. 20, 2019

(86) PCT No.: PCT/JP2019/050007
§ 371 (c)(1),
(2) Date: Aug. 19, 2021

(87) PCT Pub. No.: WO2020/170591
PCT Pub. Date: Aug. 27, 2020

(65) Prior Publication Data
US 2022/0137378 A1 May 5, 2022

(30) Foreign Application Priority Data
Feb. 22, 2019 (JP) .................................. 2019-030151

(51) Int. Cl.
*G02B 15/14* (2006.01)
*G02B 3/04* (2006.01)
(52) U.S. Cl.
CPC ........... *G02B 15/1465* (2019.08); *G02B 3/04* (2013.01)

(58) Field of Classification Search
CPC .................. G02B 15/1465; G02B 3/04; G02B 15/143507; G02B 15/144507; G02B 15/145515; G02B 15/145523
See application file for complete search history.

(56) References Cited

U.S. PATENT DOCUMENTS 5,724,193 A  3/1998  Hirakawa
9,715,092 B2 *  7/2017  Inomoto ............... H04N 23/698
(Continued)

FOREIGN PATENT DOCUMENTS

JP  H08-171053 A  7/1996
JP  2004-145304 A  5/2004
(Continued)

OTHER PUBLICATIONS

Machine translation of WO2018235881A1 (Year: 2018).*
(Continued)

*Primary Examiner* — Alicia M Harrington
(74) *Attorney, Agent, or Firm* — Potomac Law Group, PLLC

(57) ABSTRACT

A magnification-variable optical system having a small size, a wide angle of view, and high optical performance, an optical apparatus including the magnification-variable optical system, and a method for manufacturing the magnification-variable optical system are provided, the magnification-variable optical system ZL being used for an optical apparatus and includes a first lens group G1 having a negative refractive power, and a rear group GR including at least one lens group disposed on an image side of the first lens group G1, and is configured so that a distance between lens groups adjacent to each other changes at magnification change and a condition expressed by predetermined condition expressions is satisfied.

20 Claims, 22 Drawing Sheets

(56) References Cited

U.S. PATENT DOCUMENTS

| | | |
|---|---|---|
| 2004/0070844 A1 | 4/2004 | Sato |
| 2005/0157403 A1 | 7/2005 | Sato |
| 2007/0177277 A1 | 8/2007 | Sugita |
| 2008/0239507 A1 | 10/2008 | Sugita |
| 2009/0195884 A1 | 8/2009 | Inoko |
| 2009/0219626 A1 | 9/2009 | Tomioka |
| 2011/0002044 A1 | 1/2011 | Inoko |
| 2012/0069441 A1* | 3/2012 | Fujimoto ....... G02B 15/144511 359/557 |
| 2014/0055659 A1 | 2/2014 | Iwamoto |
| 2014/0098253 A1 | 4/2014 | Maetaki |
| 2014/0307152 A1 | 10/2014 | Iwamoto |
| 2018/0095254 A1 | 4/2018 | Iwamoto et al. |
| 2019/0302409 A1 | 10/2019 | Shomura |
| 2020/0264413 A1 | 8/2020 | Yamanaka |
| 2021/0149168 A1 | 5/2021 | Uehara |

FOREIGN PATENT DOCUMENTS

| | | |
|---|---|---|
| JP | 2005-316183 A | 11/2005 |
| JP | 2007-206420 A | 8/2007 |
| JP | 2008-242402 A | 10/2008 |
| JP | 2009-186569 A | 8/2009 |
| JP | 2009-230122 A | 10/2009 |
| JP | 2014-041245 A | 3/2014 |
| JP | 2014-077867 A | 5/2014 |
| JP | 2014-206674 A | 10/2014 |
| JP | 2017-129825 A | 7/2017 |
| JP | 2018-013685 A | 1/2018 |
| JP | 2018-054988 A | 4/2018 |
| JP | 2019-008031 A | 1/2019 |
| JP | 2019-174714 A | 10/2019 |
| JP | 2020-101750 A | 7/2020 |
| JP | 2020-134684 A | 8/2020 |
| WO | WO-2018235881 A1 * | 12/2018 ............. G02B 13/18 |

OTHER PUBLICATIONS

International Search Report from International Patent Application No. PCT/JP2019/050007, Feb. 4, 2020.
Office Action issued Aug. 23, 2022, in Japanese Patent Application No. 2019-030151.
Office Action issued Nov. 18, 2022, in Chinese Patent Application No. 201980089076.7.
Office Action issued Nov. 2, 2022, in Japanese Patent Application No. 2019-030151.
Decision of Dismissal of Amendment issued Jan. 24, 2023, in Japanese Application No. 2019-030151.
Decision of Refusal issued Jan. 24, 2023, in Japanese Application No. 2019-030151.
International Preliminary Report on Patentability from International Patent Application No. PCT/JP2019/050007, Aug. 10, 2021.
Office Action issued Aug. 26, 2022, in Chinese Patent Application No. 201980089076.7.
Office Action issued Jan. 29, 2022, in Chinese Patent Application No. 201980089076.7.
Office Action issued Feb. 15, 2023, in Chinese Patent Application No. 201980089076.7.
Office Action issued Nov. 30, 2023, in Japanese Patent Application No. 2023-060226.

* cited by examiner

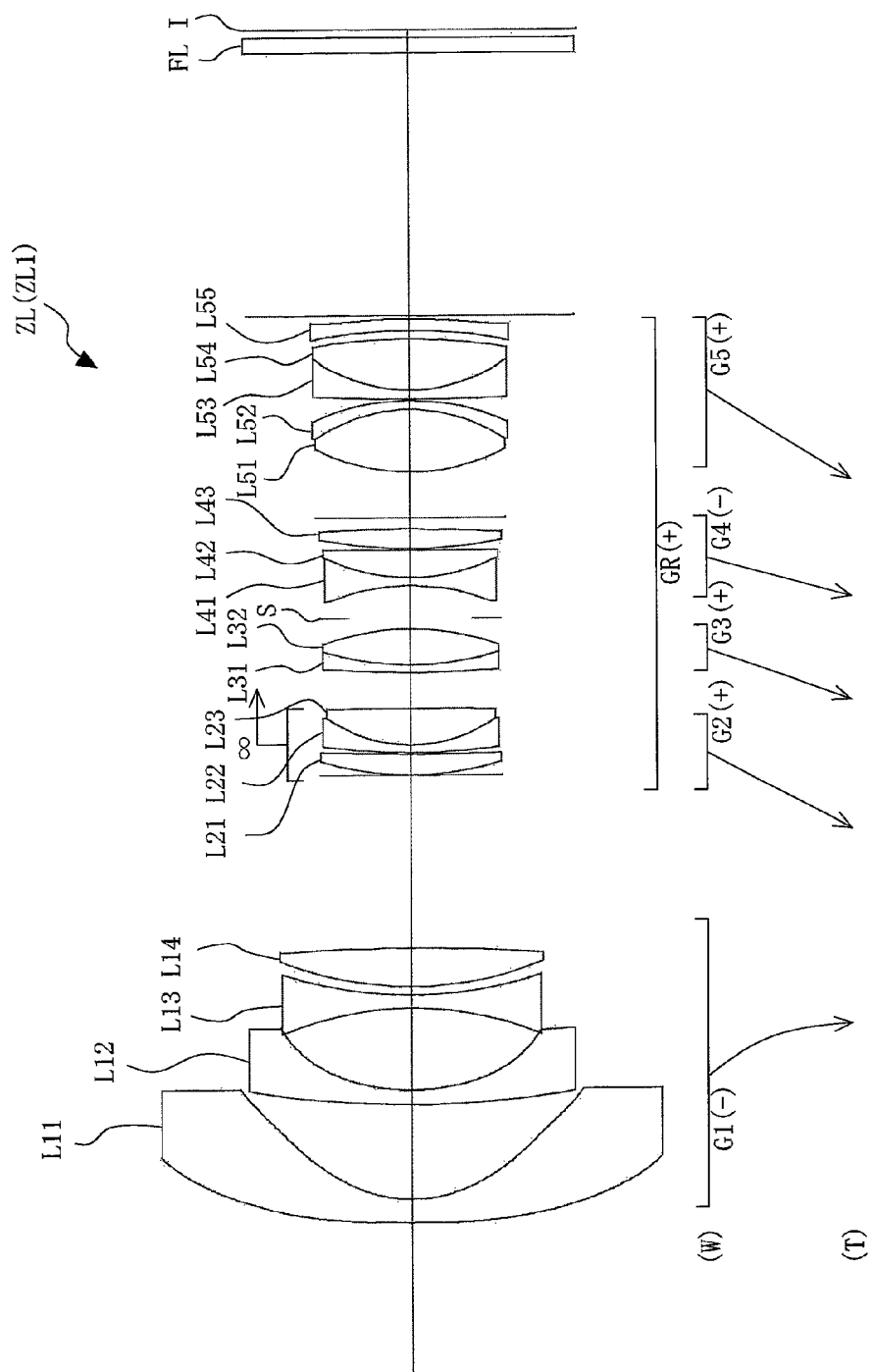

[Fig.2]
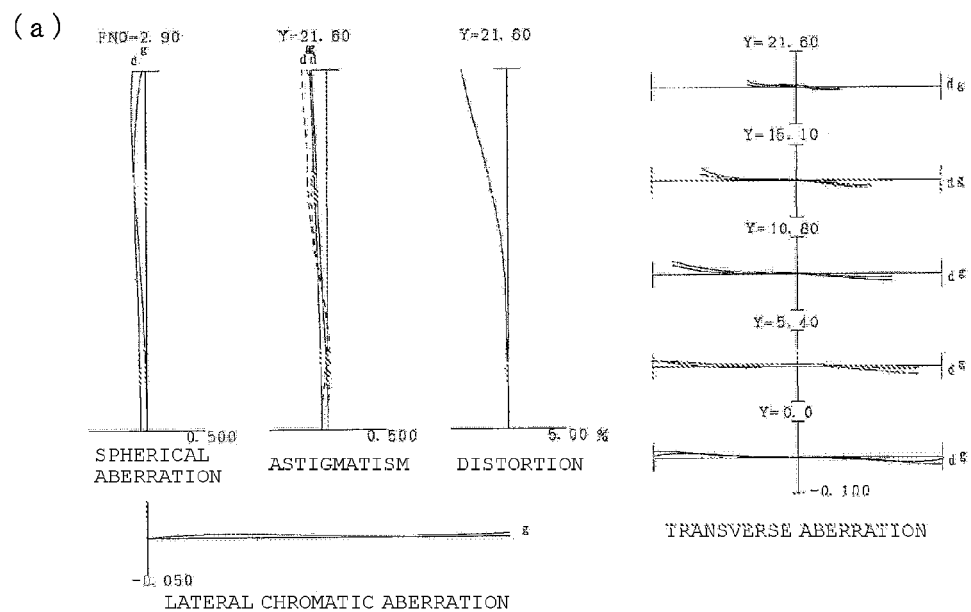
(a)
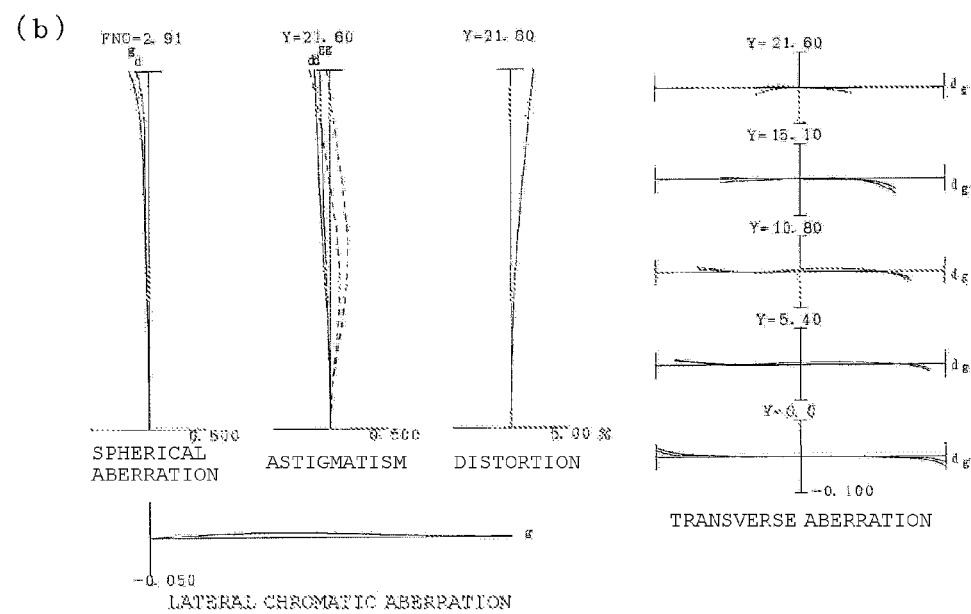
(b)

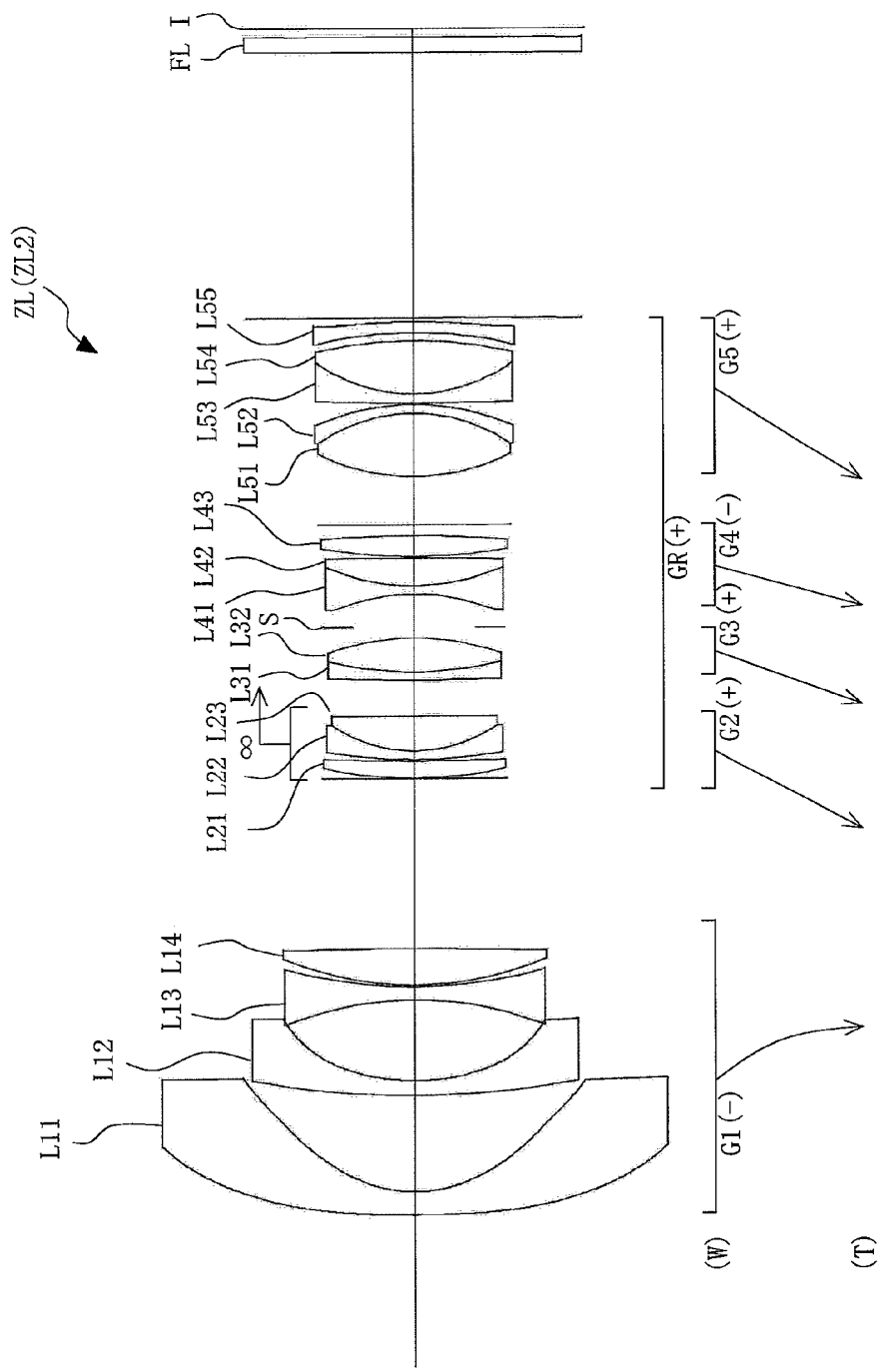
[Fig. 3]

[Fig.4]
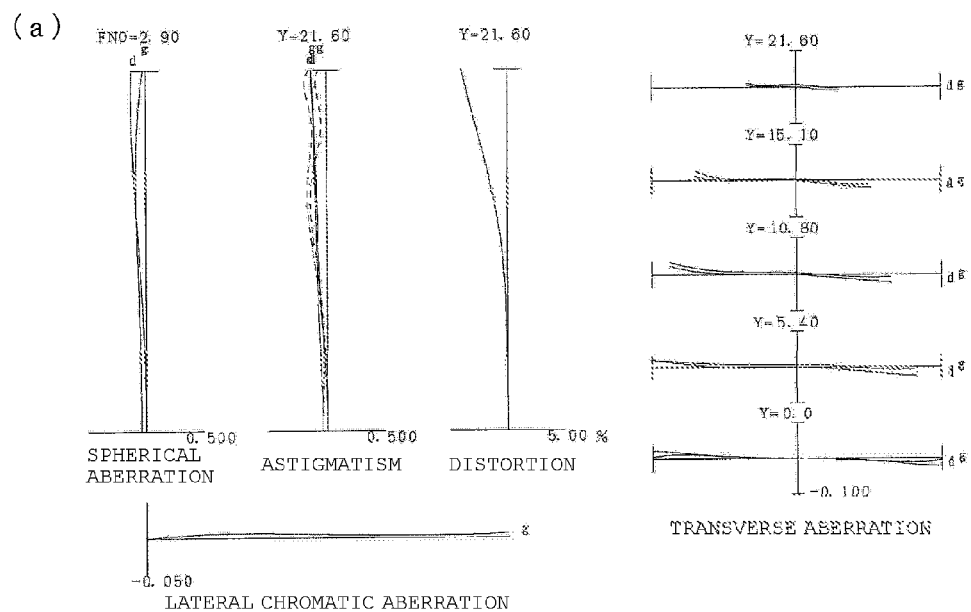
(a)
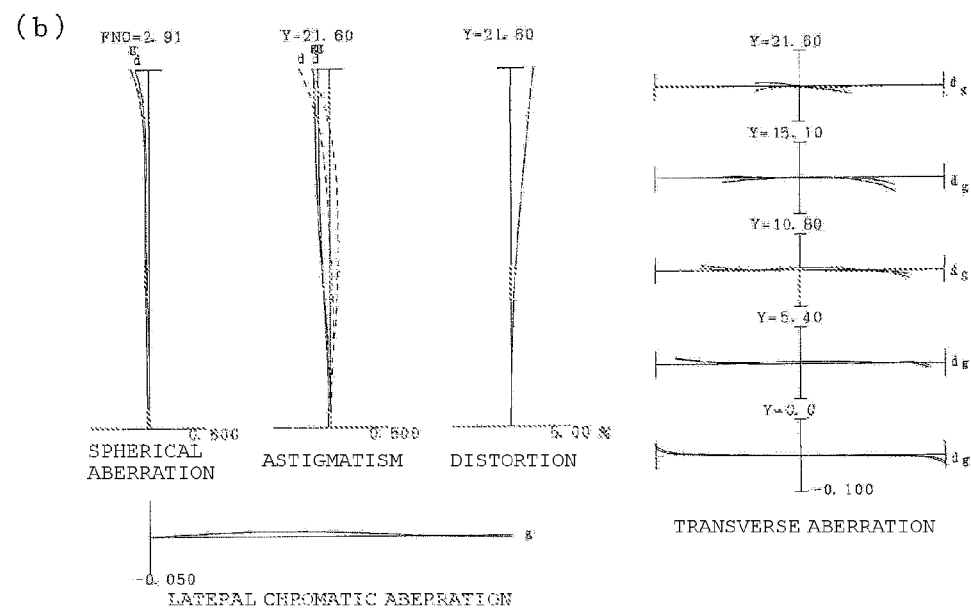
(b)

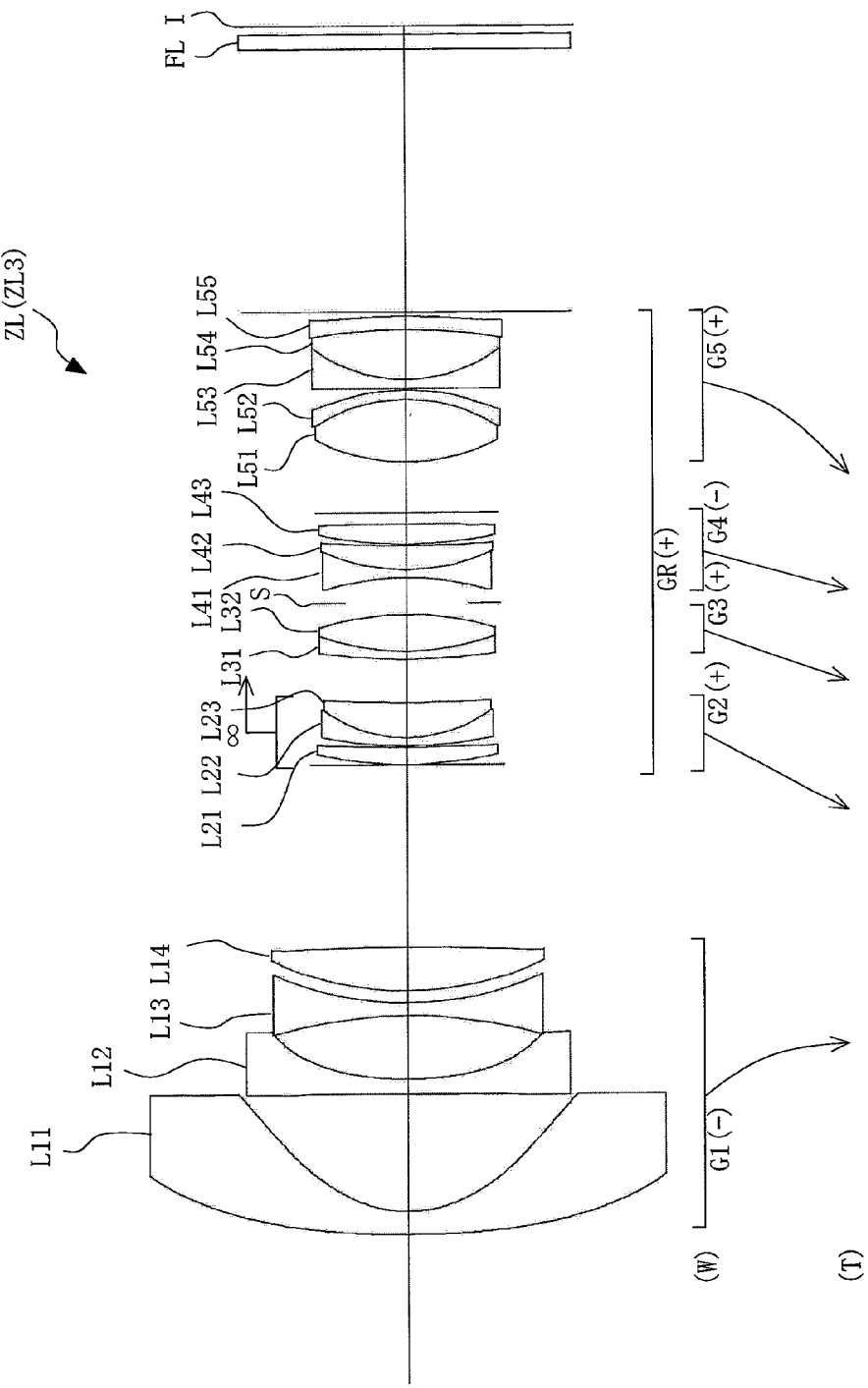

[Fig.6]
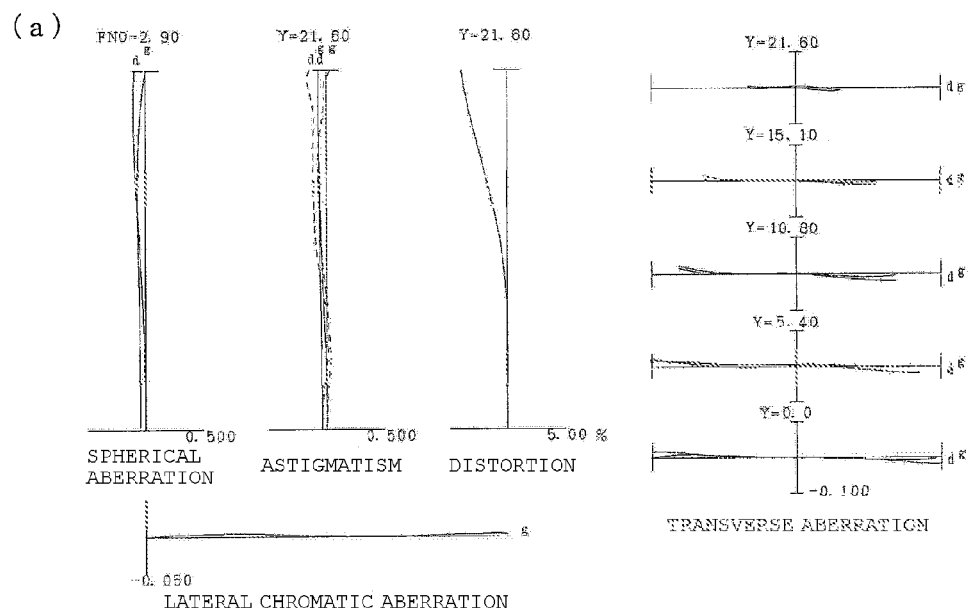
(a)
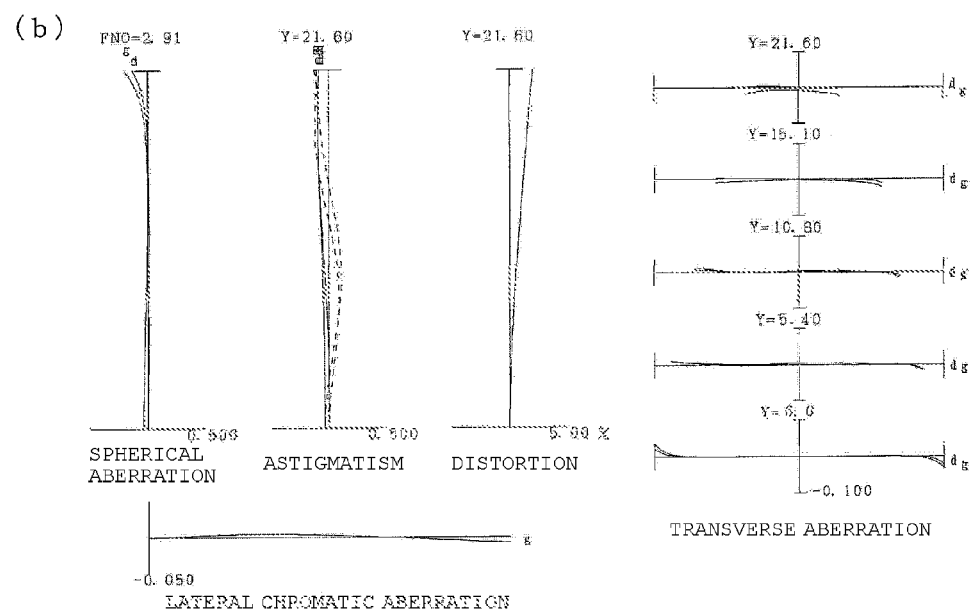
(b)

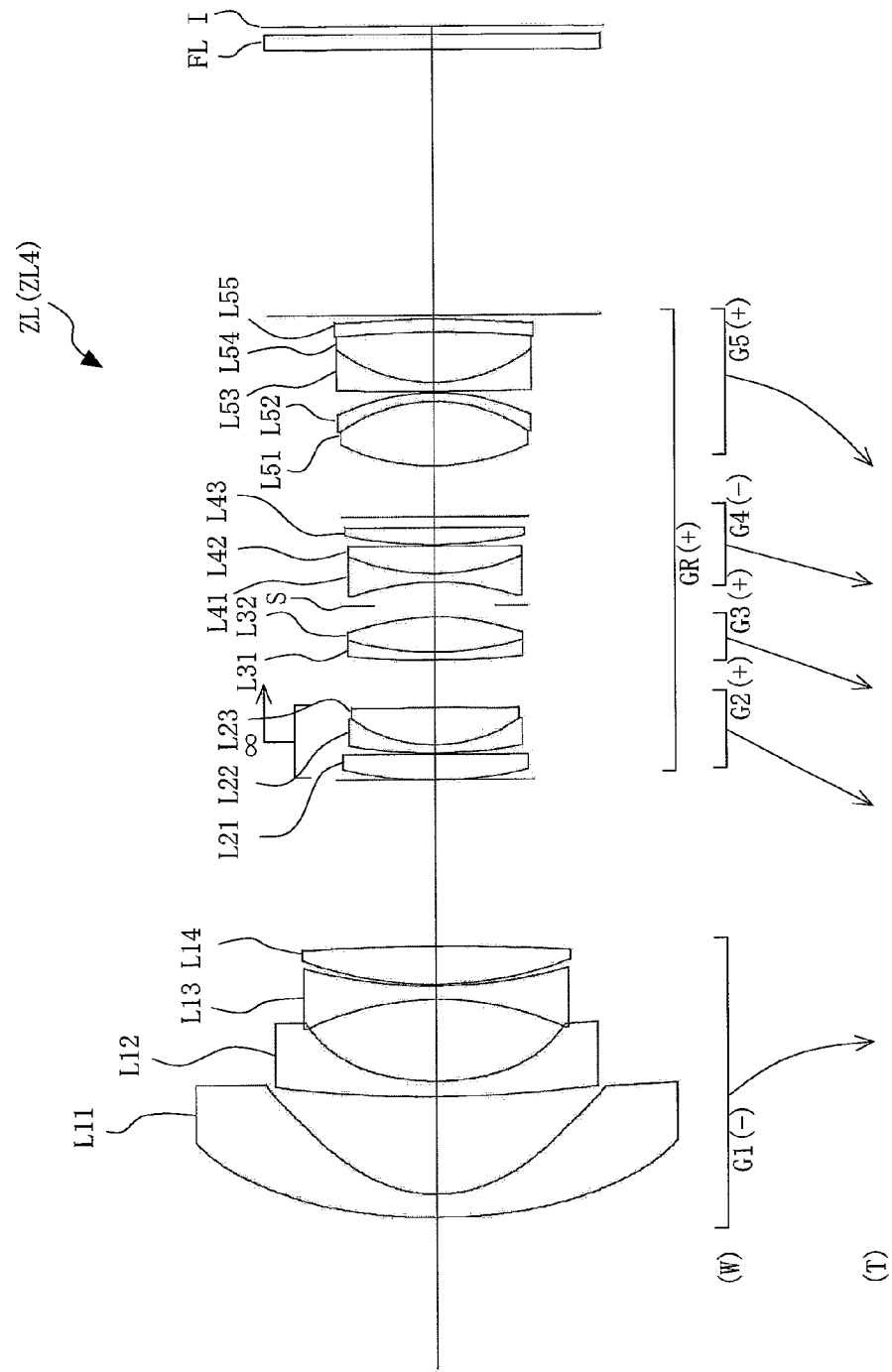
[Fig. 7]

[Fig.8]
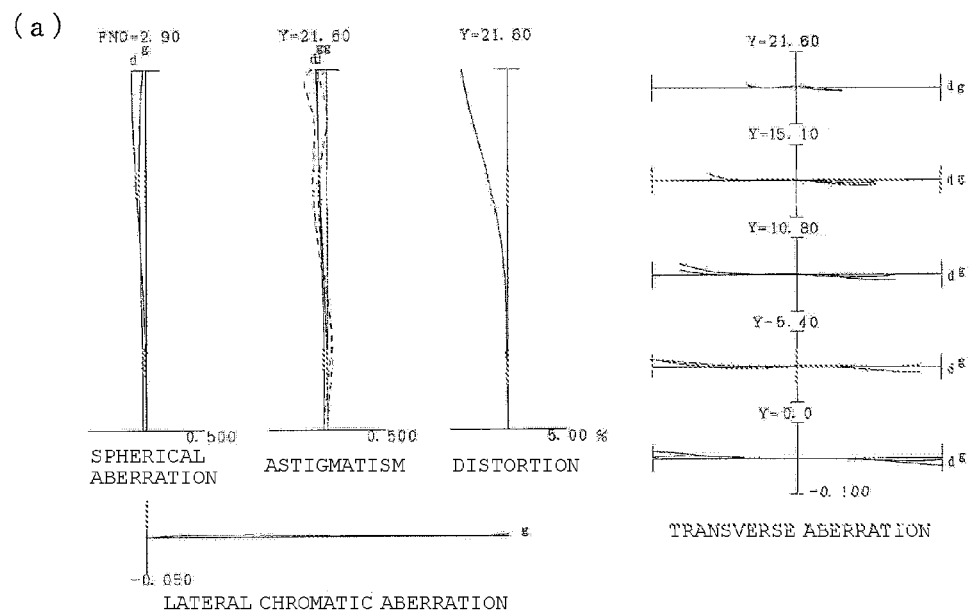
(a)
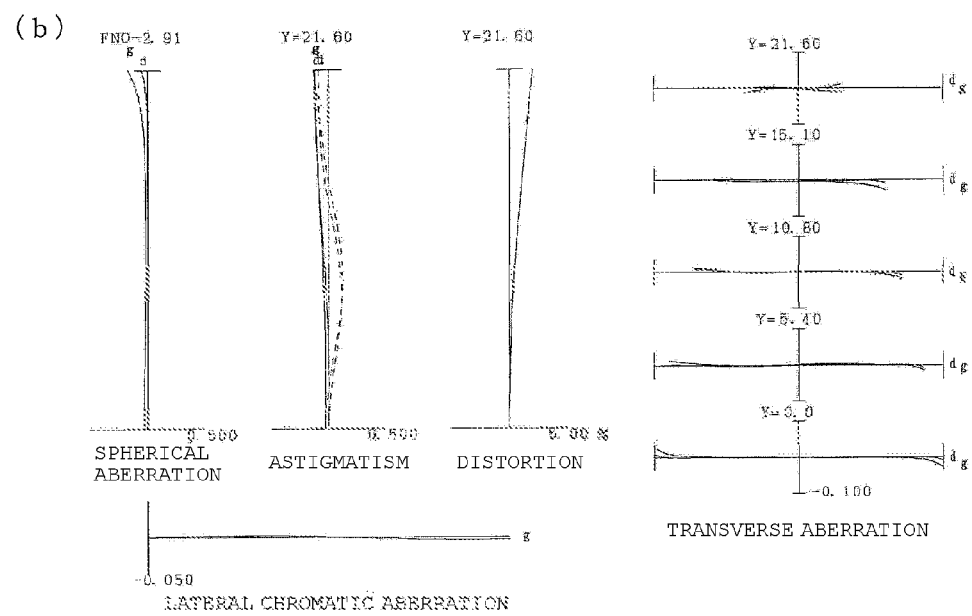
(b)

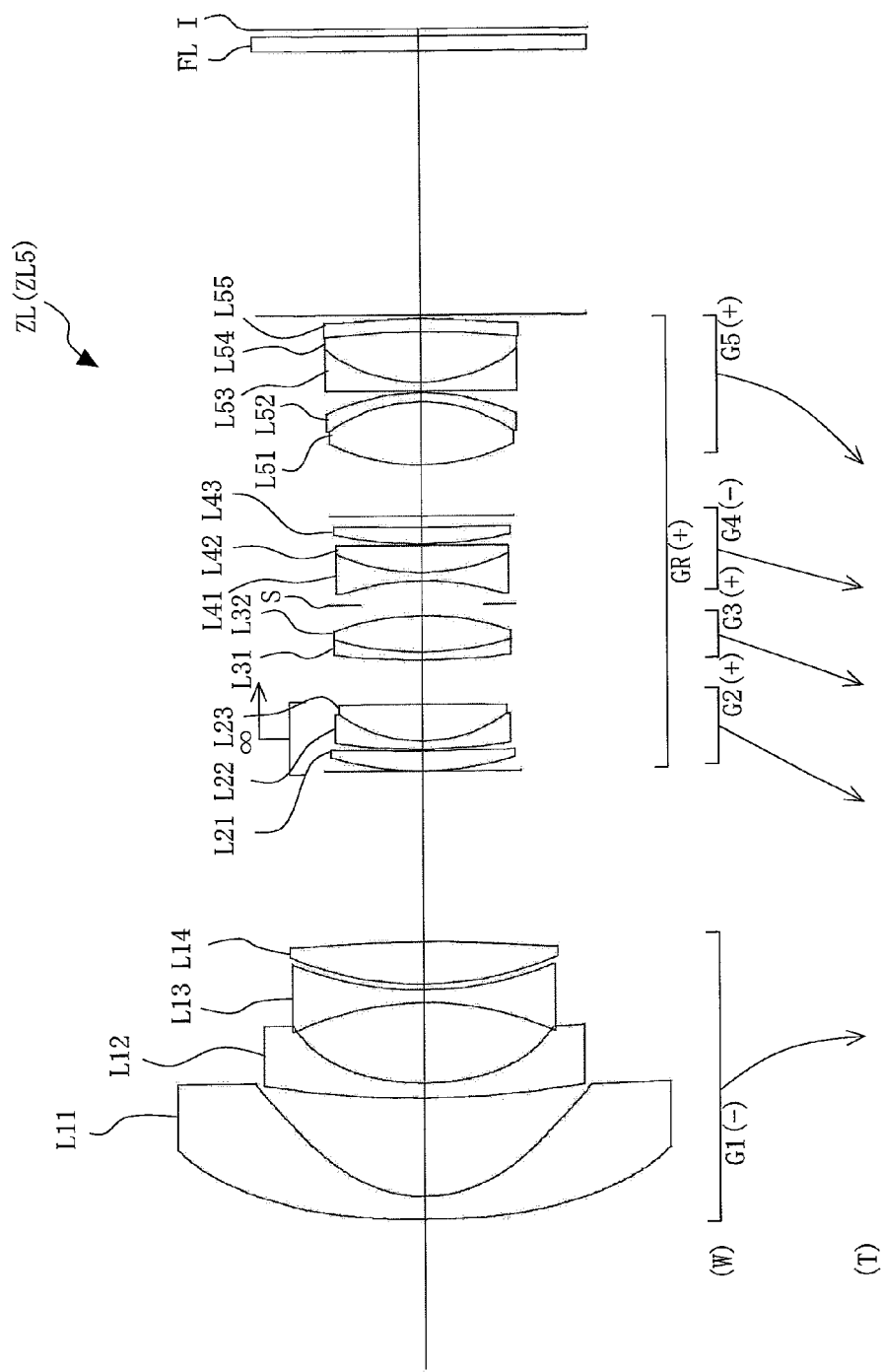

[Fig.10]
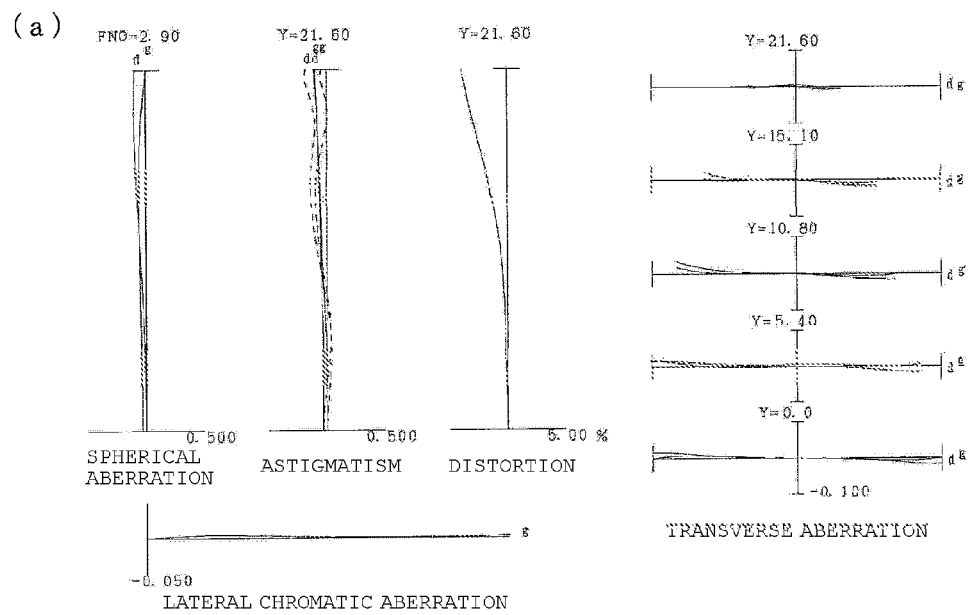
(a)
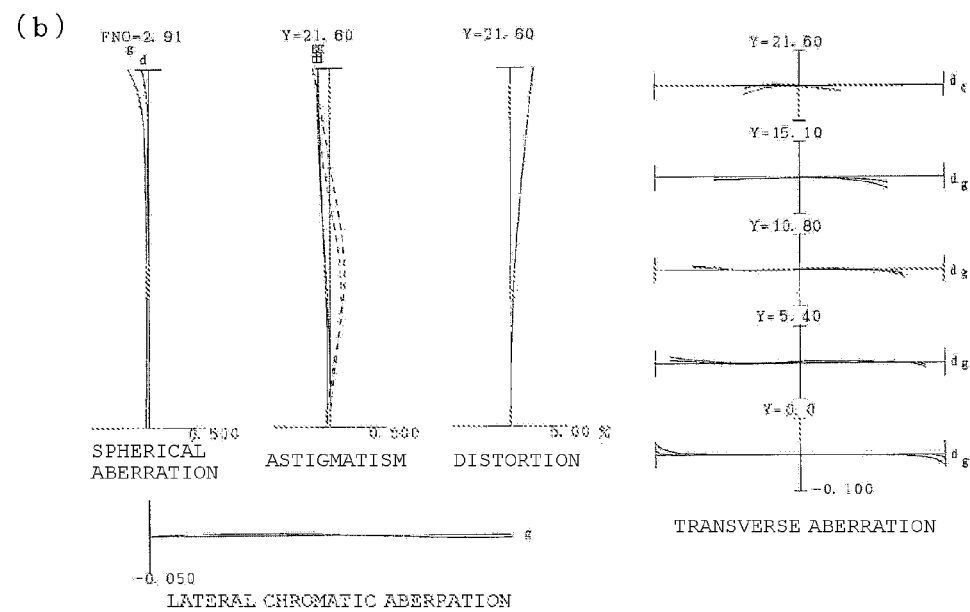
(b)

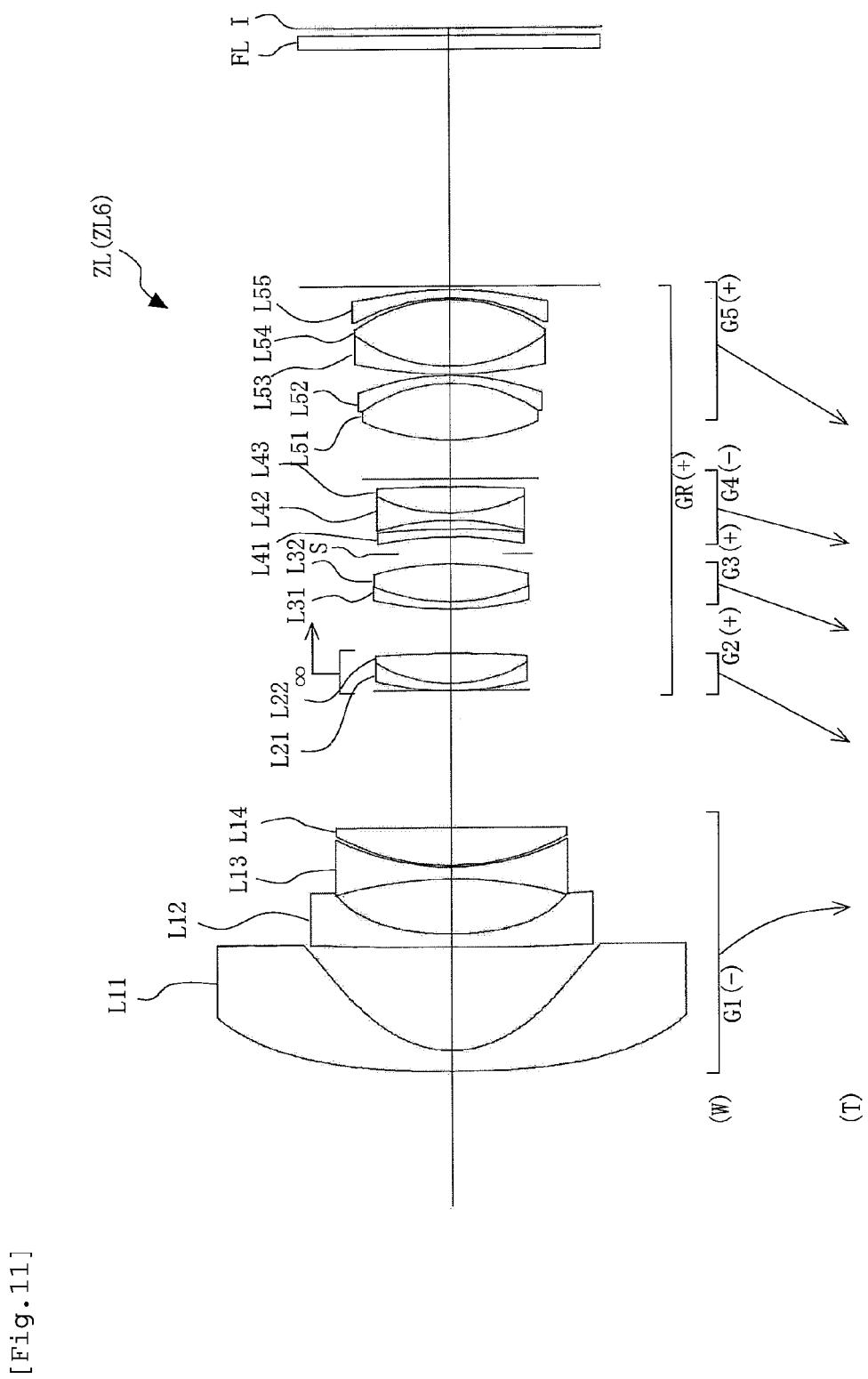
[Fig.11]

[Fig.12]
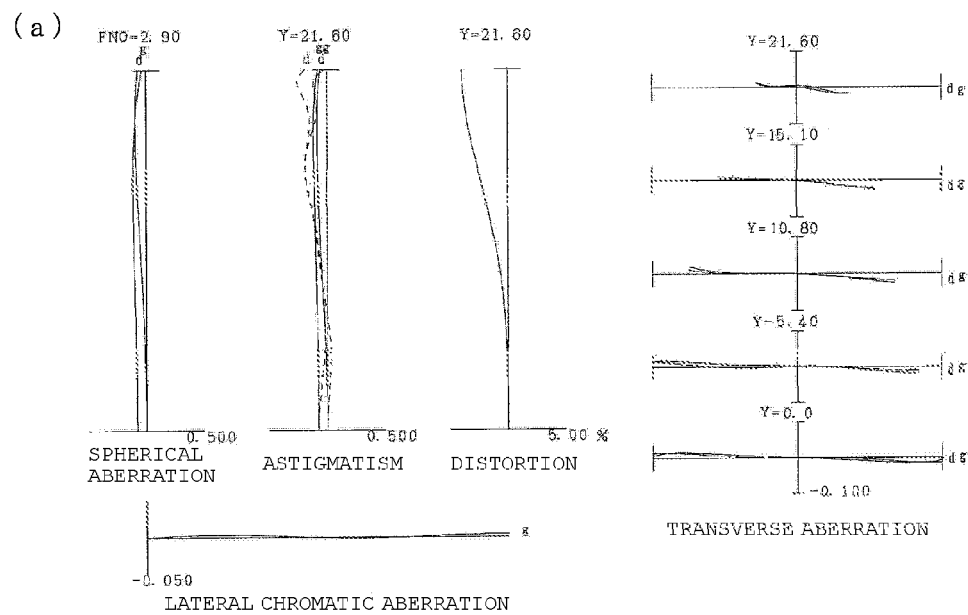
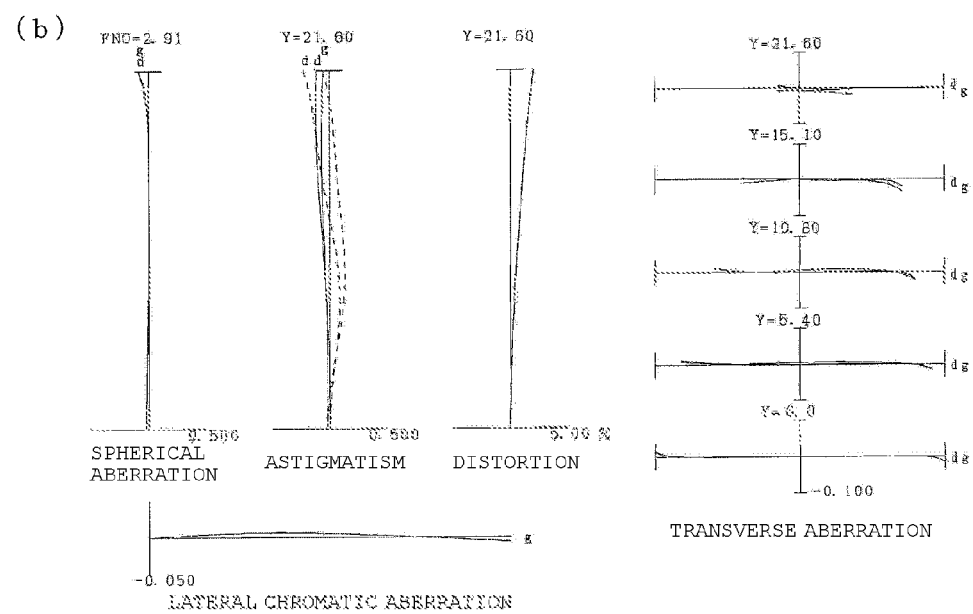

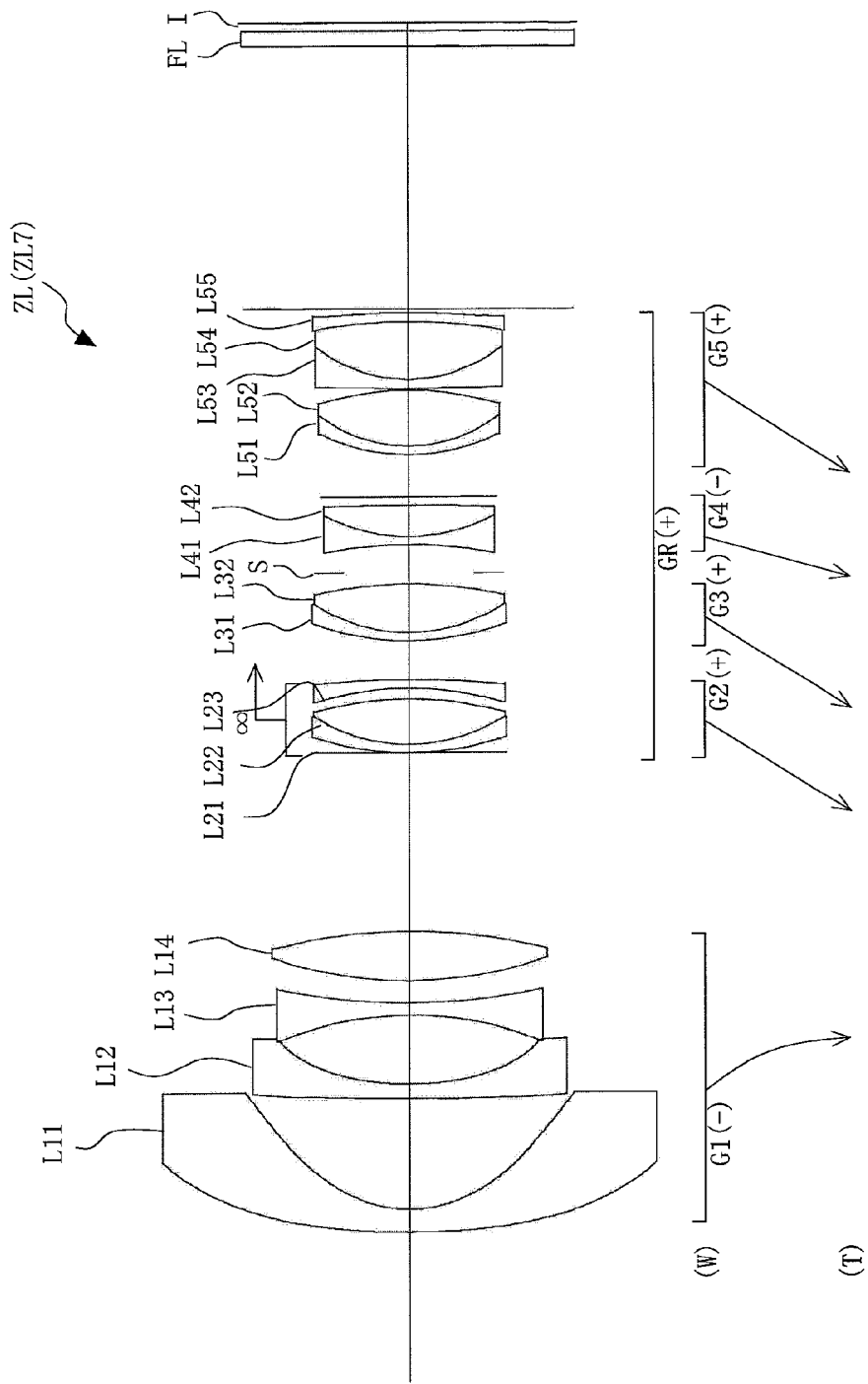
[Fig.13]

[Fig.14]
(a)
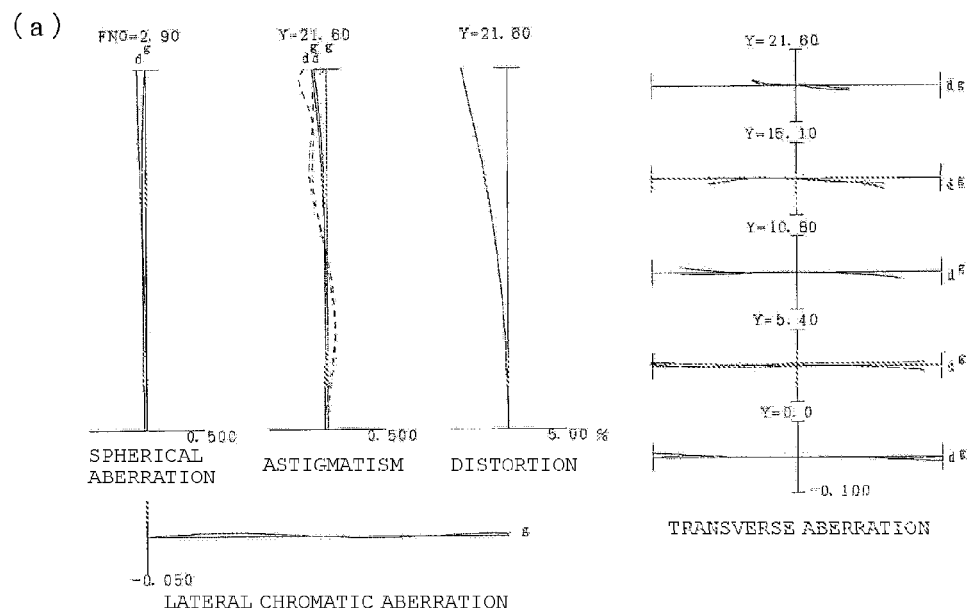
(b)
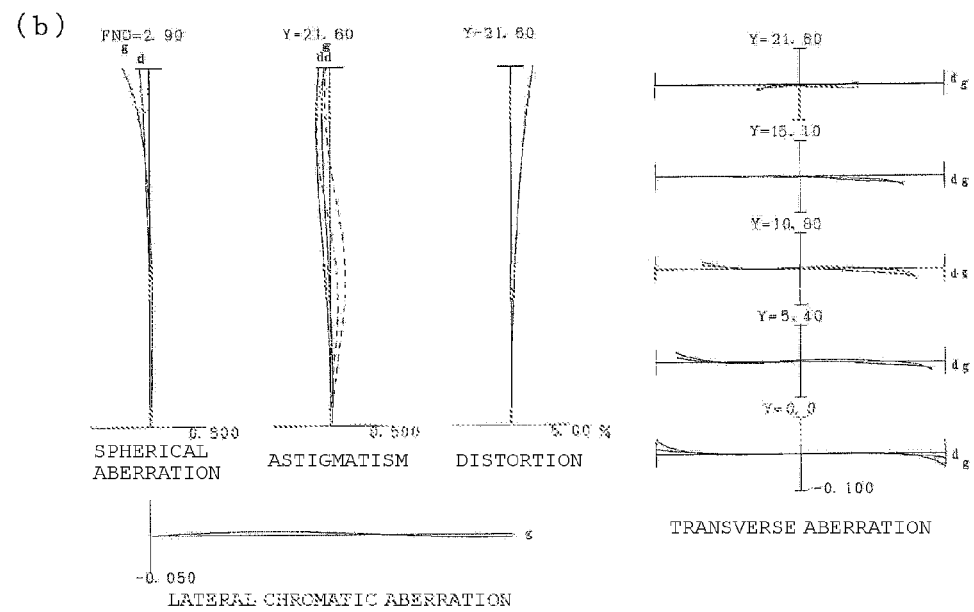

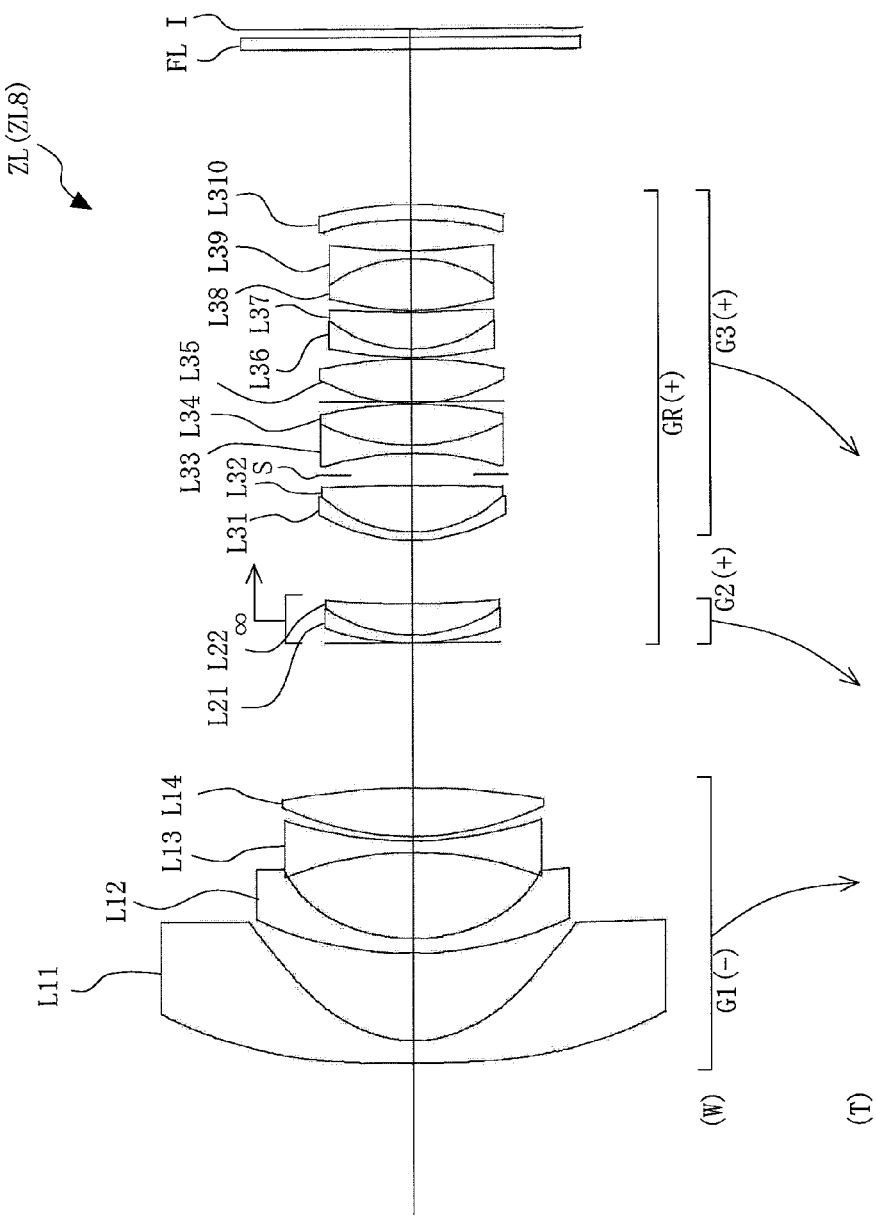
[Fig. 15]

[Fig.16]
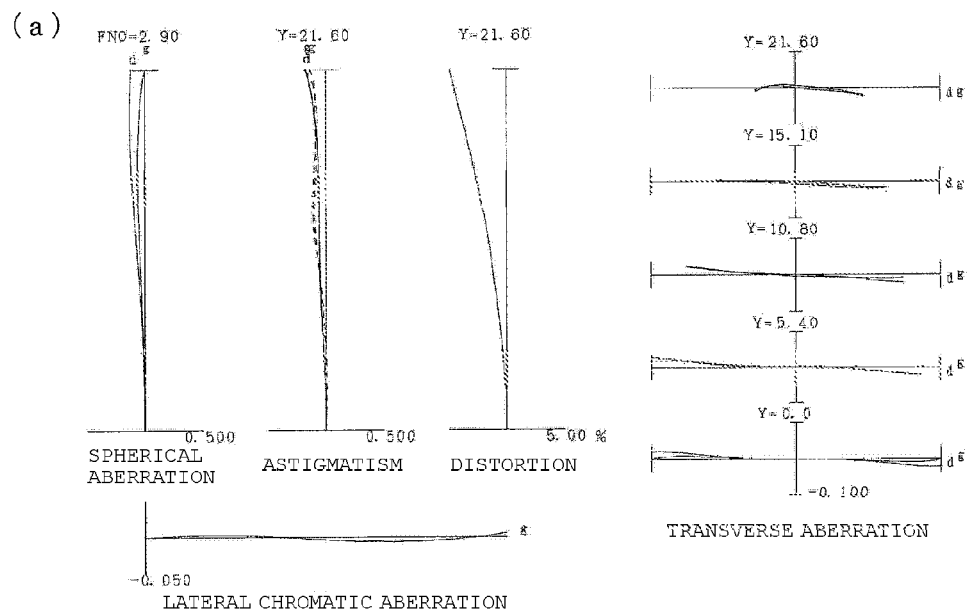
(a)
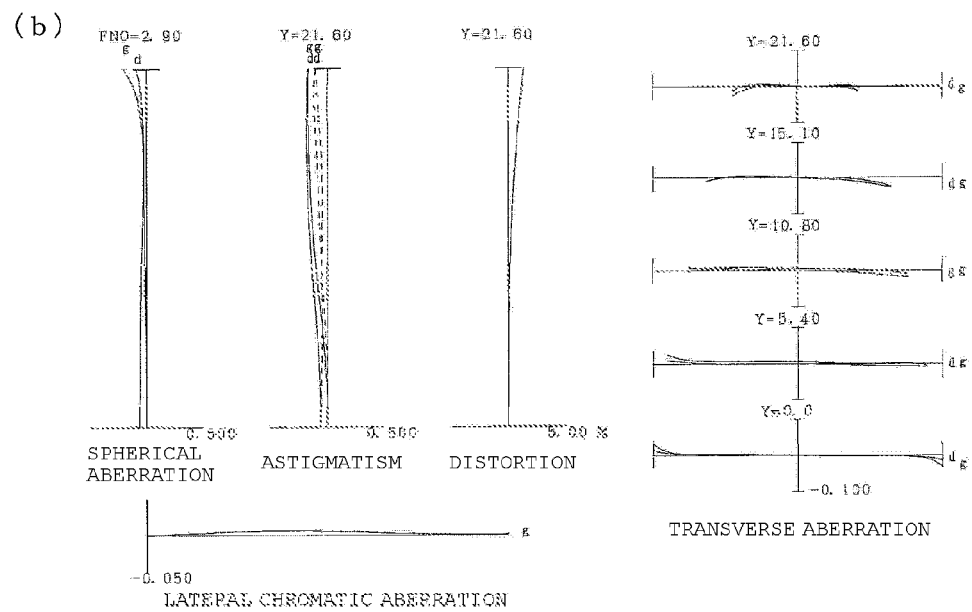
(b)

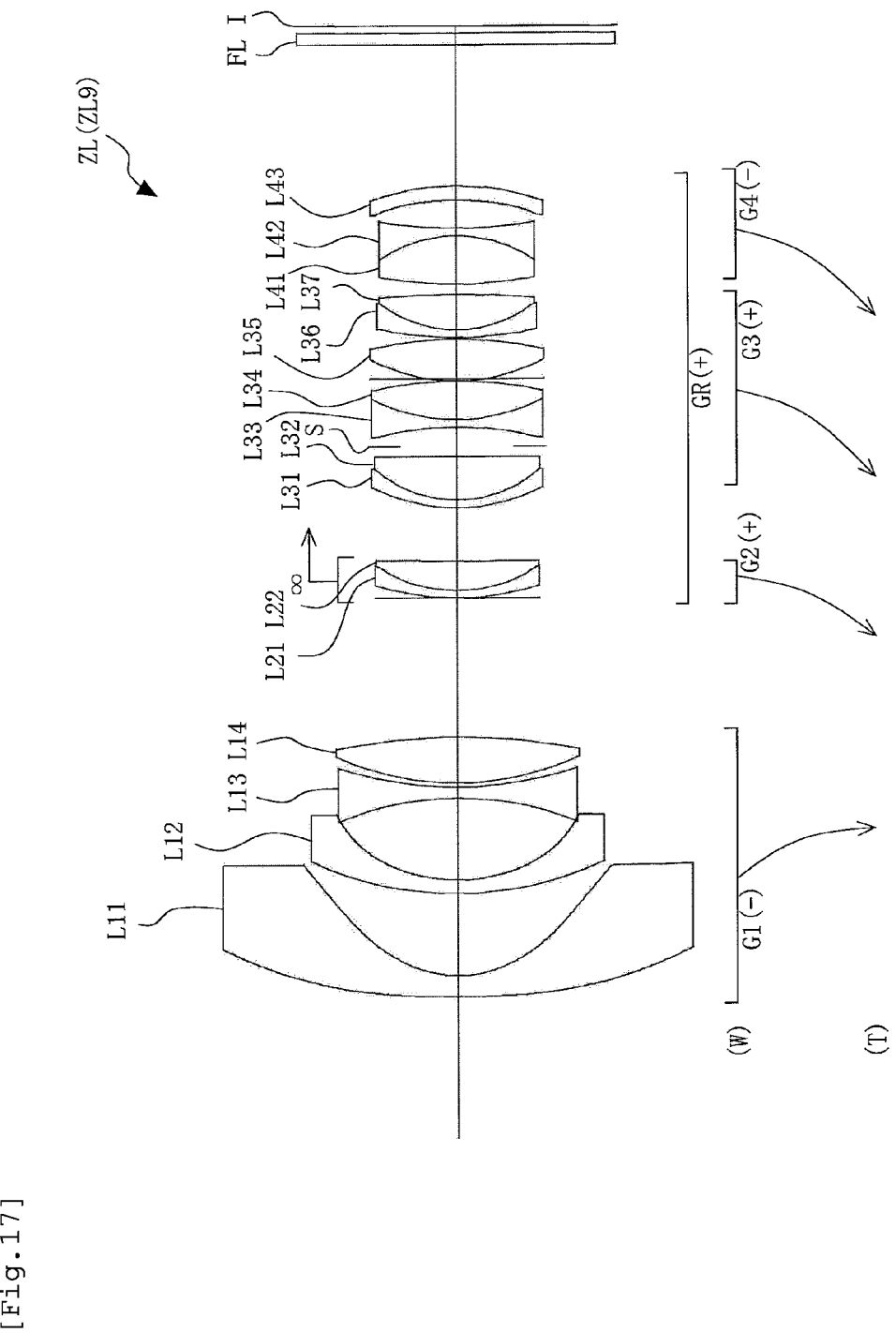
[Fig. 17]

[Fig.18]
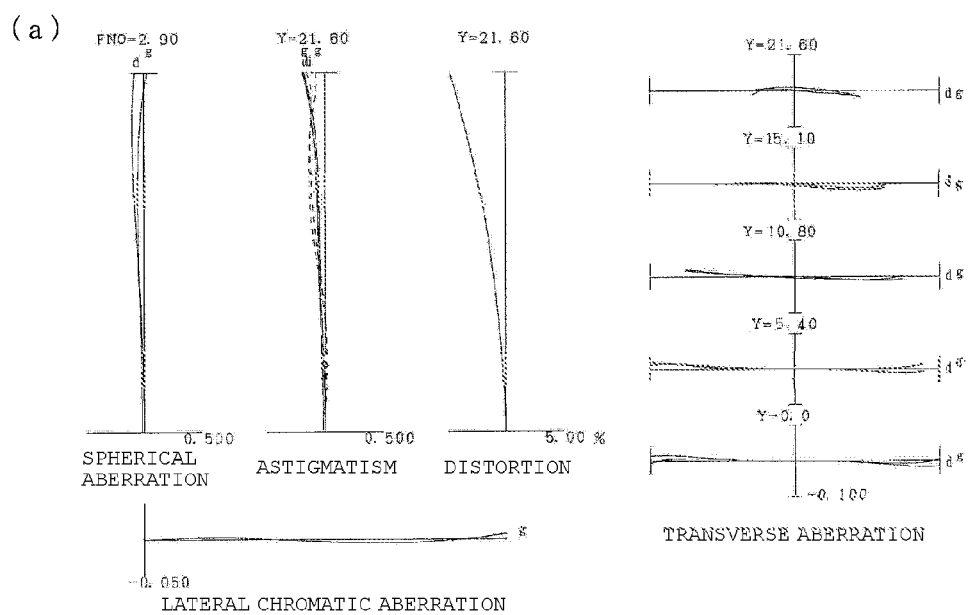
(a)
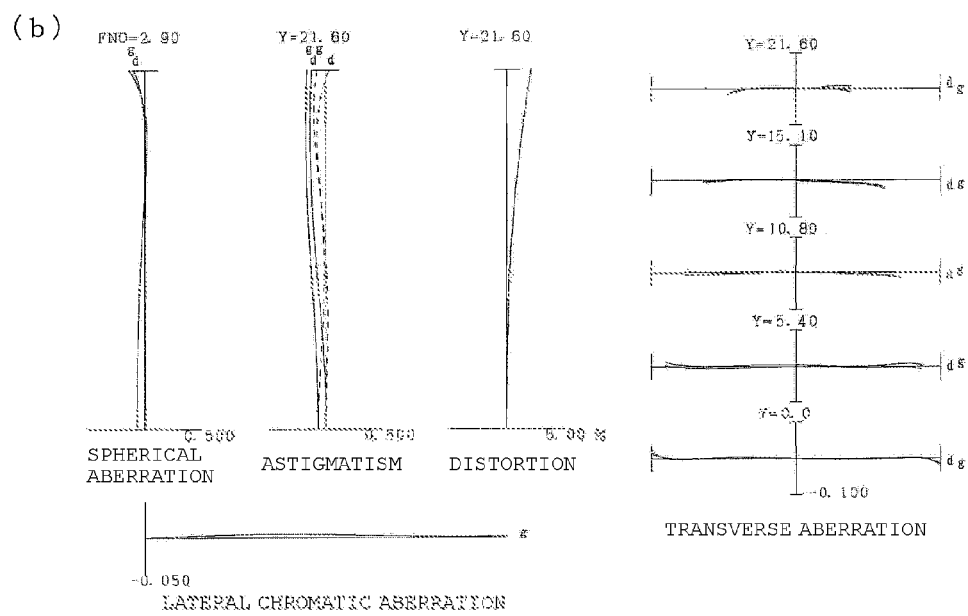
(b)

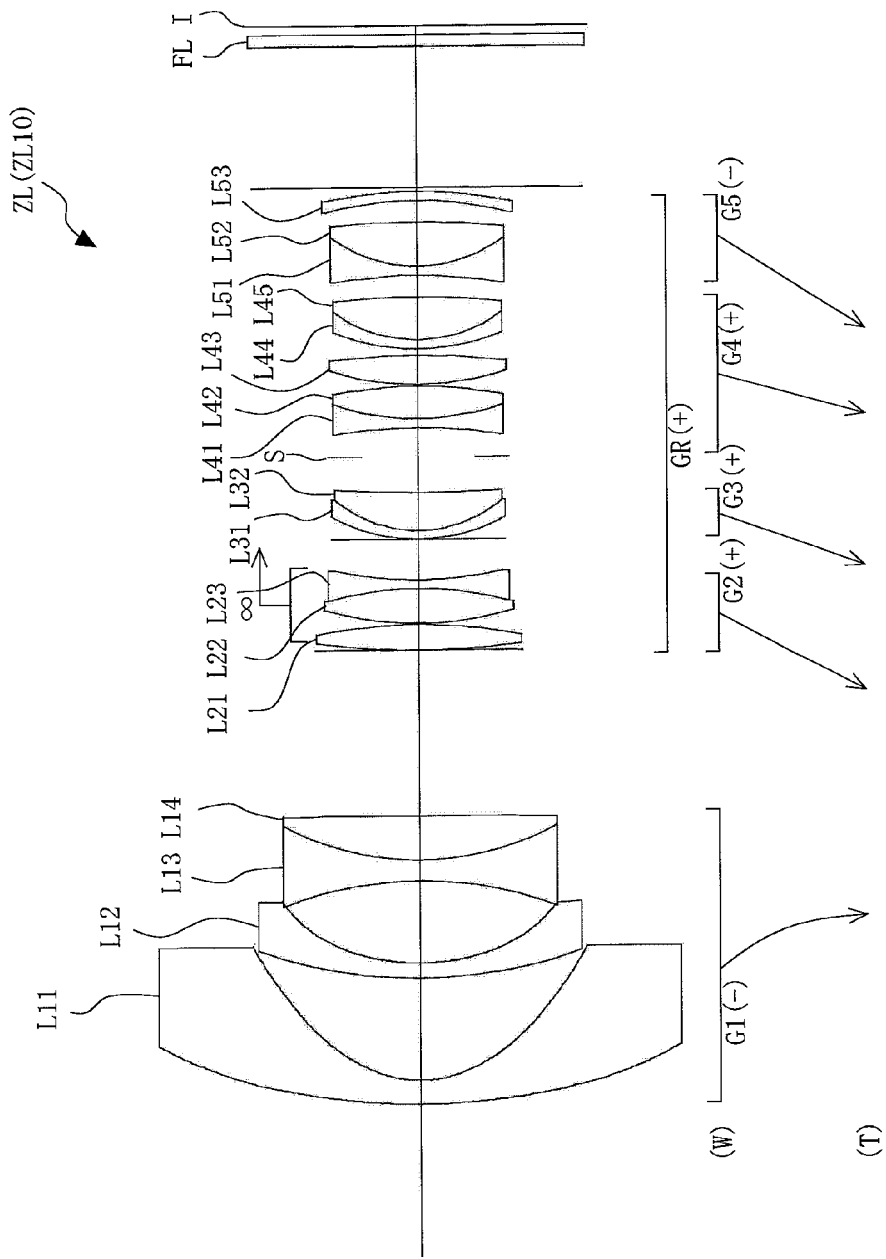
[Fig. 19]

[Fig.20]
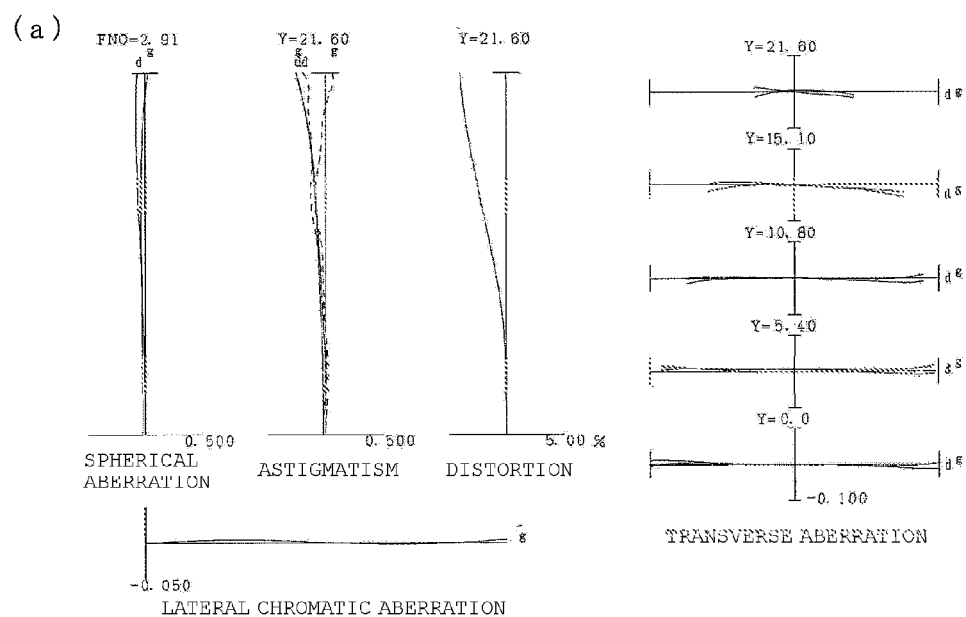
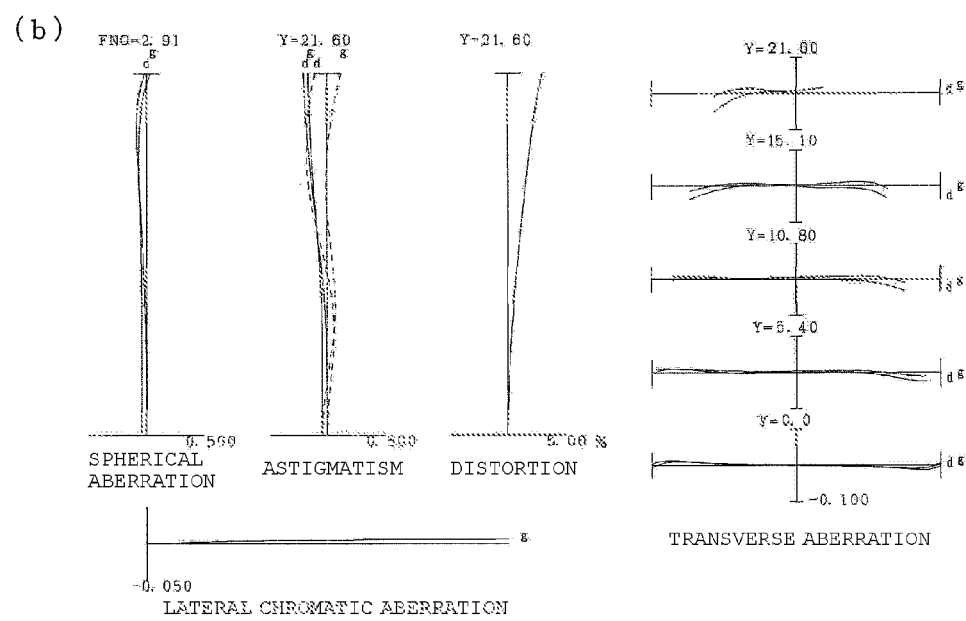

[Fig.21]
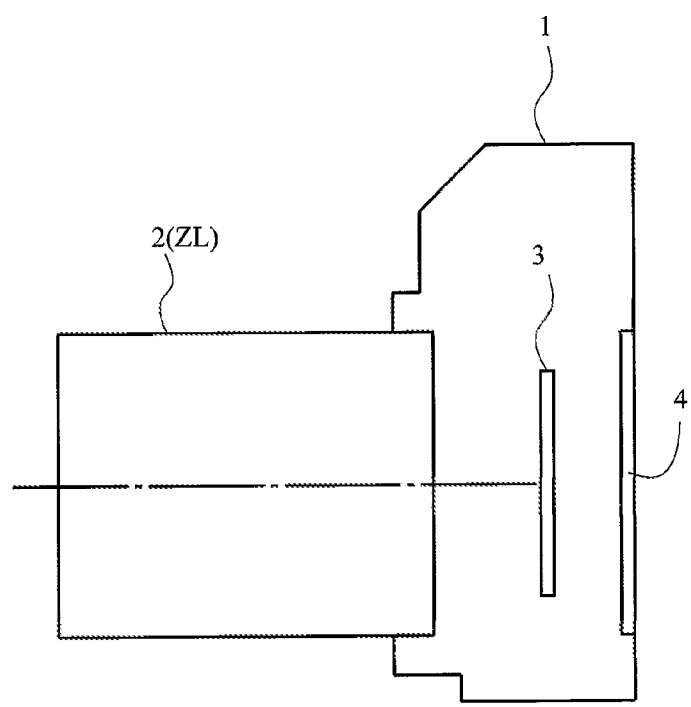

[Fig.22]
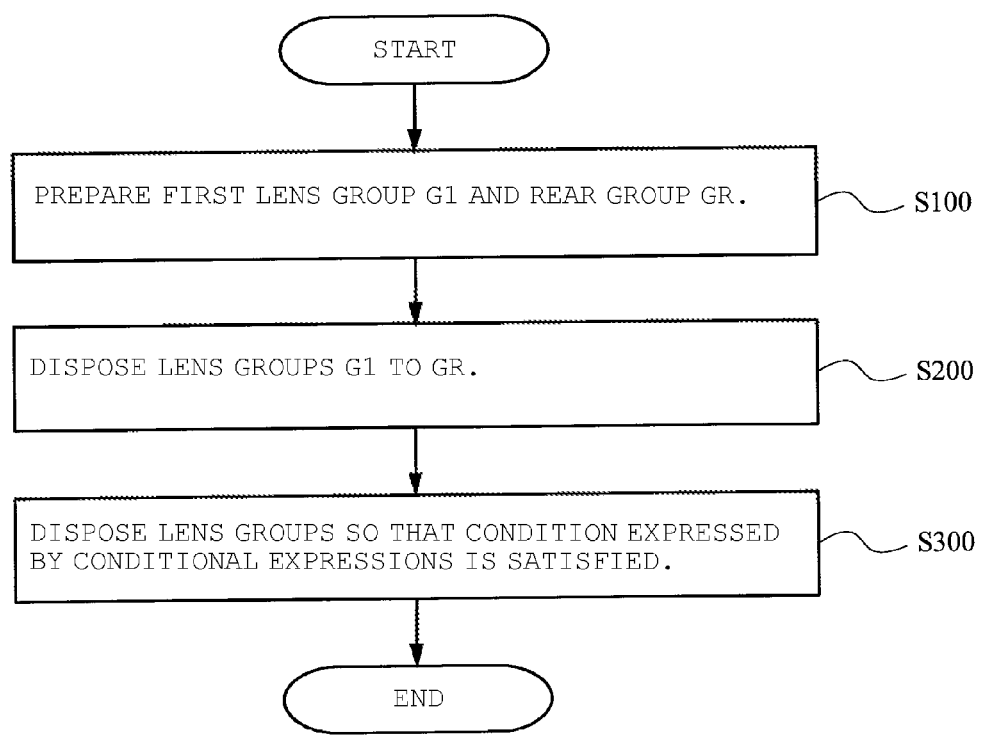

MAGNIFICATION-VARIABLE OPTICAL SYSTEM, OPTICAL APPARATUS, AND METHOD FOR MANUFACTURING MAGNIFICATION-VARIABLE OPTICAL SYSTEM

TECHNICAL FIELD

The present invention relates to a magnification-variable optical system, an optical apparatus, and a method for manufacturing the magnification-variable optical system.

BACKGROUND ART

Conventionally, a magnification-variable optical system that achieves a small size and a wide angle of view has been disclosed (see Patent Literature 1, for example). However, further improvement of optical performance is required.

CITATION LIST

Patent Literature

Patent Literature 1: Japanese Patent Laid-open No. 2018-013685

SUMMARY OF INVENTION

A magnification-variable optical system according to a first aspect of the present invention includes: a first lens group having negative refractive power; and a rear group including at least one lens group disposed on an image side of the first lens group, a distance between lens groups adjacent to each other changes at magnification change, and a condition expressed by expressions below is satisfied, $$-4.00 < (L1r2 + L1r1)/(L1r2 - L1r1) < -0.50$$

$$100.00° < 2\omega w$$

in the expressions,

L1r1: radius of curvature of a lens surface of a lens closest to an object side in the first lens group, the lens surface being on the object side, L1r2: radius of curvature of a lens surface of the lens closest to the object side in the first lens group, the lens surface being on an image side, and $2\omega w$: full angle of view of the magnification-variable optical system in a wide-angle state.

A method for manufacturing the magnification-variable optical system according to the first aspect of the present invention is a method for manufacturing a magnification-variable optical system including a first lens group and a rear group, the first lens group having negative refractive power, the rear group including at least one lens group disposed on an image side of the first lens group, the method for manufacturing the magnification-variable optical system including: disposing the lens groups so that a distance between lens groups adjacent to each other changes at magnification change; and disposing the lens groups so that a condition expressed by expressions below is satisfied, $$-4.00 < (L1r2 + L1r1)/(L1r2 - L1r1) < -0.50$$

$$100.00° < 2\omega w$$

in the expressions,

L1r1: radius of curvature of a lens surface of a lens closest to an object side in the first lens group, the lens surface being on the object side, L1r2: radius of curvature of a lens surface of the lens closest to the object side in the first lens group, the lens surface being on an image side, and $2\omega w$: full angle of view of the magnification-variable optical system in a wide-angle state.

BRIEF DESCRIPTION OF DRAWINGS

FIG. 1 is a cross-sectional view showing a lens configuration of a magnification-variable optical system according to a first example.

FIG. 2 shows a variety of aberration diagrams of the magnification-variable optical system according to the first example at focusing on an object at infinity: (a) shows a wide-angle state; and (b) shows a telescopic state.

FIG. 3 is a cross-sectional view showing a lens configuration of a magnification-variable optical system according to a second example.

FIG. 4 shows a variety of aberration diagrams of the magnification-variable optical system according to the second example at focusing on an object at infinity: (a) shows a wide-angle state; and (b) shows a telescopic state.

FIG. 5 is a cross-sectional view showing a lens configuration of a magnification-variable optical system according to a third example.

FIG. 6 shows a variety of aberration diagrams of the magnification-variable optical system according to the third example at focusing on an object at infinity: (a) shows a wide-angle state; and (b) shows a telescopic state.

FIG. 7 is a cross-sectional view showing a lens configuration of a magnification-variable optical system according to a fourth example.

FIG. 8 shows a variety of aberration diagrams of the magnification-variable optical system according to the fourth example at focusing on an object at infinity: (a) shows a wide-angle state; and (b) shows a telescopic state.

FIG. 9 is a cross-sectional view showing a lens configuration of a magnification-variable optical system according to a fifth example.

FIG. 10 shows a variety of aberration diagrams of the magnification-variable optical system according to the fifth example at focusing on an object at infinity: (a) shows a wide-angle state; and (b) shows a telescopic state.

FIG. 11 is a cross-sectional view showing a lens configuration of a magnification-variable optical system according to a sixth example.

FIG. 12 shows a variety of aberration diagrams of the magnification-variable optical system according to the sixth example at focusing on an object at infinity: (a) shows a wide-angle state; and (b) shows a telescopic state.

FIG. 13 is a cross-sectional view showing a lens configuration of a magnification-variable optical system according to a seventh example.

FIG. 14 shows a variety of aberration diagrams of the magnification-variable optical system according to the seventh example at focusing on an object at infinity: (a) shows a wide-angle state; and (b) shows a telescopic state.

FIG. 15 is a cross-sectional view showing a lens configuration of a magnification-variable optical system according to an eighth example.

FIG. 16 shows a variety of aberration diagrams of the magnification-variable optical system according to the eighth example at focusing on an object at infinity: (a) shows a wide-angle state; and (b) shows a telescopic state.

FIG. 17 is a cross-sectional view showing a lens configuration of a magnification-variable optical system according to a ninth example.

FIG. 18 shows a variety of aberration diagrams of the magnification-variable optical system according to the ninth example at focusing on an object at infinity: (a) shows a wide-angle state; and (b) shows a telescopic state.

FIG. 19 is a cross-sectional view showing a lens configuration of a magnification-variable optical system according to a tenth example.

FIG. 20 shows a variety of aberration diagrams of the magnification-variable optical system according to the tenth example at focusing on an object at infinity: (a) shows a wide-angle state; and (b) shows a telescopic state.

FIG. 21 shows a cross-sectional view of a camera on which an above-described magnification-variable optical system is mounted.

FIG. 22 is a flowchart for description of a method for manufacturing an above-described magnification-variable optical system.

DESCRIPTION OF EMBODIMENTS

Preferable embodiments will be described below with reference to the drawings.

First Embodiment

A magnification-variable optical system ZL according to a first embodiment includes a first lens group G1 having a negative refractive power and including at least two lenses, and a rear group GR including at least one lens group disposed on an image side of the first lens group G1, as shown in FIG. 1. In the magnification-variable optical system ZL according to the first embodiment, a distance between lens groups adjacent to each other changes at magnification change. With this configuration, a magnification ratio that satisfies the present embodiment can be achieved.

Moreover, the magnification-variable optical system ZL according to the first embodiment desirably satisfies Conditional Expression (1) described below.

$$80.00 < \nu 1n \quad (1)$$

In the expression,

ν1n: Abbe number of the medium of at least one negative lens included in the first lens group G1 at a d line Conditional Expression (1) defines the Abbe number of the medium of at least one negative lens included in the first lens group G1 at the d line (hereinafter, a negative lens that satisfies Conditional Expression (1) in the first lens group G1 referred to as a "specific negative lens"). When Conditional Expression (1) is satisfied, it is possible to favorably correct occurrences of a variety of aberrations such as lateral chromatic aberration and achieve weight reduction due to reduction of the number of lenses of the first lens group G1, and it is possible to appropriately select the medium (glass material) of each lens included in the first lens group G1. Meanwhile, it is possible to secure the advantageous effect of the present embodiment more surely by setting the lower limit value of Conditional Expression (1) to 82.00. Further, in order to secure the advantageous effect of the present embodiment further more surely, it is preferable to set the lower limit value of Conditional Expression (1) to 85.00, 88.00, 90.00, 93.00, and more preferable to 95.00.

Moreover, the magnification-variable optical system ZL according to the first embodiment desirably satisfies Conditional Expression (2) shown below.

$$1.05 < nL2/nL1 \quad (2)$$

In the expression, nL1: refractive index of the medium of a lens closest to an object side in the first lens group G1 at the d line, and nL2: refractive index of the medium of a lens second closest to the object side in the first lens group G1 at the d line.

Conditional Expression (2) defines the ratio of the refractive index of the medium of the lens closest to the object side and the refractive index of the medium of the lens second closest to the object side in the first lens group G1 at the d line. When Conditional Expression (2) is satisfied, it is possible to favorably correct occurrences of a variety of aberrations such as curvature of field and astigmatism and achieve weight reduction due to reduction of the number of lenses of the first lens group G1, and it is possible to appropriately select the medium (glass material) of each lens included in the first lens group G1. Meanwhile, it is possible to secure the advantageous effect of the present embodiment more surely by setting the lower limit value of Conditional Expression (2) to 1.08. Further, in order to secure the advantageous effect of the present embodiment further more surely, it is preferable to set the lower limit value of Conditional Expression (2) to 1.10, 1.11, 1.13, 1.14, and more preferable to 1.15.

Moreover, the magnification-variable optical system ZL according to the first embodiment desirably satisfies Conditional Expression (3) shown below.

$$N1n \leq 4 \quad (3)$$

In the expression,

N1n: the number of negative lenses included in the first lens group G1.

Conditional Expression (3) defines the number of negative lenses included in the first lens group G1. When Conditional Expression (3) is satisfied, it is possible to achieve weight reduction due to reduction of the number of negative lenses in the first lens group G1. In addition, it is possible to reduce aberration variation at focusing or magnification change. Meanwhile, it is possible to secure the advantageous effect of the present embodiment more surely by setting the upper limit value of Conditional Expression (3) to 3. Meanwhile, it is possible to secure the advantageous effect of the present embodiment more surely by setting the lower limit value of Conditional Expression (3) to 1 (1<N1n), in other words, the first lens group G1 desirably includes at least one negative lens.

Moreover, the magnification-variable optical system ZL according to the first embodiment desirably satisfies Conditional Expression (4) shown below.

$$100.00° < 2\omega w \quad (4)$$

In the expression,

2ωw: full angle of view of the magnification-variable optical system ZL in a wide-angle state.

Conditional Expression (4) defines the full angle of view of the magnification-variable optical system ZL in the wide-angle state. When Conditional Expression (4) is satisfied, the present magnification-variable optical system ZL can be a bright ultrawide-angle zoom lens. Meanwhile, it is possible to secure the advantageous effect of the present embodiment more surely by setting the lower limit value of Conditional Expression (4) to 105.00°. Further, in order to secure the advantageous effect of the present embodiment further more surely, it is preferable to set the lower limit value of Conditional Expression (4) to 110.00°, 112.00°, and more preferable to 114.00°.

Moreover, the magnification-variable optical system ZL according to the first embodiment desirably satisfies Conditional Expression (5) shown below.

$$nL1<1.70 \tag{5}$$

In the expression, nL1: refractive index of the medium of the lens closest to the object side in the first lens group G1 at the d line.

Conditional Expression (5) defines the refractive index of the medium of the lens closest to the object side in the first lens group G1 at the d line. When Conditional Expression (5) is satisfied, a lens of a medium (glass material) having a low refractive index is disposed closest to the object side in the first lens group G1, and thus it is possible to favorably correct the Petzval sum. In addition, it is possible to reduce aberration variation at focusing or magnification change. Meanwhile, it is possible to secure the advantageous effect of the present embodiment more surely by setting the upper limit value of Conditional Expression (5) to 1.69. Further, in order to secure the advantageous effect of the present embodiment further more surely, it is preferable to set the upper limit value of Conditional Expression (5) to 1.68, 1.66, 1.65, 1.64, and more preferable to 1.63.

Second Embodiment

A magnification-variable optical system ZL according to a second embodiment includes a first lens group G1 having negative refractive power, and a rear group GR including at least one lens group disposed on an image side of the first lens group G1, as shown in FIG. 1. In the magnification-variable optical system ZL according to the second embodiment, the distance between lens groups adjacent to each other changes at magnification change. With this configuration, it is possible to achieve a magnification ratio that satisfies the present embodiment.

Moreover, the magnification-variable optical system ZL according to the second embodiment desirably satisfies Conditional Expression (6) shown below.

$$85.00 \text{ mm}^2 < fw \times (-f1)/F\text{now} < 165.00 \text{ mm}^2 \tag{6}$$

In the expression, fw: focal length of the magnification-variable optical system ZL in the wide-angle state, f1: focal length of the first lens group G1, and Fnow: maximum aperture of the magnification-variable optical system ZL at focusing on an object at infinity in the wide-angle state.

Conditional Expression (6) defines appropriate refractive power (power) of the first lens group G1 for the maximum aperture of the magnification-variable optical system ZL. When Conditional Expression (6) is satisfied, it is possible to achieve both weight reduction due to reduction of the number of lenses of the first lens group G1 and high performance due to appropriate refractive power (power) of the first lens group G1. Moreover, the present magnification-variable optical system ZL is applicable to a bright ultra-wide-angle zoom lens. Meanwhile, it is possible to secure the advantageous effect of the present embodiment more surely by setting the upper limit value of Conditional Expression (6) to 160.00 mm². Further, in order to secure the advantageous effect of the present embodiment further more surely, it is preferable to set the upper limit value of Conditional Expression (6) to 155.00 mm², 150.00 mm², 145.00 mm², 140.00 mm², 135.00 mm², 130.00 mm², 125.00 mm², 120.00 mm², and more preferable to 115.00 mm². Meanwhile, it is possible to secure the advantageous effect of the present embodiment more surely by setting the lower limit value of Conditional Expression (6) to 90.00 mm², 95.00 mm², 100.00 mm², 102.00 mm², 103.00 mm², and more preferable to 104.00 mm².

Moreover, the magnification-variable optical system ZL according to the second embodiment desirably satisfies Conditional Expression (3A) described below.

$$N1n \leq 3 \tag{3A}$$

In the expression,

N1n: the number of negative lenses included in the first lens group G1.

Description of Conditional Expression (3A) is the same as the above description of Conditional Expression (3).

Moreover, the magnification-variable optical system ZL according to the second embodiment desirably satisfies Conditional Expression (4) shown below.

$$100.00° < 2\omega w \tag{4}$$

In the expression,

2ωw: full angle of view of the magnification-variable optical system ZL in a wide-angle state.

Description of Conditional Expression (4) is as described above.

Moreover, the magnification-variable optical system ZL according to the second embodiment desirably satisfies Conditional Expression (5) shown below.

$$nL1<1.70 \tag{5}$$

In the expression, nL1: refractive index of the medium of the lens closest to an object side in the first lens group G1 at the d line.

Description of Conditional Expression (5) is as described above.

Third Embodiment

A magnification-variable optical system ZL according to a third embodiment includes a first lens group G1 having negative refractive power, and a rear group GR including at least one lens group disposed on an image side of the first lens group G1, as shown in FIG. 1. In the magnification-variable optical system ZL according to the present embodiment, the distance between lens groups adjacent to each other changes at magnification change. With this configuration, it is possible to achieve a magnification ratio that satisfies the present embodiment.

Moreover, the magnification-variable optical system ZL according to the third embodiment desirably satisfies Conditional Expression (7) shown below.

$$-4.00<(L1r2+L1r1)/(L1r2-L1r1)<-0.50 \tag{7}$$

In the expression,

L1r1: radius of curvature of a lens surface of the lens closest to an object side in the first lens group G1, the lens surface being on the object side, and L1r2: radius of curvature of a lens surface of the lens closest to the object side in the first lens group G1, the lens surface being on the image side.

Conditional Expression (7) defines the shape of the lens closest to the object side in the first lens group G1. When Conditional Expression (7) is satisfied, the lens closest to the object side in the first lens group G1 is a negative meniscus lens having a convex surface facing the object side, and thus it is possible to achieve both size reduction and favorable aberration correction. In addition, it is possible to reduce aberration variation at focusing or magnification change.

Moreover, the present magnification-variable optical system ZL is applicable to a bright ultrawide-angle zoom lens. When the upper limit value of Conditional Expression (7) is exceeded, distortion increase and manufacturability decrease undesirably occur. Meanwhile, it is possible to secure the advantageous effect of the present embodiment more surely by setting the upper limit value of Conditional Expression (7) to −0.60. Further, in order to secure the advantageous effect of the present embodiment further more surely, it is preferable to set the upper limit value of Conditional Expression (7) to −0.70, −0.80, −0.85, −0.90, −0.95, −0.98, −1.00, and more preferable to −1.05. When the lower limit value of Conditional Expression (7) is exceeded, the radius of curvature of the lens surface on the object side is short, and the magnification-variable optical system ZL is undesirably large and heavy. Meanwhile, it is possible to secure the advantageous effect of the present embodiment more surely by setting the lower limit value of Conditional Expression (7) to −3.50. Further, in order to secure the advantageous effect of the present embodiment further more surely, it is preferable to set the lower limit value of Conditional Expression (7) to −3.00, −2.50, −2.25, −2.00, −1.80, −1.65, and more preferable to −1.55.

Moreover, the magnification-variable optical system ZL according to the third embodiment desirably satisfies Conditional Expression (4) shown below.

$$100.00° < 2\omega w \tag{4}$$

In the expression, $2\omega w$: full angle of view of the magnification-variable optical system ZL in a wide-angle state.

Description of Conditional Expression (4) is as described above.

Moreover, the magnification-variable optical system ZL according to the third embodiment desirably satisfies Conditional Expression (3) shown below.

$$N1n \leq 4 \tag{3}$$

In the expression, $N1n$: the number of negative lenses included in the first lens group G1.

Description of Conditional Expression (3) is as described above.

Moreover, the magnification-variable optical system ZL according to the third embodiment desirably satisfies Conditional Expression (5) shown below.

$$nL1 < 1.70 \tag{5}$$

In the expression, $nL1$: refractive index of the medium of the lens closest to the object side in the first lens group G1 at the d line.

Description of Conditional Expression (5) is as described above.

Fourth Embodiment

A magnification-variable optical system ZL according to a fourth embodiment includes a first lens group G1 having negative refractive power, a second lens group G2 having positive refractive power, and a third lens group G3 having positive refractive power, as shown in FIG. 1. In the magnification-variable optical system ZL according to the fourth embodiment, the distance between lens groups adjacent to each other desirably changes at magnification change, and the distance between the first lens group G1 and the second lens group G2 desirably decreases at magnification change from a wide-angle state to a telescopic state. With this configuration, it is possible to achieve a magnification ratio that satisfies the present embodiment. In the magnification-variable optical system ZL according to the fourth embodiment, the second lens group G2 desirably moves to an image side wherein upon focusing from an infinite distance object to a close distance object. With this configuration, it is possible to reduce aberration variation at focusing.

In the magnification-variable optical system ZL according to the fourth embodiment, the first lens group G1 desirably includes, at a position closest to an object side, a negative meniscus lens having a convex surface facing the object side. With this configuration, it is possible to achieve both size reduction and favorable aberration correction. In addition, it is possible to reduce aberration variation at focusing or magnification change. Moreover, the present magnification-variable optical system ZL is applicable to a bright ultrawide-angle zoom lens.

Moreover, the magnification-variable optical system ZL according to the fourth embodiment desirably satisfies Conditional Expression (3A) described below.

$$N1n \leq 3 \tag{3A}$$

In the expression, $N1n$: the number of negative lenses included in the first lens group G1.

Description of Conditional Expression (3A) is the same as the above description of Conditional Expression (3).

Moreover, the magnification-variable optical system ZL according to the fourth embodiment desirably satisfies Conditional Expression (4) shown below.

$$100.00° < 2\omega w \tag{4}$$

In the expression, $2\omega w$: full angle of view of the magnification-variable optical system ZL in a wide-angle state.

Description of Conditional Expression (4) is as described above.

Fifth Embodiment

A magnification-variable optical system ZL according to a fifth embodiment includes a first lens group G1 having negative refractive power, a second lens group G2 having positive refractive power, and a third lens group G3 having positive refractive power, as shown in FIG. 1. In the magnification-variable optical system ZL according to the fifth embodiment, the distance between lens groups adjacent to each other desirably changes at magnification change, and the distance between the first lens group G1 and the second lens group G2 desirably decreases at magnification change from a wide-angle state to a telescopic state. With this configuration, it is possible to achieve a magnification ratio that satisfies the present embodiment. In the magnification-variable optical system ZL according to the fifth embodiment, the second lens group G2 desirably moves to an image side wherein upon focusing from an infinite distance object to a close distance object. With this configuration, it is possible to reduce aberration variation at focusing.

In the magnification-variable optical system ZL according to the fifth embodiment, the first lens group G1 desirably includes, at a position closest to an object side, a negative meniscus lens having a convex surface facing the object side. With this configuration, it is possible to achieve both size reduction and favorable aberration correction. In addition, it is possible to reduce aberration variation at focusing or magnification change. Moreover, the present magnification-variable optical system ZL is applicable to a bright ultrawide-angle zoom lens.

Moreover, the magnification-variable optical system ZL according to the fifth embodiment desirably satisfies Conditional Expression (5) shown below.

$$nL1<1.70 \tag{5}$$

In the expression, nL1: refractive index of the medium of the lens closest to the object side in the first lens group G1 at the d line.

Description of Conditional Expression (5) is as described above.

Sixth Embodiment

A magnification-variable optical system ZL according to a sixth embodiment includes a first lens group G1 having negative refractive power, a second lens group G2 having positive refractive power, and a third lens group G3 having positive refractive power, as shown in FIG. 1. In the magnification-variable optical system ZL according to the sixth embodiment, the distance between lens groups adjacent to each other desirably changes at magnification change, and the distance between the first lens group G1 and the second lens group G2 desirably decreases at magnification change from a wide-angle state to a telescopic state. With this configuration, it is possible to achieve a magnification ratio that satisfies the present embodiment. In the magnification-variable optical system ZL according to the sixth embodiment, the second lens group G2 desirably moves to an image side wherein upon focusing from an infinite distance object to a close distance object. With this configuration, it is possible to reduce aberration variation at focusing.

In the magnification-variable optical system ZL according to the sixth embodiment, the first lens group G1 desirably includes, at a position closest to an object side, a negative meniscus lens having a convex surface facing the object side. With this configuration, it is possible to achieve both size reduction and favorable aberration correction. In addition, it is possible to reduce aberration variation at focusing or magnification change. Moreover, the present magnification-variable optical system ZL is applicable to a bright ultrawide-angle zoom lens.

Moreover, the magnification-variable optical system ZL according to the sixth embodiment desirably satisfies Conditional Expression (8) shown below.

$$59.00<(\Sigma v1n)/N1n \tag{8}$$

In the expression,

N1$n$: the number of negative lenses included in the first lens group G1, and $\Sigma$v1n: sum of the Abbe number of the medium of each negative lens included in the first lens group G1 at the d line.

Conditional Expression (8) defines the ratio of the sum of Abbe numbers relative to the number of negative lenses included in the first lens group G1. When Conditional Expression (8) is satisfied, it is possible to favorably correct chromatic aberration in the entire zoom range by selecting a low dispersive medium as the medium (glass material) of each lens, while simultaneously reducing the number of lenses in the first lens group G1 to achieve size and weight reduction. Meanwhile, it is possible to secure the advantageous effect of the present embodiment more surely by setting the lower limit value of Conditional Expression (8) to 60.00. Further, in order to secure the advantageous effect of the present embodiment further more surely, it is preferable to set the lower limit value of Conditional Expression (8) to 60.50, 61.00, 61.50, 61.80, and more preferable to 62.00.

Moreover, the magnification-variable optical system ZL according to the sixth embodiment desirably satisfies Conditional Expression (9) shown below.

$$100.00<(\Sigma(v1n\times f1n))/(N1n\times f1) \tag{9}$$

In the expression,

N1n: the number of negative lenses included in the first lens group G1, f1: focal length of the first lens group G1, and $\Sigma$ (v1n×f1n): sum of the product of the Abbe number v1n of the medium of each negative lens included in the first lens group G1 at the d line and a focal length fn of the lens.

Conditional Expression (9) defines an appropriate relation between the focal length of the first lens group G1 and the ratio of the sum of Abbe numbers relative to the number of negative lenses included in the first lens group G1. When Conditional Expression (9) is satisfied, it is possible to achieve size and weight reduction by reducing the number of lenses in the first lens group G1, obtain appropriate refractive power (power) of the first lens group G1, and favorably correct chromatic aberration in the entire zoom range by selecting a low dispersive medium (glass material). Meanwhile, it is possible to secure the advantageous effect of the present embodiment more surely by setting the lower limit value of Conditional Expression (9) to 105.00. Further, in order to secure the advantageous effect of the present embodiment further more surely, it is preferable to set the lower limit value of Conditional Expression (9) to 110.00, 115.00, 118.00, 120.00, 123.00, and more preferable to 125.00.

The magnification-variable optical system ZL according to any of the first to sixth embodiments desirably satisfies Conditional Expression (10) shown below.

$$1.20<Bfw/fw<4.00 \tag{10}$$

In the expression, fw: focal length of the magnification-variable optical system ZL in the wide-angle state, and Bfw: back focus of the magnification-variable optical system ZL in the wide-angle state.

Conditional Expression (10) defines the ratio of the back focus relative to the overall focal length in the wide-angle state. When Conditional Expression (10) is satisfied, it is possible to achieve both size reduction and favorable aberration correction. When the upper limit value of Conditional Expression (10) is exceeded, the back focus is undesirably too long, which makes it difficult to achieve size reduction of the present magnification-variable optical system ZL. Meanwhile, it is possible to secure the advantageous effect of the present embodiment more surely by setting the upper limit value of Conditional Expression (10) to 3.50. Further, in order to secure the advantageous effect of the present embodiment further more surely, it is preferable to set the upper limit value of Conditional Expression (10) to 3.30, 3.00, 2.90, 2.80, 2.75, and more preferable to 2.72. When the lower limit value of Conditional Expression (10) is exceeded, the distance from an image plane to an exit pupil is undesirably too short, which is disadvantage for aberration correction and acquisition of ambient light quantity. Meanwhile, it is possible to secure the advantageous effect of the present embodiment more surely by setting the lower limit value of Conditional Expression (10) to 1.25. Further, in order to secure the advantageous effect of the present embodiment further more surely, it is preferable to set the lower limit value of Conditional Expression (10) to 1.30, 1.35, 1.40, 1.45, 1.50, 1.55, and more preferable to 1.60.

The magnification-variable optical system ZL according to any of the first to sixth embodiments desirably satisfies Conditional Expression (11) shown below.

$$0.40 < STLw/TLw < 0.70 \quad (11)$$

In the expression,
TLw: total length of the magnification-variable optical system ZL in the wide-angle state, and
STLw: distance from the lens surface closest to the object side to an aperture stop along an optical axis in the magnification-variable optical system ZL in the wide-angle state.

Conditional Expression (11) defines the ratio of the total length of the optical system and an aperture position in the wide-angle state. When Conditional Expression (11) is satisfied, it is possible to achieve both size reduction and favorable aberration correction. When the upper limit value of Conditional Expression (11) is exceeded, the distance from the lens surface closest to the object side to an entrance pupil is undesirably long, which makes it difficult to correct distortion and curvature of field. Meanwhile, it is possible to secure the advantageous effect of the present embodiment more surely by setting the upper limit value of Conditional Expression (11) to 0.68. Further, in order to secure the advantageous effect of the present embodiment further more surely, it is preferable to set the upper limit value of Conditional Expression (11) to 0.65, 0.64, 0.63, 0.62, 0.61, and more preferable to 0.58. When the lower limit value of Conditional Expression (11) is exceeded, the distance from the image plane to the exit pupil is undesirably long, which leads to increase of the total length of the optical system. Meanwhile, it is possible to secure the advantageous effect of the present embodiment more surely by setting the lower limit value of Conditional Expression (11) to 0.43. Further, in order to secure the advantageous effect of the present embodiment further more surely, it is preferable to set the lower limit value of Conditional Expression (11) to 0.45, 0.46, 0.47, 0.48, and more preferable to 0.49.

The magnification-variable optical system ZL according to any of the first to sixth embodiments desirably satisfies Conditional Expression (12) shown below.

$$1.00 < (-f1)/fw < 2.00 \quad (12)$$

In the expression,
fw: focal length of the magnification-variable optical system ZL in the wide-angle state, and
f1: focal length of the first lens group G1.

Conditional Expression (12) defines the ratio of the focal length of the first lens group G1 relative to the overall focal length in the wide-angle state. When Conditional Expression (12) is satisfied, it is possible to determine the refractive power (power) of the first lens group G1 for achieving both size reduction and high performance. When the upper limit value of Conditional Expression (12) is exceeded, the refractive power of the first lens group G1 is undesirably too weak, which leads to size increase of lenses. Meanwhile, it is possible to secure the advantageous effect of the present embodiment more surely by setting the upper limit value of Conditional Expression (12) to 1.90. Further, in order to secure the advantageous effect of the present embodiment further more surely, it is preferable to set the upper limit value of Conditional Expression (12) to 1.80, 1.70, 1.65, 1.63, 1.60, and more preferable to 1.59. When the lower limit value of Conditional Expression (12) is exceeded, the refractive power of the first lens group G1 is undesirably too strong, which prevents favorable aberration correction. Meanwhile, it is possible to secure the advantageous effect of the present embodiment more surely by setting the lower limit value of Conditional Expression (12) to 1.10. Further, in order to secure the advantageous effect of the present embodiment further more surely, it is preferable to set the lower limit value of Conditional Expression (12) to 1.20, 1.25, 1.30, 1.35, 1.38, 1.40, and more preferable to 1.42.

The magnification-variable optical system ZL according to any of the first to sixth embodiments desirably satisfies Conditional Expression (13) shown below.

$$0.65 < (-f1)/ft < 1.20 \quad (13)$$

In the expression,
ft: focal length of the magnification-variable optical system ZL in the telescopic state, and
f1: focal length of the first lens group G1.

Conditional Expression (13) defines the ratio of the focal length of the first lens group G1 relative to the overall focal length in the telescopic state. When Conditional Expression (13) is satisfied, it is possible to determine the refractive power (power) of the first lens group G1 for achieving both size reduction and high performance. When the upper limit value of Conditional Expression (13) is exceeded, the refractive power of the first lens group G1 is undesirably too weak, which leads to size increase of lenses. Meanwhile, it is possible to secure the advantageous effect of the present embodiment more surely by setting the upper limit value of Conditional Expression (13) to 1.15. Further, in order to secure the advantageous effect of the present embodiment further more surely, it is preferable to set the upper limit value of Conditional Expression (13) to 1.10, 1.08, 1.05, 1.03, and more preferable to 1.00. When the lower limit value of Conditional Expression (13) is exceeded, the magnification ratio is undesirably too large, which prevents favorable aberration correction. Meanwhile, it is possible to secure the advantageous effect of the present embodiment more surely by setting the lower limit value of Conditional Expression (13) to 0.70. Further, in order to secure the advantageous effect of the present embodiment further more surely, it is preferable to set the lower limit value of Conditional Expression (13) to 0.75, 0.78, 0.80, 0.83, 0.85, and more preferable to 0.87.

The magnification-variable optical system ZL according to any of the first to sixth embodiments desirably satisfies Conditional Expression (14) shown below.

$$1.00 < fL1/f1 < 2.00 \quad (14)$$

In the expression,
f1: focal length of the first lens group G1, and
fL1: focal length of the lens closest to the object side in the first lens group G1.

Conditional Expression (14) defines the ratio of the focal length of the first lens group G1 and the focal length of the lens closest to the object side in the first lens group G1. When Conditional Expression (14) is satisfied, it is possible to achieve both size reduction and favorable aberration correction. When the upper limit value of Conditional Expression (14) is exceeded, the refractive power (power) of the lens closest to the object side in the first lens group G1 is undesirably too weak, which leads to size increase of the magnification-variable optical system ZL and decrease of ambient light quantity. Meanwhile, it is possible to secure the advantageous effect of the present embodiment more surely by setting the upper limit value of Conditional Expression (14) to 1.90. Further, in order to secure the advantageous effect of the present embodiment further more surely, it is preferable to set the upper limit value of Conditional Expression (14) to 1.80, 1.75, 1.70, 1.65, 1.60, and more preferable to 1.59. When the lower limit value of Conditional Expression (14) is exceeded, the refractive power (power) of the lens closest to the object side in the first lens group G1 is undesirably too strong, which makes it difficult to correct coma aberration and curvature of field. Meanwhile, it is possible to secure the advantageous effect of the present embodiment more surely by setting the lower limit value of Conditional Expression (14) to 1.05. Further, in order to secure the advantageous effect of the present embodiment further more surely, it is preferable to set the lower limit value of Conditional Expression (14) to 1.10, 1.15, 1.20, 1.25, 1.28, and more preferable to 1.30.

The magnification-variable optical system ZL according to any of the first to sixth embodiments desirably satisfies Conditional Expression (15) shown below.

$$1.00 < fL2/f1 < 4.00 \quad (15)$$

In the expression,
f1: focal length of the first lens group G1, and
fL2: focal length of the lens second closest to the object side in the first lens group G1.

Conditional Expression (15) defines the ratio of the focal length of the first lens group G1 and the focal length of the lens second closest to the object side in the first lens group G1. When Conditional Expression (15) is satisfied, it is possible to achieve both size reduction and favorable aberration correction. When the upper limit value of Conditional Expression (15) is exceeded, the refractive power (power) of the lens second closest to the object side in the first lens group G1 is undesirably too weak, which is not suitable for correction of curvature of field or the like. Meanwhile, it is possible to secure the advantageous effect of the present embodiment more surely by setting the upper limit value of Conditional Expression (15) to 3.85. Further, in order to secure the advantageous effect of the present embodiment further more surely, it is preferable to set the upper limit value of Conditional Expression (15) to 3.60, 3.50, 3.45, 3.40, 3.35, and more preferable to 3.30. When the lower limit value of Conditional Expression (15) is exceeded, the refractive power (power) of the lens second closest to the object side in the first lens group G1 is undesirably too strong, which makes it difficult to correct spherical aberration or coma aberration. Meanwhile, it is possible to secure the advantageous effect of the present embodiment more surely by setting the lower limit value of Conditional Expression (15) to 1.10. Further, in order to secure the advantageous effect of the present embodiment further more surely, it is preferable to set the lower limit value of Conditional Expression (15) to 1.20, 1.50, 1.70, 1.80, 1.90, 2.00, and more preferable to 2.10.

The magnification-variable optical system ZL according to any of the first to sixth embodiments desirably satisfies Conditional Expression (16) shown below.

$$3.50 < TLw/Bfw < 8.00 \quad (16)$$

In the expression,
Bfw: back focus of the magnification-variable optical system ZL in the wide-angle state, and
TLw: total length of the magnification-variable optical system ZL in the wide-angle state.

Conditional Expression (16) defines the ratio of the back focus and the total length of the optical system in the wide-angle state. When Conditional Expression (16) is satisfied, it is possible to achieve both size reduction and favorable aberration correction. When the upper limit value of Conditional Expression (16) is exceeded, the total length of the optical system is undesirably too long or the back focus is undesirably too short. Meanwhile, it is possible to secure the advantageous effect of the present embodiment more surely by setting the upper limit value of Conditional Expression (16) to 7.80. Further, in order to secure the advantageous effect of the present embodiment further more surely, it is preferable to set the upper limit value of Conditional Expression (16) to 7.50, 7.25, 7.00, 6.90, 6.80, 6.75, 6.70, 6.65, and more preferable to 6.50. When the lower limit value of Conditional Expression (16) is exceeded, the total length of the optical system is undesirably too short, which makes it difficult to achieve favorable aberration correction. Meanwhile, it is possible to secure the advantageous effect of the present embodiment more surely by setting the lower limit value of Conditional Expression (16) to 3.65. Further, in order to secure the advantageous effect of the present embodiment further more surely, it is preferable to set the lower limit value of Conditional Expression (16) to 3.75, 3.80, 3.85, 3.90, 3.95, and more preferable to 4.00.

In the magnification-variable optical system ZL according to any of the first to third embodiments, the first lens group G1 desirably includes, at a position closest to the object side, a negative meniscus lens having a convex surface facing the object side. With this configuration, it is possible to achieve both size reduction and favorable aberration correction. In addition, it is possible to reduce aberration variation at focusing or magnification change. Moreover, the present magnification-variable optical system ZL is applicable to a bright ultrawide-angle zoom lens.

The magnification-variable optical system ZL according to any of the first, second, and fourth to sixth embodiments desirably satisfies Conditional Expression (7) shown below.

$$-4.00 < (L1r2+L1r1)/(L1r2-L1r1) < -0.50 \quad (7)$$

In the expression,
L1r1: radius of curvature of the lens surface of the lens closest to the object side in the first lens group G1, the lens surface being on the object side, and
L1r2: radius of curvature of the lens surface of the lens closest to the object side in the first lens group G1, the lens surface being on the image side.

Description of Conditional Expression (7) is as described above.

In the magnification-variable optical system ZL according to any of the first to sixth embodiments, the first lens group G1 desirably includes at least two lenses and desirably satisfies Conditional Expression (17) shown below.

$$-4.00 < (L2r2+L2r1)/(L2r2-L2r1) < -0.50 \quad (17)$$

In the expression,
L2r1: radius of curvature of a lens surface of the lens second closest to the object side in the first lens group G1, the lens surface being on the object side, and
L2r2: radius of curvature of a lens surface of the lens second closest to the object side in the first lens group G1, the lens surface being on the image side.

Conditional Expression (17) defines the shape of the lens second closest to the object side in the first lens group G1. When Conditional Expression (17) is satisfied, the lens second closest to the object side in the first lens group G1 is a negative meniscus lens having a convex surface facing the object side, and thus it is possible to favorably perform aberration correction. When the upper limit value of Conditional Expression (17) is exceeded, it is undesirably difficult to correct coma aberration. Meanwhile, it is possible to secure the advantageous effect of the present embodiment more surely by setting the upper limit value of Conditional Expression (17) to −0.60. Further, in order to secure the advantageous effect of the present embodiment further more surely, it is preferable to set the upper limit value of Conditional Expression (17) to −0.70, −0.75, −0.80, −0.85, −0.90, −0.95, −1.00, and more preferable to −1.05. When the lower limit value of Conditional Expression (17) is exceeded, it is undesirably difficult to correct curvature of field. Meanwhile, it is possible to secure the advantageous effect of the present embodiment more surely by setting the lower limit value of Conditional Expression (17) to −3.90. Further, in order to secure the advantageous effect of the present embodiment further more surely, it is preferable to set the lower limit value of Conditional Expression (17) to −3.80, −3.70, −3.60, −3.50, −3.40, −3.30, and more preferable to −3.25.

In the magnification-variable optical system ZL according to any of the first to sixth embodiments, the first lens group G1 desirably includes at least three lenses and desirably satisfies Conditional Expression (18) shown below.

$$-0.80<(L3r2+L3r1)/(L3r2-L3r1)<0.80 \quad (18)$$

In the expression,

L3r1: radius of curvature of a lens surface of a lens third closest to the object side in the first lens group G1, the lens surface being on the object side, and L3r2: radius of curvature of a lens surface of the lens third closest to the object side in the first lens group G1, the lens surface being on the image side.

Conditional Expression (18) defines the shape of the lens third closest to the object side in the first lens group G1. When Conditional Expression (18) is satisfied, the lens third closest to the object side in the first lens group G1 is a biconcave negative lens, and thus it is possible to favorably perform aberration correction. When the upper limit value of Conditional Expression (18) is exceeded, it is undesirably difficult to correct coma aberration. Meanwhile, it is possible to secure the advantageous effect of the present embodiment more surely by setting the upper limit value of Conditional Expression (18) to 0.70. Further, in order to secure the advantageous effect of the present embodiment further more surely, it is preferable to set the upper limit value of Conditional Expression (18) to 0.60, 0.50, 0.45, 0.40, 0.35, 0.30, and more preferable to 0.28. When the lower limit value of Conditional Expression (18) is exceeded, it is undesirably difficult to correct coma aberration. Meanwhile, it is possible to secure the advantageous effect of the present embodiment more surely by setting the lower limit value of Conditional Expression (18) to −0.70. Further, in order to secure the advantageous effect of the present embodiment further more surely, it is preferable to set the lower limit value of Conditional Expression (18) to −0.60, −0.50, −0.45, −0.40, −0.35, −0.30, and more preferable to −0.28.

In the magnification-variable optical system ZL according to any of the first to sixth embodiments, the first lens group G1 desirably moves in an optical axis direction at magnification change. With this configuration, it is possible to reduce aberration variation at magnification change.

In the magnification-variable optical system ZL according to any of the first to sixth embodiments, the first lens group G1 is desirably formed of, sequentially from the object side, a negative lens, a negative lens, a negative lens, and a positive lens. With this configuration, it is possible to favorably correct a variety of aberrations, in particular, distortion and curvature of field. In the first lens group G1, the negative lens, the negative lens, the negative lens, and the positive lens may be each disposed as a single lens, or any lenses adjacent to each other may be cemented as a cemented lens.

In the magnification-variable optical system ZL according to any of the first to third embodiments, part of the rear group GR desirably moves to the image side wherein upon focusing from an infinite distance object to a close distance object. With this configuration, it is possible to reduce aberration variation at focusing.

In the magnification-variable optical system ZL according to any of the first to third embodiments, the rear group GR desirably includes the second lens group G2 having positive refractive power and the third lens group G3 having negative refractive power, and the second lens group G2 desirably moves to the image side wherein upon focusing from an infinite distance object to a close distance object. With this configuration, it is possible to reduce aberration variation at focusing.

The magnification-variable optical system ZL according to any of the first to sixth embodiments desirably includes at least one lens group on the image side of the third lens group G3. With this configuration, it is possible to favorably correct a variety of aberrations such as coma aberration at magnification change.

In the magnification-variable optical system ZL according to any of the first to sixth embodiments, the rear group GR (or the second lens group G2 and any following lens group) desirably includes one or more aspheric surfaces. With this configuration, it is possible to favorably correct a variety of aberrations, in particular, curvature of field.

In the magnification-variable optical system ZL according to any of the first to sixth embodiments, the rear group GR (or the second lens group G2 and any following lens group) desirably includes one or more lenses that satisfies Conditional Expression (19) below (this lens is referred to as a "specific lens").

$$66.50<vr \quad (19)$$

In the expression, vr: Abbe number of the medium of each lens included in the rear group GR at the d line.

Conditional Expression (19) defines the Abbe number of the medium of each specific lens included in the rear group GR (or the second lens group G2 and any following lens group) at the d line. When the rear group GR includes one or more lenses (specific lens) that satisfy Conditional Expression (19), it is possible to favorably correct lateral chromatic aberration. Meanwhile, it is possible to secure the advantageous effect of the present embodiment more surely by setting the lower limit value of Conditional Expression (19) to 67.00. Further, in order to secure the advantageous effect of the present embodiment further more surely, it is preferable to set the lower limit value of Conditional Expression (19) to 67.50, 68.00, 70.00, 74.00, 78.00, 80.00, and more preferable to 81.00.

The magnification-variable optical system ZL according to any of the first to sixth embodiments desirably satisfies Conditional Expression (20) shown below.

$$Fnow<4.20 \quad (20)$$

In the expression,

Fnow: maximum aperture of the magnification-variable optical system ZL at focusing on an object at infinity in the wide-angle state.

Conditional Expression (20) defines the maximum aperture of the magnification-variable optical system ZL at focusing on an object at infinity in the wide-angle state.

When Conditional Expression (20) is satisfied, it is possible to achieve a favorable resolution that satisfies the present embodiment in the wide-angle state. Meanwhile, it is possible to secure the advantageous effect of the present embodiment more surely by setting the lower limit value of Conditional Expression (20) to 4.05. Further, in order to secure the advantageous effect of the present embodiment further more surely, it is preferable to set the lower limit value of Conditional Expression (20) to 4.00, 3.80, 3.60, 3.40, 3.20, 3.00, and more preferable to 2.95.

The magnification-variable optical system ZL according to any of the first to sixth embodiments desirably satisfies Conditional Expression (21) shown below.

$$Fnot<6.00 \tag{21}$$

In the expression,

Fnot: maximum aperture of the magnification-variable optical system ZL at focusing on an object at infinity in the telescopic state.

Conditional Expression (21) defines the maximum aperture of the magnification-variable optical system ZL at focusing on an object at infinity in the telescopic state. When Conditional Expression (21) is satisfied, it is possible to achieve a favorable resolution that satisfies the present embodiment in the telescopic state. Meanwhile, it is possible to secure the advantageous effect of the present embodiment more surely by setting the lower limit value of Conditional Expression (21) to 5.50. Further, in order to secure the advantageous effect of the present embodiment further more surely, it is preferable to set the lower limit value of Conditional Expression (21) to 5.30, 5.00, 4.80, 4.50, 4.05, 4.00, 3.80, 3.60, 3.40, 3.20, 3.00, and more preferable to 2.95.

The magnification-variable optical system ZL according to any of the first to sixth embodiments may include a filter on the object side of the first lens group G1. When a filter is disposed on the object side of the first lens group G1, the filter does not increase in size, and thus it is possible to achieve size reduction of the entire magnification-variable optical system ZL.

A camera that is an optical apparatus including the magnification-variable optical system ZL according to any of the first to sixth embodiments will be described next with reference to FIG. 21. This camera 1 is what is called a mirrorless camera that allows lens exchange and includes the magnification-variable optical system ZL according to the present embodiment as an imaging lens 2. In the present camera 1, light from an object (subject) that is not shown is collected by the imaging lens 2 to form a subject image on an image capturing plane of an image unit 3 via an optical low pass filter (OLPF) that is not shown. A photoelectric converter provided in the image unit 3 photoelectrically converts the subject image into an electrical form. An image of the subject is thus produced. The image is displayed on an electronic view finder (EVF) 4 provided on the camera 1. A photographer can thus observe the subject on the EVF 4.

When the photographer presses a release button that is not shown, the image photoelectrically converted by the image unit 3 is stored in a memory that is not shown. The photographer can thus capture an image of the subject via the present camera 1. The present embodiment has been described with reference to a mirrorless camera. The same effects as those provided by the camera 1 described above can be provided even in a case where the magnification-variable optical system ZL according to the present embodiment is incorporated in a single lens reflex camera that includes a quick-return mirror and allows the photographer to observe a subject through a finder optical system.

In this manner, when the magnification-variable optical system ZL configured as described above is provided in an optical apparatus according to the present embodiment, it is possible to achieve an optical apparatus that has a small size and a wide angle of view and can favorably reduce aberration variation at magnification change and focusing.

The contents described below are employable as appropriate to the extent that the optical performance is not compromised.

In the present embodiment, the magnification-variable optical system ZL having two- to five-group configuration has been shown, and the configuration conditions and others described above are also applicable to a six-group configuration, a seven-group configuration, and other group configurations. Further, the magnification-variable optical system ZL may instead have a configuration in which a lens or a lens group closest to the object side is added or a configuration in which a lens or a lens group closest to the image side is added. The lens group represents a portion including at least one lens separated from another by an air space that changes at magnification change.

A focusing lens group may be a single lens group, a plurality of lens groups, or a partial lens group moved in the optical axis direction to focus upon from an infinite distance object to a close distance object. In this case, the focusing lens group can also be used to perform autofocusing and is suitably driven with a motor for autofocusing (such as an ultrasonic motor). In particular, it is preferable that the focusing lens group is at least part (for example, the second lens group G2) of the rear group GR as described above.

An anti-vibration lens group may be a lens group or a partial lens group so moved as to have a component in a direction perpendicular to the optical axis or rotated (swung) in an in-plane direction containing the optical axis to correct an image blur caused by a shake of a hand. In particular, it is preferable that the anti-vibration lens group is at least part (for example, the fourth lens group G4) of the rear group GR.

A lens surface may be so formed as to be a spherical surface, a flat surface, or an aspheric surface. In the case where a lens surface is a spherical or flat surface, the lens is readily processed, assembled, and adjusted, whereby degradation in the optical performance due to errors in the lens processing, assembly, and adjustment is preferably avoided. Further, even when an image plane is shifted, the amount of degradation in drawing performance is preferably small. In the case where the lens surface is an aspheric surface, the aspheric surface may be any of a ground aspheric surface, a glass molded aspheric surface that is a glass surface so molded in a die as to have an aspheric shape, and a composite aspheric surface that is a glass surface on which aspherically shaped resin is formed. The lens surface may instead be a diffractive surface, or the lenses may be any of a distributed index lens (GRIN lens) or a plastic lens.

An aperture stop S is preferably disposed in the rear group GR (for example, near the third lens group G3 (on the image side of the third lens group G3 or in the third lens group G3)). Instead, no member as the aperture stop may be provided, and the frame of a lens may serve as the aperture stop.

Further, each lens surface may be provided with an antireflection film having high transmittance over a wide wavelength range to achieve good optical performance that reduces flare and ghost and achieves high contrast.

The magnification-variable optical system ZL of the present embodiment has a magnification ratio of 1.2 to 3.0 approximately.

The configurations and conditions described above each provide the effect described above, and all the configurations and conditions are not necessarily satisfied. An optical system that satisfies any of the configurations and conditions or a combination of any of the configurations and conditions can provide the effects described above.

A method for manufacturing the magnification-variable optical system ZL according to any of the first to sixth embodiments will be schematically described below with reference to FIG. 22. First, lenses are disposed to prepare the first lens group G1 having negative refractive power and the rear group GR including at least one lens group (step S100), and these lens groups are disposed (step S200). At step S200, the first lens group G1 and the rear group GR are disposed so that the distance between lens groups adjacent to each other changes at magnification change. In this case, when the rear group GR includes the second lens group G2 having positive refractive power and the third lens group G3 having positive refractive power, the first lens group G1 and the rear group GR are disposed so that the distance between the first lens group G1 and the second lens group G2 decreases and the second lens group G2 moves to the image side wherein upon focusing from an infinite distance object to a close distance object, and a negative meniscus lens having a convex surface facing the object side is disposed at a position closest to the object side in the first lens group G1. Furthermore, the first lens group G1 and the rear group GR are disposed so that a condition expressed by above-described Condition Expressions is satisfied (step S300).

With the above-described configurations, it is possible to provide a magnification-variable optical system having a small size, a wide angle of view, and high optical performance, an optical apparatus including the magnification-variable optical system, and a method for manufacturing the magnification-variable optical system.

EXAMPLES

Examples of the present application will be described below with reference to the drawings. FIGS. 1, 3, 5, 7, 9, 11, 13, 15, 17, and 19 are cross-sectional views showing the configurations of magnification-variable optical systems ZL (ZL1 to ZL10) according to first to tenth examples and the distribution of refractive power. In lower portions of the cross-sectional views of the magnification-variable optical systems ZL1 to ZL10, directions in which the lens groups G1 to G3, G4, or G5 move along the optical axis at magnification change from a wide-angle state (W) to a telescopic state (T) are shown by arrows.

In each example, an aspheric surface is expressed by the following Expression (b).

In the expression, y represents a height in a direction perpendicular to the optical axis, S(y) represents the distance (sag amount) along the optical axis at the height y from a plane tangential to the vertex of the aspheric surface to the aspheric surface, r represents the radius of curvature (paraxial radius of curvature) of a reference spherical surface, K represents the conical constant, and An represents an n-th-order aspheric coefficient. In the following examples, "E−n" represents "×10$^{-n}$".

$$S(y)=(y^2/r)/\{1+(1-Ky^2/r^2)^{1/2}\}+A4xy^4+A6xy^6+A8x y^8+A10xy^{10}+A12xy^{12}+A14xy^{14} \quad (a)$$

In each example, the second-order aspheric coefficient A2 is zero. In a table in each example, an aspheric surface is affixed with a mark * on the right of a surface number.

First Example

FIG. 1 shows a configuration of a magnification-variable optical system ZL1 according to the first example. The magnification-variable optical system ZL1 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, a fourth lens group G4 having negative refractive power, and a fifth lens group G5 having positive refractive power.

In the magnification-variable optical system ZL1, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, a biconcave negative lens L13, and a biconvex positive lens L14. The second lens group G2 includes, sequentially from the object side, a positive meniscus lens L21 having a convex surface facing the object side, and a cemented lens formed by cementing a negative meniscus lens L22 having a convex surface facing the object side and a biconvex positive lens L23 to each other. The third lens group G3 is formed of a cemented lens formed by cementing a negative meniscus lens L31 having a convex surface facing the object side and a biconvex positive lens L32 to each other sequentially from the object side. The fourth lens group G4 includes, sequentially from the object side, a cemented lens formed by cementing a biconcave negative lens L41 and a positive meniscus lens L42 having a convex surface facing the object side to each other, and a biconvex positive lens L43. The fifth lens group G5 includes, sequentially from the object side, a cemented lens formed by cementing a biconvex positive lens L51 and a negative meniscus lens L52 having a concave surface facing the object side to each other, a cemented lens formed by cementing a negative meniscus lens L53 having a convex surface facing the object side and a biconvex positive lens L54 to each other, and an aspheric negative lens L55 having an aspheric lens surface on the image side and shaped in a negative meniscus lens having a concave surface facing the object side. A filter FL is disposed between the fifth lens group G5 and an image plane I.

In the magnification-variable optical system ZL1, at magnification change from the wide-angle state to the telescopic state, the first lens group G1 moves to the image side and the second lens group G2, the third lens group G3, the fourth lens group G4, and the fifth lens group G5 move to the object side so that the distance between the first lens group G1 and the second lens group G2 decreases, the distance between the second lens group G2 and the third lens group G3 increases, the distance between the third lens group G3 and the fourth lens group G4 increases, the distance between the fourth lens group G4 and the fifth lens group G5 decreases, and the distance (back focus) between the fifth lens group G5 and the image plane I increases. An aperture stop S is disposed between the third lens group G3 and the fourth lens group G4 and moves together with the fourth lens group G4 at magnification change.

The magnification-variable optical system ZL1 performs focusing upon from an infinite distance object to a close distance object by moving the second lens group G2 to the image side.

Table 1 below shows values of specifications of the magnification-variable optical system ZL1. In Table 1, the following specifications shown as overall specifications are defined as follows: f represents the overall focal length; FNO represents the F number, 2ω represents the full angle of view; Ymax represents the maximum image height; TL represents the total length of the optical system; and Bf represents the back focus. The total length of the optical system TL represents the distance along the optical axis from a first surface of a lens surface at focusing on an object at infinity to the image plane I. The back focus Bf represents the distance along the optical axis from a lens surface (the thirty-second surface in FIG. 1) closest to the image side to the image plane I. In the lens data, a first field m shows the sequence of the lens surfaces (surface numbers) counted from the object side in a direction in which the rays travel. A second field r shows the radius of curvature of each lens surface. A third field d shows an on-axis distance (inter-surface distance) from each optical surface to the following optical surface. A fourth field nd and a fifth field vd show the refractive index and the Abbe number at the d line (λ=587.6 nm). A radius of curvature of 0.0000 represents a flat surface, the refractive index of air, which is 1.000000, is omitted. The lens group focal length shows the first surface and the focal length of each of the first to fifth lens groups G1 to G5.

The unit of each of the focal length f, the radius of curvature r, the inter-surface distance d, and other lengths shown in all the variety of specifications below is typically "mm", but not limited to this, because an optical system provides the same optical performance even when the optical system is proportionally enlarged or reduced. Further, the description of the reference characters and the description of the specification tables hold true for those in the following examples.

In Table 1, the eighteenth surface corresponds to the aperture stop S, and the ninth surface, the twenty-fourth surface, and the thirty-third surface correspond to virtual surfaces. An auxiliary aperture may be disposed at the twenty-fourth surface.

In a case in which a filter is disposed on the object side in the magnification-variable optical system ZL1, the filter is disposed at a position separated by 6.10 mm on the object side from the first surface.

TABLE 1

First example

[Overall specifications]

| | Wide-angle state | | Intermediate focal-length state | | | | Telescopic state |
|---|---|---|---|---|---|---|---|
| f = | 14.400 | to | 18.000 | to | 20.000 | to | 23.300 |
| FNO = | 2.91 | to | 2.91 | to | 2.91 | to | 2.91 |
| 2ω (°) = | 114.737 | to | 100.340 | to | 93.766 | to | 84.519 |

TABLE 1-continued

First example

| | | | | | | |
|---|---|---|---|---|---|---|
| Ymax = | 21.600 | to | 21.600 | to 21.600 | to | 21.600 |
| TL (air equivalent length) = | 161.247 | to | 157.019 | to 156.182 | to | 155.795 |
| Bf (air equivalent length) = | 38.106 | to | 43.995 | to 47.450 | to | 53.389 |

[Lens data]

| m | r | d | nd | vd |
|---|---|---|---|---|
| Object plane | ∞ | | | |
| 1* | 220.0000 | 3.2000 | 1.588870 | 61.13 |
| 2* | 17.8900 | 12.8517 | | |
| 3 | 129.4201 | 2.0000 | 1.820980 | 42.50 |
| 4* | 32.1806 | 10.9734 | | |
| 5 | −45.0029 | 1.7000 | 1.433848 | 95.23 |
| 6 | 53.1259 | 1.1806 | | |
| 7 | 46.0796 | 5.3284 | 1.834000 | 37.18 |
| 8 | −278.7554 | d8 | | |
| 9 | 0.0000 | d9 | | |
| 10 | 40.5745 | 2.8000 | 1.698950 | 30.13 |
| 11 | 289.5688 | 0.2000 | | |
| 12 | 85.2105 | 1.1000 | 1.963000 | 24.11 |
| 13 | 19.6402 | 5.0000 | 1.688930 | 31.16 |
| 14 | −402.4157 | d14 | | |
| 15 | 136.9524 | 1.1000 | 1.834810 | 42.73 |
| 16 | 39.2521 | 5.0000 | 1.516800 | 64.13 |
| 17 | −33.8194 | d17 | | |
| 18 | 0.0000 | 4.3181 | | Aperture stop S |
| 19 | −29.4115 | 1.1000 | 1.953750 | 32.33 |
| 20 | 26.8911 | 3.7000 | 1.846660 | 23.80 |
| 21 | 28206.6500 | 0.2000 | | |
| 22 | 60.6032 | 2.7000 | 1.846660 | 23.80 |
| 23 | −199.9962 | 1.5000 | | |
| 24 | 0.0000 | d24 | | |
| 25 | 27.2496 | 8.6000 | 1.497820 | 82.57 |
| 26 | −22.2560 | 1.2000 | 1.834000 | 37.18 |
| 27 | −31.7894 | 0.2000 | | |
| 28 | 304.4905 | 1.2000 | 1.834000 | 37.18 |
| 29 | 22.3340 | 6.9000 | 1.497820 | 82.57 |
| 30 | −74.7302 | 1.1469 | | |
| 31 | −66.1084 | 1.6000 | 1.860999 | 37.10 |
| 32* | −70.6675 | d32 | | |
| 33 | 0.0000 | 35.2000 | | |
| 34 | 0.0000 | 2.0000 | 1.516800 | 64.13 |
| 35 | 0.0000 | 1.2329 | | |
| Image plane | ∞ | | | |

[Focal length of lens groups]

| Lens group | First surface | Focal length |
|---|---|---|
| First lens group | 1 | −21.147 |
| Second lens group | 10 | 68.510 |
| Third lens group | 15 | 87.743 |
| Fourth lens group | 19 | −76.490 |
| Fifth lens group | 25 | 46.500 |

In the magnification-variable optical system ZL1, the first surface, the second surface, the fourth surface, and the thirty-second surface have aspheric lens surfaces. Table 2 below shows data of the aspheric surfaces of the respective surfaces, in other words, the values of the conical constant K and the aspheric coefficients A4 to A12.

TABLE 2

[Data on aspherical surface]

| | |
|---|---|
| First surface | K = 1.0000 |
| | A4 = 1.21050E−05   A6 = −1.90441E−08   A8 = 2.08981E−11 |
| | A10 = −1.26480E−14   A12 = 3.59780E−18   A14 = 0.00000E+00 |
| Second surface | K = 0.0000 |
| | A4 = 5.30134E−06   A6 = 1.33691E−08   A8 = −2.53693E−11 |
| | A10 = −2.12112E−13   A12 = 3.35890E−16   A14 = 0.00000E+00 |
| Fourth surface | K = 2.0000 |
| | A4 = 1.46984E−05   A6 = 6.92202E−09   A8 = −3.91814E−11 |
| | A10 = 7.84867E−13   A12 = −1.29570E−15   A14 = 0.00000E+00 |
| Thirty-second surface | K = 1.0000 |
| | A4 = 1.34572E−05   A6 = 1.92171E−08   A8 = 1.11927E−10 |
| | A10 = −3.98100E−13   A12 = 1.67540E−15   A14 = 0.00000E+00 |

In the magnification-variable optical system ZL1, on-axis air spaces d8 and d9 between the first lens group G1 and the second lens group G2, an on-axis air space d14 between the second lens group G2 and the third lens group G3, an on-axis air space d17 between the third lens group G3 and the fourth lens group G4, an on-axis air space d24 between the fourth lens group G4 and the fifth lens group G5, and an on-axis air space d32 between the fifth lens group G5 and the filter FL change at magnification change and focusing. Table 3 below shows the values of variable distances at focal lengths in the wide-angle state, the intermediate focal-length state, and the telescopic state at each of focusing on an object at infinity, focusing on an object at a close distance, and focusing on an object at the closest distance. In Table 3, f represents the focal length, β represents the magnification, and d0 represents the distance from the first surface to an object. The description also holds true for the following examples.

TABLE 3

[Variable distance data]

| | Wide-angle state | Intermediate focal-length state | | Telescopic state |
|---|---|---|---|---|
| -Focusing on an object at infinity- | | | | |
| f | 14.400 | 18.000 | 20.000 | 23.300 |
| d0 | ∞ | ∞ | ∞ | ∞ |
| d8 | 23.7380 | 12.2188 | 7.5200 | 1.5000 |
| d9 | 0.0000 | 0.0000 | 0.0000 | 0.0000 |
| d14 | 4.7891 | 8.6308 | 9.6629 | 9.6567 |
| d17 | 1.5000 | 2.9738 | 3.6783 | 4.4505 |
| d24 | 6.3147 | 2.4012 | 1.0722 | 0.0000 |
| d32 | 0.5000 | 6.3712 | 9.8216 | 15.7968 |
| -Focusing on an object at a close distance- | | | | |
| β | −0.025 | −0.025 | −0.025 | −0.025 |
| d0 | 543.6970 | 688.7637 | 769.2222 | 901.8471 |
| d8 | 23.7380 | 12.2188 | 7.5200 | 1.5000 |
| d9 | 0.8063 | 0.6504 | 0.5966 | 0.5323 |
| d14 | 3.9828 | 7.9804 | 9.0662 | 9.1244 |
| d17 | 1.5000 | 2.9738 | 3.6783 | 4.4505 |
| d24 | 6.3147 | 2.4012 | 1.0722 | 0.0000 |
| d32 | 0.5000 | 6.3712 | 9.8216 | 15.7968 |
| -Focusing on an object at the closest distance- | | | | |
| β | −0.104 | −0.128 | −0.141 | −0.165 |
| d0 | 111.9714 | 116.1994 | 117.0364 | 117.4232 |
| d8 | 23.7380 | 12.2188 | 7.5200 | 1.5000 |
| d9 | 3.2248 | 3.1636 | 3.2073 | 3.3250 |
| d14 | 1.5643 | 5.4672 | 6.4555 | 6.3318 |
| d17 | 1.5000 | 2.9738 | 3.6783 | 4.4505 |
| d24 | 6.3147 | 2.4012 | 1.0722 | 0.0000 |
| d32 | 0.5000 | 6.3712 | 9.8216 | 15.7968 |

Table 4 below shows values compliant to the condition expressions in the magnification-variable optical system ZL1. In the magnification-variable optical system ZL1, the specific negative lens is the biconcave negative lens L13, and the specific lens is each of the biconvex positive lens L51 and the biconvex positive lens L54.

TABLE 4

| |
|---|
| $\Sigma \nu 1n$ = 198.86 |
| $\Sigma (\nu 1n \times f1n)$ = −9591.491 |
| STLw = 82.461 |
| fL1 = −33.265 |
| fL2 = −52.658 |

[Values compliant to conditional expressions]

| |
|---|
| (1) $\nu 1n$ = 95.23 |
| (2) nL2/nL1 = 1.146 |
| (3) N1n = 3 |
| (4) 2ωw = 114.737° |
| (5) nL1 = 1.589 |
| (6) fw × (−f1)/Fnow = 106.475 mm² |
| (7) (L1r2 + L1r1)/(L1r2 − L1r1) = −1.177 |
| (8) ($\Sigma \nu 1n$)/N1n = 66.287 |
| (9) ($\Sigma (\nu 1n \times f1n)$)/(N1n × f1) = 148.588 |
| (10) Bfw/fw = 2.646 |
| (11) STLw/TLw = 0.511 |
| (12) (−f1)/fw = 1.494 |
| (13) (−f1)/ft = 0.923 |
| (14) fL1/f1 = 1.546 |
| (15) fL2/f1 = 2.447 |
| (16) TLw/Bfw = 4.232 |
| (17) (L2r2 + L2r1)/(L2r2 − L2r1) = −1.662 |
| (18) (L3r2 + L3r1)/(L3r2 − L3r1) = 0.083 |
| (19) $\nu r$ = 82.57 |
| (20) Fnow = 2.91 |
| (21) Fnot = 2.91 |

As described above, the magnification-variable optical system ZL1 satisfies all Conditional Expressions (1) to (21) described above.

FIG. 2 shows a variety of aberration diagrams of the magnification-variable optical system ZL1 in the wide-angle state and the telescopic state at focusing on an object at infinity. In each aberration diagram, FNO represents the F number, and Y represents the image height. The spherical aberration diagram shows the value of the F number corresponding to the maximum aperture, the astigmatism diagram and the distortion diagram each show the maximum value of the image height, and the transverse aberration diagram shows the value of each image height. Reference character d represents the d line (λ=587.6 nm), and reference character g represents the g line (λ=435.8 nm). In the astigmatism diagram, the solid line represents the sagittal image plane, and the dashed line represents the meridional image plane. Further, in the aberration diagrams in the following examples, the same reference characters as those in the present example are used. The variety of aberration diagrams show that the magnification-variable optical system ZL1 allows favorable correction of the variety of aberrations from the wide-angle state to the telescopic state and provides excellent imaging performance.

Second Example

FIG. 3 shows a configuration of a magnification-variable optical system ZL2 according to the second example. The magnification-variable optical system ZL2 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, a fourth lens group G4 having negative refractive power, and a fifth lens group G5 having positive refractive power.

In the magnification-variable optical system ZL2, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, a biconcave negative lens L13, and a biconvex positive lens L14. The second lens group G2 includes, sequentially from the object side, a positive meniscus lens L21 having a convex surface facing the object side, and a cemented lens formed by cementing a negative meniscus lens L22 having a convex surface facing the object side and a biconvex positive lens L23 to each other. The third lens group G3 is formed of a cemented lens formed by cementing a negative meniscus lens L31 having a convex surface facing the object side and a biconvex positive lens L32 to each other sequentially from the object side. The fourth lens group G4 includes, sequentially from the object side, a cemented lens formed by cementing a biconcave negative lens L41 and a biconvex positive lens L42 to each other, and a biconvex positive lens L43. The fifth lens group G5 includes, sequentially from the object side, a cemented lens formed by cementing a biconvex positive lens L51 and a negative meniscus lens L52 having a concave surface facing the object side to each other, a cemented lens formed by cementing a negative meniscus lens L53 having a convex surface facing the object side and a biconvex positive lens L54 to each other, and an aspheric negative lens L55 having an aspheric lens surface on the image side and shaped in a negative meniscus lens having a concave surface facing the object side. A filter FL is disposed between the fifth lens group G5 and an image plane I.

In the magnification-variable optical system ZL2, at magnification change from the wide-angle state to the telescopic state, the first lens group G1 moves to the image side and the second lens group G2, the third lens group G3, the fourth lens group G4, and the fifth lens group G5 move to the object side so that the distance between the first lens group G1 and the second lens group G2 decreases, the distance between the second lens group G2 and the third lens group G3 changes, the distance between the third lens group G3 and the fourth lens group G4 increases, the distance between the fourth lens group G4 and the fifth lens group G5 decreases, and the distance (back focus) between the fifth lens group G5 and the image plane I increases. An aperture stop S is disposed between the third lens group G3 and the fourth lens group G4 and moves together with the fourth lens group G4 at magnification change.

The magnification-variable optical system ZL2 performs focusing upon from an infinite distance object to a close distance object by moving the second lens group G2 to the image side.

Table 5 below shows the values of specifications of the magnification-variable optical system ZL2.

In Table 5, the eighteenth surface corresponds to the aperture stop S, and the ninth surface, the twenty-fourth surface, and the thirty-third surface correspond to virtual surfaces. An auxiliary aperture may be disposed at the twenty-fourth surface.

In a case in which a filter is disposed on the object side in the magnification-variable optical system ZL2, the filter is disposed at a position separated by 6.10 mm on the object side from the first surface.

TABLE 5

Second example

[Overall specifications]

| | Wide-angle state | | Intermediate focal-length state | | Telescopic state |
|---|---|---|---|---|---|
| f = | 14.400 | to | 18.000 to 20.000 | to | 23.300 |
| FNO = | 2.91 | to | 2.91 to 2.91 | to | 2.91 |
| 2ω (°) = | 114.733 | to | 100.255 to 93.680 | to | 84.518 |
| Ymax = | 21.600 | to | 21.600 to 21.600 | to | 21.600 |
| TL (air equivalent length) = | 157.612 | to | 154.540 to 154.421 | to | 153.680 |
| Bf (air equivalent length) = | 38.098 | to | 43.918 to 47.289 | to | 53.515 |

[Lens data]

| m | r | d | nd | vd |
|---|---|---|---|---|
| Object plane | ∞ | | | |
| 1* | 205.1729 | 3.1000 | 1.588870 | 61.13 |
| 2* | 17.5567 | 12.8326 | | |
| 3 | 114.0778 | 2.0000 | 1.851080 | 40.12 |
| 4* | 31.6290 | 10.7225 | | |
| 5 | −46.1746 | 1.7000 | 1.433848 | 95.23 |
| 6 | 64.9422 | 0.2000 | | |
| 7 | 43.9857 | 4.9563 | 1.850260 | 32.35 |
| 8 | −739.0819 | d8 | | |
| 9 | 0.0000 | d9 | | |
| 10 | 52.0829 | 2.4000 | 1.755200 | 27.57 |
| 11 | 298.7151 | 0.2000 | | |
| 12 | 68.9680 | 1.1000 | 1.963000 | 24.11 |
| 13 | 18.9881 | 4.7000 | 1.737999 | 32.33 |
| 14 | −2022.5978 | d14 | | |
| 15 | 286.5992 | 1.1000 | 1.950000 | 29.37 |
| 16 | 46.7172 | 4.6000 | 1.531720 | 48.78 |
| 17 | −31.7120 | d17 | | |
| 18 | 0.0000 | 4.4042 | | Aperture stop S |
| 19 | −27.9959 | 1.1000 | 1.953750 | 32.33 |
| 20 | 28.8462 | 3.7000 | 1.846660 | 23.80 |
| 21 | −557.2164 | 0.2000 | | |
| 22 | 68.8702 | 2.8000 | 1.963000 | 24.11 |
| 23 | −141.5400 | 1.5000 | | |
| 24 | 0.0000 | d24 | | |
| 25 | 27.3401 | 8.6000 | 1.497820 | 82.57 |
| 26 | −22.2407 | 1.2000 | 1.834000 | 37.18 |
| 27 | −31.9295 | 0.2000 | | |
| 28 | 392.1080 | 1.2000 | 1.834000 | 37.18 |
| 29 | 22.3559 | 7.0000 | 1.497820 | 82.57 |
| 30 | −57.4736 | 1.0035 | | |
| 31 | −58.3185 | 1.5000 | 1.860999 | 37.10 |
| 32* | −71.1156 | d32 | | |

TABLE 5-continued

Second example

| 33 | 0.0000 | 35.2000 | | |
|---|---|---|---|---|
| 34 | 0.0000 | 2.0000 | 1.516800 | 64.13 |
| 35 | 0.0000 | 1.2329 | | |
| Image plane | ∞ | | | |

[Focal length of lens groups]

| Lens group | First surface | Focal length |
|---|---|---|
| First lens group | 1 | −21.147 |
| Second lens group | 10 | 68.510 |
| Third lens group | 15 | 87.743 |
| Fourth lens group | 19 | −76.490 |
| Fifth lens group | 25 | 46.500 |

In the magnification-variable optical system ZL2, the first surface, the second surface, the fourth surface, and the thirty-second surface have aspheric lens surfaces. Table 6 below shows the surface number m and data of the aspheric surfaces, in other words, the values of the conical constant K and the aspheric coefficients A4 to A12.

TABLE 6

[Data on aspherical surface]

| First surface | K = 1.0000 | | |
|---|---|---|---|
| | A4 = 1.15717E−05 | A6 = −1.66721E−08 | A8 = 1.77522E−11 |
| | A10 = −1.04794E−14 | A12 = 3.05490E−18 | A14 = 0.00000E+00 |
| Second surface | K = 0.0000 | | |
| | A4 = 4.54275E−06 | A6 = 1.13567E−08 | A8 = 1.93629E−11 |
| | A10 = −3.22207E−13 | A12 = 4.31580E−16 | A14 = 0.00000E+00 |
| Fourth surface | K = 2.0000 | | |
| | A4 = 1.46075E−05 | A6 = 1.38300E−08 | A8 = −7.82738E−11 |
| | A10 = 9.13879E−13 | A12 = −1.45480E−15 | A14 = 0.00000E+00 |
| Thirty-second surface | K = 1.0000 | | |
| | A4 = 1.36004E−05 | A6 = 2.06160E−08 | A8 = 8.92060E−11 |
| | A10 = −2.49786E−13 | A12 = 1.19380E−15 | A14 = 0.00000E+00 |

In the magnification-variable optical system ZL2, the on-axis air spaces d8 and d9 between the first lens group G1 and the second lens group G2, the on-axis air space d14 between the second lens group G2 and the third lens group G3, the on-axis air space d17 between the third lens group G3 and the fourth lens group G4, the on-axis air space d24 between the fourth lens group G4 and the fifth lens group G5, and the on-axis air space d32 between the fifth lens group G5 and the filter FL change at magnification change and focusing. Table 7 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 7

[Variable distance data]

| | Wide-angle state | Intermediate focal-length state | Telescopic state | |
|---|---|---|---|---|
| -Focusing on an object at infinity- | | | | |
| f | 14.400 | 18.000 | 20.000 | 23.300 |
| d0 | ∞ | ∞ | ∞ | ∞ |
| d8 | 22.8572 | 11.8896 | 7.4255 | 1.5000 |
| d9 | 0.0000 | 0.0000 | 0.0000 | 0.0000 |
| d14 | 4.7767 | 8.7786 | 10.0600 | 9.3930 |

TABLE 7-continued

[Variable distance data]

| | Wide-angle state | Intermediate focal-length state | Telescopic state | |
|---|---|---|---|---|
| d17 | 1.5000 | 3.6452 | 4.8753 | 5.2525 |
| d24 | 6.3610 | 2.2891 | 0.7521 | 0.0000 |
| d32 | 0.5000 | 6.2202 | 9.5924 | 15.8643 |
| -Focusing on an object at a close distance- | | | | |
| β | −0.025 | −0.025 | −0.025 | −0.025 |
| d0 | 543.9428 | 689.0016 | 769.4614 | 902.1315 |
| d8 | 22.8572 | 11.8896 | 7.4255 | 1.5000 |
| d9 | 0.7774 | 0.6310 | 0.5801 | 0.5199 |
| d14 | 3.9994 | 8.1476 | 9.4799 | 8.8730 |
| d17 | 1.5000 | 3.6452 | 4.8753 | 5.2525 |
| d24 | 6.3610 | 2.2891 | 0.7521 | 0.0000 |
| d32 | 0.5000 | 6.2202 | 9.5924 | 15.8643 |
| -Focusing on an object at the closest distance- | | | | |
| β | −0.102 | −0.126 | −0.140 | −0.163 |
| d0 | 115.6064 | 118.6787 | 118.7977 | 119.5385 |
| d8 | 22.8572 | 11.8896 | 7.4255 | 1.5000 |
| d9 | 3.0354 | 3.0213 | 3.0846 | 3.2044 |

TABLE 7-continued

[Variable distance data]

| | Wide-angle state | Intermediate focal-length state | Telescopic state | |
|---|---|---|---|---|
| d14 | 1.7414 | 5.7572 | 6.9754 | 6.1886 |
| d17 | 1.5000 | 3.6452 | 4.8753 | 5.2525 |
| d24 | 6.3610 | 2.2891 | 0.7521 | 0.0000 |
| d32 | 0.5000 | 6.2202 | 9.5924 | 15.8643 |

Table 8 below shows values compliant to the condition expressions in the magnification-variable optical system ZL2. In the magnification-variable optical system ZL2, the specific negative lens is the biconcave negative lens L13, and the specific lens is each of the biconvex positive lens L51 and the biconvex positive lens L54.

TABLE 8

| Σν1n = 196.48 |
|---|
| Σ (ν1n × f1n) = −9987.927 |
| STLw = 78.745 |
| fL1 = −32.805 |
| fL2 = −52.000 |

[Values compliant to conditional expressions]

(1) ν1n = 95.23
(2) nL2/nL1 = 1.165
(3) N1n = 3

TABLE 8-continued (4) 2ωw = 114.733°
(5) nL1 = 1.589
(6) fw × (−f1)/Fnow = 104.645 mm²
(7) (L1r2 + L1r1)/(L1r2 − L1r1) = −1.187
(8) (Σv1n)/N1n = 65.493
(9) (Σ (v1n × f1n))/(N1n × f1) = 157.436
(10) Bfw/fw = 2.646
(11) STLw/TLw = 0.500
(12) (−f1)/fw = 1.469
(13) (−f1)/ft = 0.908
(14) fL1/f1 = 1.551
(15) fL2/f1 = 2.459
(16) TLw/Bfw = 4.137
(17) (L2r2 + L2r1)/(L2r2 − L2r1) = −1.767
(18) (L3r2 + L3r1)/(L3r2 − L3r1) = 0.169
(19) vr = 82.57
(20) Fnow = 2.91
(21) Fnot = 2.91

As described above, the magnification-variable optical system ZL2 satisfies all Conditional Expressions (1) to (21) described above.

FIG. 4 shows a variety of aberration diagrams of the magnification-variable optical system ZL2 in the wide-angle state and the telescopic state at focusing on an object at infinity. The variety of aberration diagrams show that the magnification-variable optical system ZL2 allows favorable correction of the variety of aberrations from the wide-angle state to the telescopic state and provides excellent imaging performance.

Third Example

FIG. 5 shows a configuration of a magnification-variable optical system ZL3 according to the third example. The magnification-variable optical system ZL3 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, a fourth lens group G4 having negative refractive power, and a fifth lens group G5 having positive refractive power.

In the magnification-variable optical system ZL3, the first lens group G1 includes, sequentially from the object side, aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a biconcave negative lens, a biconcave negative lens L13, and a biconvex positive lens L14. The second lens group G2 includes, sequentially from the object side, a positive meniscus lens L21 having a convex surface facing the object side, and a cemented lens formed by cementing a negative meniscus lens L22 having a convex surface facing the object side and a positive meniscus lens L23 having a convex surface facing the object side to each other. The third lens group G3 is formed of a cemented lens formed by cementing a negative meniscus lens L31 having a convex surface facing the object side and a biconvex positive lens L32 to each other sequentially from the object side. The fourth lens group G4 includes, sequentially from the object side, a cemented lens formed by cementing a biconcave negative lens L41 and a positive meniscus lens L42 having a convex surface facing the object side to each other, and a biconvex positive lens L43. The fifth lens group G5 includes, sequentially from the object side, a cemented lens formed by cementing a biconvex positive lens L51 and a negative meniscus lens L52 having a concave surface facing the object side to each other, and a cemented lens formed by cementing a negative meniscus lens L53 having a convex surface facing the object side, a biconvex positive lens L54, and an aspheric positive lens L55 having an aspheric lens surface on the image side and shaped in a positive meniscus lens having a concave surface facing the object side to each other. A filter FL is disposed between the fifth lens group G5 and an image plane I.

In the magnification-variable optical system ZL3, at magnification change from the wide-angle state to the telescopic state, the first lens group G1 moves to the image side and the second lens group G2, the third lens group G3, the fourth lens group G4, and the fifth lens group G5 move to the object side so that the distance between the first lens group G1 and the second lens group G2 decreases, the distance between the second lens group G2 and the third lens group G3 changes, the distance between the third lens group G3 and the fourth lens group G4 increases, the distance between the fourth lens group G4 and the fifth lens group G5 decreases, and the distance (back focus) between the fifth lens group G5 and the image plane I increases. An aperture stop S is disposed between the third lens group G3 and the fourth lens group G4 and moves together with the third lens group G3 at magnification change.

The magnification-variable optical system ZL3 performs focusing upon from an infinite distance object to a close distance object by moving the second lens group G2 to the image side.

Table 9 below shows the values of specifications of the magnification-variable optical system ZL3.

In Table 9, the eighteenth surface corresponds to the aperture stop S, and the ninth surface, the twenty-fourth surface, and the thirty-second surface correspond to virtual surfaces. An auxiliary aperture may be disposed at the twenty-fourth surface.

In a case in which a filter is disposed on the object side in the magnification-variable optical system ZL3, the filter is disposed at a position separated by 6.10 mm on the object side from the first surface.

TABLE 9

Third example

[Overall specifications]

| | Wide-angle state | | Intermediate focal-length state | | Telescopic state |
|---|---|---|---|---|---|
| f = | 14.400 | to | 18.000 to 20.000 | to | 23.300 |
| FNO = | 2.91 | to | 2.91 to 2.91 | to | 2.91 |
| 2ω (°) = | 114.733 | to | 100.259 to 93.684 | to | 84.519 |
| Ymax = | 21.600 | to | 21.600 to 21.600 | to | 21.600 |
| TL (air equivalent length) = | 165.966 | to | 158.445 to157.021 | to | 155.742 |
| Bf (air equivalent length) = | 38.086 | to | 43.089 to 46.279 | to | 52.057 |

[Lens data]

| m | r | d | nd | vd |
|---|---|---|---|---|
| Object plane | ∞ | | | |
| 1* | 140.3310 | 3.1000 | 1.588870 | 61.13 |
| 2* | 16.1170 | 15.8352 | | |
| 3 | −2522.8076 | 2.0000 | 1.773870 | 47.25 |

TABLE 9-continued

[Third example]

| | | | | |
|---|---|---|---|---|
| 4* | 45.4385 | 8.5558 | | |
| 5 | −66.8335 | 1.7000 | 1.433848 | 95.23 |
| 6 | 43.6375 | 1.7140 | | |
| 7 | 42.3398 | 5.9280 | 1.804400 | 39.61 |
| 8 | −378.8325 | d8 | | |
| 9 | 0.0000 | d9 | | |
| 10 | 52.1540 | 2.4000 | 1.772500 | 49.62 |
| 11 | 265.8146 | 0.2000 | | |
| 12 | 59.4781 | 1.1000 | 1.963000 | 24.11 |
| 13 | 18.8996 | 4.8000 | 1.731275 | 27.55 |
| 14 | 232.8799 | d14 | | |
| 15 | 82.9424 | 1.1000 | 1.953750 | 32.33 |
| 16 | 35.0373 | 5.0000 | 1.525765 | 50.70 |
| 17 | −39.0273 | 1.5000 | | |
| 18 | 0.0000 | d18 | | Aperture stop S |
| 19 | −39.0466 | 1.1000 | 1.953750 | 32.33 |
| 20 | 27.5192 | 3.3000 | 1.808090 | 22.74 |
| 21 | 182.0962 | 0.2000 | | |
| 22 | 56.9782 | 2.7000 | 1.963000 | 24.11 |
| 23 | −407.2260 | 1.5000 | | |
| 24 | 0.0000 | d24 | | |
| 25 | 26.0879 | 8.5000 | 1.497820 | 82.57 |
| 26 | −22.3629 | 1.2000 | 1.883000 | 40.66 |
| 27 | −30.9657 | 0.2000 | | |
| 28 | 1576.0034 | 1.2000 | 1.834000 | 37.18 |
| 29 | 20.7858 | 6.8000 | 1.497820 | 82.57 |
| 30 | −78.3274 | 1.8000 | 1.860999 | 37.10 |
| 31* | −75.8550 | d31 | | |
| 32 | 0.0000 | 35.2000 | | |
| 33 | 0.0000 | 2.0000 | 1.516800 | 64.13 |
| 34 | 0.0000 | 1.0651 | | |
| Image plane | ∞ | | | |

[Focal length of lens groups]

| Lens group | First surface | Focal length |
|---|---|---|
| First lens group | 1 | −22.503 |
| Second lens group | 10 | 76.247 |
| Third lens group | 15 | 78.275 |
| Fourth lens group | 19 | −72.637 |
| Fifth lens group | 25 | 48.145 |

In the magnification-variable optical system ZL3, the first surface, the second surface, the fourth surface, and the thirty-first surface have aspheric lens surfaces. Table 10 below shows the surface number m and data of the aspheric surfaces, in other words, the values of the conical constant K and the aspheric coefficients A4 to A12.

TABLE 10

[Data on aspherical surface]

| | |
|---|---|
| First surface | K = 1.0000 |
| | A4 = 4.25491E−06    A6 = −4.84680E−09    A8 = 5.09007E−12 |
| | A10 = −2.74937E−15   A12 = 7.56860E−19    A14 = 0.00000E+00 |
| Second surface | K = 0.0000 |
| | A4 = 2.95160E−06    A6 = 8.42874E−09     A8 = −1.70913E−11 |
| | A10 = −2.10307E−14   A12 = −1.26170E−17   A14 = 0.00000E+00 |
| Fourth surface | K = 2.0000 |
| | A4 = 1.31082E−05    A6 = −2.47332E−09    A8 = 9.40637E−11 |
| | A10 = −1.72001E−13   A12 = 3.42270E−16    A14 = 0.00000E+00 |
| Thirty-first surface | K = 1.0000 |
| | A4 = 1.28263E−05    A6 = 1.08911E−08     A8 = 2.06427E−10 |
| | A10 = −8.83154E−13   A12 = 2.93050E−15    A14 = 0.00000E+00 |

In the magnification-variable optical system ZL3, the on-axis air spaces d8 and d9 between the first lens group G1 and the second lens group G2, the on-axis air space d14 between the second lens group G2 and the third lens group G3, the on-axis air space d18 between the third lens group G3 and the fourth lens group G4, the on-axis air space d24 between the fourth lens group G4 and the fifth lens group G5, and the on-axis air space d31 between the fifth lens group G5 and the filter FL change at magnification change and focusing. Table 11 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 11

[Variable distance data]

| | Wide-angle state | Intermediate focal-length state | Telescopic state |
|---|---|---|---|
| -Focusing on an object at infinity- | | | |
| f | 14.400 | 18.000 | 20.000 | 23.300 |
| d0 | ∞ | ∞ | ∞ | ∞ |
| d8 | 25.0258 | 12.9539 | 7.9550 | 1.5000 |
| d9 | 0.0000 | 0.0000 | 0.0000 | 0.0000 |
| d14 | 5.9986 | 9.9520 | 10.6450 | 10.4616 |
| d18 | 3.3743 | 6.3751 | 7.4841 | 8.2905 |
| d24 | 7.0481 | 2.6418 | 1.2253 | 0.0000 |
| d31 | 0.5000 | 5.4031 | 8.6154 | 14.3923 |
| -Focusing on an object at a close distance- | | | |
| β | −0.025 | −0.025 | −0.025 | −0.025 |
| d0 | 543.4416 | 688.5066 | 768.9767 | 901.6419 |
| d8 | 25.0258 | 12.9539 | 7.9550 | 1.5000 |
| d9 | 0.8802 | 0.7142 | 0.6565 | 0.5876 |
| d14 | 5.1183 | 9.2378 | 9.9885 | 9.8739 |
| d18 | 3.3743 | 6.3751 | 7.4841 | 8.2905 |
| d24 | 7.0481 | 2.6418 | 1.2253 | 0.0000 |
| d31 | 0.5000 | 5.4031 | 8.6154 | 14.3923 |
| -Focusing on an object at the closest distance- | | | |
| β | −0.106 | −0.129 | −0.142 | −0.165 |
| d0 | 110.2525 | 114.7733 | 116.1976 | 117.4763 |
| d8 | 25.0258 | 12.9539 | 7.9550 | 1.5000 |
| d9 | 3.5539 | 3.4989 | 3.5405 | 3.6597 |
| d14 | 2.4447 | 6.4532 | 7.1046 | 6.8019 |
| d18 | 3.3743 | 6.3751 | 7.4841 | 8.2905 |
| d24 | 7.0481 | 2.6418 | 1.2253 | 0.0000 |
| d31 | 0.5000 | 5.4031 | 8.6154 | 14.3923 |

Table 12 below shows values compliant to the condition expressions in the magnification-variable optical system ZL3. In the magnification-variable optical system ZL3, the specific negative lens is the biconcave negative lens L13, and the specific lens is each of the biconvex positive lens L51 and the biconvex positive lens L54.

TABLE 12

Σv1n = 203.61
Σ (v1n × f1n) = −10400.130
STLw = 85.957
fL1 = −31.209
fL2 = −57.658

[Values compliant to conditional expressions]

(1) v1n = 95.23
(2) nL2/nL1 = 1.116
(3) N1n = 3
(4) 2ωw = 114.733°
(5) nL1 = 1.589
(6) fw × (−f1)/Fnow = 111.353 mm²
(7) (L1r2 + L1r1)/(L1r2 − L1r1) = −1.260
(8) (Σv1n)/N1n = 67.870
(9) (Σ (v1n × f1n))/(N1n × f1) = 154.058
(10) Bfw/fw = 2.645
(11) STLw/TLw = 0.527
(12) (−f1)/fw = 1.563
(13) (−f1)/ft = 0.966
(14) fL1/f1 = 1.387
(15) fL2/f1 = 2.562
(16) TLw/Bfw = 4.279
(17) (L2r2 + L2r1)/(L2r2 − L2r1) = −0.965
(18) (L3r2 + L3r1)/(L3r2 − L3r1) = −0.210
(19) vr = 82.57
(20) Fnow = 2.91
(21) Fnot = 2.91

As described above, the magnification-variable optical system ZL3 satisfies all Conditional Expressions (1) to (21) described above.

FIG. 6 shows a variety of aberration diagrams of the magnification-variable optical system ZL3 in the wide-angle state and the telescopic state at focusing on an object at infinity. The variety of aberration diagrams show that the magnification-variable optical system ZL3 allows favorable correction of the variety of aberrations from the wide-angle state to the telescopic state and provides excellent imaging performance.

Fourth Example

FIG. 7 shows a configuration of a magnification-variable optical system ZL4 according to the fourth example. The magnification-variable optical system ZL4 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, a fourth lens group G4 having negative refractive power, and a fifth lens group G5 having positive refractive power.

In the magnification-variable optical system ZL4, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, a biconcave negative lens L13, and a biconvex positive lens L14. The second lens group G2 includes, sequentially from the object side, a positive meniscus lens L21 having a convex surface facing the object side, and a cemented lens formed by cementing a negative meniscus lens L22 having a convex surface facing the object side and a biconvex positive lens L23 to each other. The third lens group G3 is formed of a cemented lens formed by cementing a negative meniscus lens L31 having a convex surface facing the object side and a biconvex positive lens L32 to each other sequentially from the object side. The fourth lens group G4 includes sequentially from the object side, a cemented lens formed by cementing a biconcave negative lens L41 and a biconvex positive lens L42 to each other, and a positive meniscus lens L43 having a convex surface facing the object side. The fifth lens group G5 includes, sequentially from the object side, a cemented lens formed by cementing a biconvex positive lens L51 and a negative meniscus lens L52 having a concave surface facing the object side to each other, and a cemented lens formed by cementing a negative meniscus lens L53 having a convex surface facing the object side, a biconvex positive lens L54, and an aspheric positive lens L55 having an aspheric lens surface on the image side and shaped in a positive meniscus lens having a concave surface facing the object side to each other. A filter FL is disposed between the fifth lens group G5 and an image plane I.

In the magnification-variable optical system ZL4, at magnification change from the wide-angle state to the telescopic state, the first lens group G1 moves to the image side and the second lens group G2, the third lens group G3, the fourth lens group G4, and the fifth lens group G5 move to the object side so that the distance between the first lens group G1 and the second lens group G2 decreases, the distance between the second lens group G2 and the third lens group G3 changes, the distance between the third lens group G3 and the fourth lens group G4 increases, the distance between the fourth lens group G4 and the fifth lens group G5 decreases, and the distance (back focus) between the fifth lens group G5 and the image plane I increases. An aperture stop S is disposed between the third lens group G3 and the fourth lens group G4 and moves together with the third lens group G3 at magnification change.

The magnification-variable optical system ZL4 performs focusing upon from an infinite distance object to a close distance object by moving the second lens group G2 to the image side.

Table 13 below shows the values of specifications of the magnification-variable optical system ZL4.

In Table 13, the eighteenth surface corresponds to the aperture stop S, and the ninth surface, the twenty-fourth surface, and the thirty-second surface correspond to virtual surfaces. An auxiliary aperture may be disposed at the twenty-fourth surface.

In a case in which a filter is disposed on the object side in the magnification-variable optical system ZL4, the filter is disposed at a position separated by 6.10 mm on the object side from the first surface.

TABLE 13

Fourth example

[Overall specifications]

| | Wide-angle state | | Intermediate focal-length state | | Telescopic state |
|---|---|---|---|---|---|
| f = | 14.400 | to | 18.000 to 20.000 | to | 23.300 |
| FNO = | 2.91 | to | 2.91 to 2.91 | to | 2.91 |
| 2ω (°) = | 114.734 | to | 100.512 to 93.875 | to | 84.519 |
| Ymax = | 21.600 | to | 21.600 to 21.600 | to | 21.600 |
| TL (air equivalent length) = | 159.177 | to | 154.664 to 153.790 | to | 153.659 |
| Bf (air equivalent length) = | 38.070 | to | 43.957 to 47.366 | to | 53.184 |

[Lens data]

| m | r | d | nd | νd |
|---|---|---|---|---|
| Object plane | ∞ | | | |
| 1* | 90.3166 | 3.1000 | 1.677980 | 54.89 |
| 2* | 17.5651 | 13.1700 | | |
| 3 | 174.6872 | 2.0000 | 1.882023 | 37.22 |
| 4* | 32.3261 | 10.9488 | | |
| 5 | −40.1458 | 1.7000 | 1.433848 | 95.23 |
| 6 | 63.0439 | 0.2488 | | |
| 7 | 49.0293 | 5.3084 | 1.953750 | 32.33 |
| 8 | −272.4542 | d8 | | |
| 9 | 0.0000 | d9 | | |
| 10 | 52.7250 | 3.4795 | 1.850000 | 27.03 |
| 11 | 905.8749 | 0.2000 | | |
| 12 | 63.2104 | 1.1000 | 1.963000 | 24.11 |
| 13 | 19.5101 | 5.0000 | 1.647690 | 33.72 |
| 14 | −605.1149 | d14 | | |
| 15 | 131.6961 | 1.1000 | 1.903660 | 31.27 |
| 16 | 41.1798 | 4.8000 | 1.516800 | 64.13 |
| 17 | −33.5987 | 1.5000 | | |
| 18 | 0.0000 | d18 | | Aperture stop S |
| 19 | −33.4463 | 1.1000 | 1.953750 | 32.33 |
| 20 | 28.7483 | 3.7000 | 1.808090 | 22.74 |
| 21 | −4455.8379 | 0.2000 | | |
| 22 | 56.8591 | 2.3000 | 1.963000 | 24.11 |
| 23 | 1989.0932 | 1.5000 | | |
| 24 | 0.0000 | d24 | | |
| 25 | 27.9660 | 8.7000 | 1.497820 | 82.57 |
| 26 | −21.3402 | 1.2000 | 1.883000 | 40.66 |
| 27 | −29.4982 | 0.2000 | | |
| 28 | 833.0842 | 1.2000 | 1.834000 | 37.18 |
| 29 | 21.2365 | 6.7000 | 1.497820 | 82.57 |
| 30 | −131.0269 | 1.8000 | 1.860999 | 37.10 |
| 31* | −81.9522 | d31 | | |
| 32 | 0.0000 | 35.2000 | | |
| 33 | 0.0000 | 2.0000 | 1.516800 | 64.13 |
| 34 | 0.0000 | 1.3049 | | |
| Image plane | ∞ | | | |

[Focal length of lens groups]

| Lens group | First surface | Focal length |
|---|---|---|
| First lens group | 1 | −20.675 |
| Second lens group | 10 | 64.283 |
| Third lens group | 15 | 77.240 |
| Fourth lens group | 19 | −64.451 |
| Fifth lens group | 25 | 46.308 |

In the magnification-variable optical system ZL4, the first surface, the second surface, the fourth surface, and the thirty-first surface have aspheric lens surfaces. Table 14 below shows the surface number m and data of the aspheric surfaces, in other words, the values of the conical constant K and the aspheric coefficients A4 to A12.

TABLE 14

[Data on aspherical surface]

| First surface | K = 1.0000 | | |
|---|---|---|---|
| | A4 = 9.81343E−06 | A6 = −2.00352E−08 | A8 = 2.68089E−11 |
| | A10 = −1.91082E−14 | A12 = 6.61500E−18 | A14 = 0.00000E+00 |
| Second surface | K = 0.0000 | | |
| | A4 = 9.32337E−06 | A6 = 3.93185E−11 | A8 = −4.76302E−11 |
| | A10 = −1.21872E−13 | A12 = 2.94780E−16 | A14 = 0.00000E+00 |
| Fourth surface | K = 2.0000 | | |
| | A4 = 1.36041E−05 | A6 = 4.77634E−09 | A8 = 6.06428E−11 |
| | A10 = 4.61232E−13 | A12 = −1.15710E−15 | A14 = 0.00000E+00 |
| Thirty-first surface | K = 1.0000 | | |
| | A4 = 1.19337E−05 | A6 = 1.13335E−08 | A8 = 1.45175E−10 |
| | A10 = −5.29199E−13 | A12 = 1.81530E−15 | A14 = 0.00000E+00 |

In the magnification-variable optical system ZL4, the on-axis air spaces d8 and d9 between the first lens group G1 and the second lens group G2, the on-axis air space d14 between the second lens group G2 and the third lens group G3, the on-axis air space d18 between the third lens group G3 and the fourth lens group G4, the on-axis air space d24 between the fourth lens group G4 and the fifth lens group G5, and the on-axis air space d31 between the fifth lens group G5 and the filter FL change at magnification change and focusing. Table 15 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 15

[Variable distance data]

| | Wide-angle state | Intermediate focal-length state | Telescopic state |
|---|---|---|---|
| -Focusing on an object at infinity- | | | |
| f | 14.400 | 18.000 | 20.000 | 23.300 |
| d0 | ∞ | ∞ | ∞ | ∞ |
| d8 | 22.4312 | 11.5043 | 7.0971 | 1.5000 |
| d9 | 0.0000 | 0.0000 | 0.0000 | 0.0000 |
| d14 | 6.4000 | 9.7974 | 10.2841 | 9.7673 |
| d18 | 3.1355 | 4.8832 | 5.7872 | 6.9523 |
| d24 | 6.8852 | 2.2657 | 1.0000 | 0.0000 |
| d31 | 0.5000 | 6.3273 | 9.7040 | 15.5208 |
| -Focusing on an object at a close distance- | | | |
| β | −0.025 | −0.025 | −0.025 | −0.025 |
| d0 | 543.9177 | 689.0584 | 769.5276 | 902.1634 |
| d8 | 22.4312 | 11.5043 | 7.0971 | 1.5000 |
| d9 | 0.7514 | 0.5958 | 0.5433 | 0.4811 |
| d14 | 5.6486 | 9.2017 | 9.7408 | 9.2862 |
| d18 | 3.1355 | 4.8832 | 5.7872 | 6.9523 |
| d24 | 6.8852 | 2.2657 | 1.0000 | 0.0000 |
| d31 | 0.5000 | 6.3273 | 9.7040 | 15.5208 |
| -Focusing on an object at the closest distance- | | | |
| β | −0.103 | −0.126 | −0.139 | −0.163 |
| d0 | 114.0413 | 118.5550 | 119.4285 | 119.5597 |
| d8 | 22.4312 | 11.5043 | 7.0971 | 1.5000 |
| d9 | 2.9730 | 2.8628 | 2.8851 | 2.9744 |
| d14 | 3.4270 | 6.9346 | 7.3990 | 6.7929 |
| d18 | 3.1355 | 4.8832 | 5.7872 | 6.9523 |
| d24 | 6.8852 | 2.2657 | 1.0000 | 0.0000 |
| d31 | 0.5000 | 6.3273 | 9.7040 | 15.5208 |

Table 16 below shows values compliant to the condition expressions in the magnification-variable optical system ZL4. In the magnification-variable optical system ZL4, the specific negative lens is the biconcave negative lens L13, and the specific lens is each of the biconvex positive lens L51 and the biconvex positive lens L54.

TABLE 16

Σν1n = 187.34
Σ (ν1n × f1n) = −8838.345
STLw = 82.487
fL1 = −32.727
fL2 = −45.270

[Values compliant to conditional expressions]

(1) ν1n = 95.23
(2) nL2/nL1 = 1.122
(3) N1n = 3
(4) 2ωw = 114.734°

TABLE 16-continued (5) nL1 = 1.678
(6) fw × (−f1)/Fnow = 102.308 mm²
(7) (L1r2 + L1r1)/(L1r2 − L1r1) = −1.483
(8) (Σν1n)/N1n = 62.447
(9) (Σ (ν1n × f1n))/(N1n × f1) = 142.498
(10) Bfw/fw = 2.644
(11) STLw/TLw = 0.518
(12) (−f1)/fw = 1.436
(13) (−f1)/ft = 0.887
(14) fL1/f1 = 1.583
(15) fL2/f1 = 2.190
(16) TLw/Bfw = 4.181
(17) (L2r2 + L2r1)/(L2r2 − L2r1) = −1.454
(18) (L3r2 + L3r1)/(L3r2 − L3r1) = 0.222
(19) νr = 82.57
(20) Fnow = 2.91
(21) Fnot = 2.91

As described above, the magnification-variable optical system ZL4 satisfies all Conditional Expressions (1) to (21) described above.

FIG. 8 shows a variety of aberration diagrams of the magnification-variable optical system ZL4 in the wide-angle state and the telescopic state at focusing on an object at infinity. The variety of aberration diagrams show that the magnification-variable optical system ZL4 allows favorable correction of the variety of aberrations from the wide-angle state to the telescopic state and provides excellent imaging performance.

Fifth Example

FIG. 9 shows a configuration of a magnification-variable optical system ZL5 according to the fifth example. The magnification-variable optical system ZL5 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, a fourth lens group G4 having negative refractive power, and a fifth lens group G5 having positive refractive power.

In the magnification-variable optical system ZL5, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, a biconcave negative lens L13, and a biconvex positive lens L14. The second lens group G2 includes, sequentially from the object side, a positive meniscus lens L21 having a convex surface facing the object side, and a cemented lens formed by cementing a negative meniscus lens L22 having a convex surface facing the object side and a biconvex positive lens L23 to each other. The third lens group G3 is formed of a cemented lens formed by cementing a negative meniscus lens L31 having a convex surface facing the object side and a biconvex positive lens L32 to each other sequentially from the object side. The fourth lens group G4 includes, sequentially from the object side, a cemented lens formed by cementing a biconcave negative lens L41 and a biconvex positive lens L42 to each other, and a positive meniscus lens L43 having a convex surface facing the object side. The fifth lens group G5 includes, sequentially from the object side, a cemented lens formed by cementing a biconvex positive lens L51 and a negative meniscus lens L52 having a concave surface facing the object side to each other, and a cemented lens formed by cementing a plano-concave negative lens L53 having a flat surface facing the object side, a biconvex positive lens L54, and an aspheric positive lens L55 having an aspheric lens surface on the image side and shaped in a positive meniscus lens having a concave surface facing the object side to each other. A filter FL is disposed between the fifth lens group G5 and an image plane I.

In the magnification-variable optical system ZL5, at magnification change from the wide-angle state to the telescopic state, the first lens group G1 moves to the image side and the second lens group G2, the third lens group G3, the fourth lens group G4, and the fifth lens group G5 move to the object side so that the distance between the first lens group G1 and the second lens group G2 decreases, the distance between the second lens group G2 and the third lens group G3 changes, the distance between the third lens group G3 and the fourth lens group G4 increases, the distance between the fourth lens group G4 and the fifth lens group G5 decreases, and the distance (back focus) between the fifth lens group G5 and the image plane I increases. An aperture stop S is disposed between the third lens group G3 and the fourth lens group G4 and moves together with the third lens group G3 at magnification change.

The magnification-variable optical system ZL5 performs focusing upon from an infinite distance object to a close distance object by moving the second lens group G2 to the image side.

Table 17 below shows the values of specifications of the magnification-variable optical system ZL5.

In Table 17, the eighteenth surface corresponds to the aperture stop S, and the ninth surface, the twenty-fourth surface, and the thirty-second surface correspond to virtual surfaces. An auxiliary aperture may be disposed at the twenty-fourth surface.

In a case in which a filter is disposed on the object side in the magnification-variable optical system ZL5, the filter is disposed at a position separated by 6.10 mm on the object side from the first surface.

TABLE 17

Fifth example

[Overall specifications]

|  | Wide-angle state | | Intermediate focal-length state | | Telescopic state |
|---|---|---|---|---|---|
| f = | 14.398 | to | 17.997 to 19.996 | to | 23.295 |
| FNO = | 2.91 | to | 2.91 to 2.91 | to | 2.91 |
| 2ω (°) = | 114.745 | to | 100.443 to 93.827 | to | 84.532 |
| Ymax = | 21.600 | to | 21.600 to 21.600 | to | 21.600 |
| TL (air equivalent length) = | 160.086 | to | 155.358 to 154.117 | to | 153.530 |
| Bf (air equivalent length) = | 38.011 | to | 43.671 to 47.032 | to | 52.761 |

TABLE 17-continued

Fifth example

[Lens data]

| m | r | d | nd | vd |
|---|---|---|---|---|
| Object plane | ∞ | | | |
| 1* | 142.8958 | 3.1000 | 1.622910 | 58.30 |
| 2* | 17.5350 | 13.2834 | | |
| 3 | 132.6436 | 2.0000 | 1.882023 | 37.22 |
| 4* | 33.1818 | 10.8088 | | |
| 5 | −41.0334 | 1.7000 | 1.433848 | 95.23 |
| 6 | 46.0617 | 0.7860 | | |
| 7 | 44.4748 | 5.7377 | 1.902650 | 35.72 |
| 8 | −235.5192 | d8 | | |
| 9 | 0.0000 | d9 | | |
| 10 | 42.7013 | 2.6873 | 1.805180 | 25.45 |
| 11 | 522.0903 | 0.2000 | | |
| 12 | 83.2170 | 1.1000 | 1.963000 | 24.11 |
| 13 | 19.3467 | 5.0000 | 1.647690 | 33.72 |
| 14 | −399.2039 | d14 | | |
| 15 | 102.8869 | 1.1000 | 1.903660 | 31.27 |
| 16 | 40.4334 | 5.0000 | 1.516800 | 64.13 |
| 17 | −34.8882 | 1.5000 | | |
| 18 | 0.0000 | d18 | | Aperture stop S |
| 19 | −34.1551 | 1.1000 | 1.953750 | 32.33 |
| 20 | 27.1687 | 3.7000 | 1.808090 | 22.74 |
| 21 | −8566.3566 | 0.2000 | | |
| 22 | 56.2695 | 2.3000 | 1.963000 | 24.11 |
| 23 | 605.9610 | 1.5000 | | |
| 24 | 0.0000 | d24 | | |
| 25 | 27.0443 | 8.6000 | 1.497820 | 82.57 |
| 26 | −21.2587 | 1.2000 | 1.834810 | 42.73 |
| 27 | −29.8675 | 0.2000 | | |
| 28 | 0.0000 | 1.2000 | 1.834000 | 37.18 |
| 29 | 21.0339 | 6.7000 | 1.497820 | 82.57 |
| 30 | −117.6080 | 1.8000 | 1.860999 | 37.10 |
| 31* | −78.0322 | d31 | | |
| 32 | 0.0000 | 35.2000 | | |
| 33 | 0.0000 | 2.0000 | 1.516800 | 64.13 |
| 34 | 0.0000 | 0.9924 | | |
| Image plane | ∞ | | | |

[Focal length of lens groups]

| Lens group | First surface | Focal length |
|---|---|---|
| First lens group | 1 | −21.334 |
| Second lens group | 10 | 68.859 |
| Third lens group | 15 | 71.237 |
| Fourth lens group | 19 | −61.116 |
| Fifth lens group | 25 | 46.502 |

In the magnification-variable optical system ZL5, the first surface, the second surface, the fourth surface, and the thirty-first surface have aspheric lens surfaces. Table 18 below shows the surface number m and data of the aspheric surfaces, in other words, the values of the conical constant K and the aspheric coefficients A4 to A12.

TABLE 18

| | [Data on aspherical surface] | | |
|---|---|---|---|
| First surface | K = 1.0000 | | |
| | A4 = 1.15893E−05 | A6 = −1.92423E−08 | A8 = 2.17289E−11 |
| | A10 = −1.31603E−14 | A12 = 3.82590E−18 | A14 = 0.00000E+00 |
| Second surface | K = 0.0000 | | |
| | A4 = 8.59688E−06 | A6 = 1.24322E−08 | A8 = −2.07525E−11 |
| | A10 = −2.35847E−13 | A12 = 3.68790E−16 | A14 = 0.00000E+00 |
| Fourth surface | K = 2.0000 | | |
| | A4 = 1.30779E−05 | A6 = −3.01480E−10 | A8 = 4.09540E−11 |
| | A10 = 4.27730E−13 | A12 = −7.83650E−16 | A14 = 0.00000E+00 |
| Thirty-first surface | K = 1.0000 | | |
| | A4 = 1.23681E−05 | A6 = 1.27283E−08 | A8 = 1.60295E−10 |
| | A10 = −6.40573E−13 | A12 = 2.30490E−15 | A14 = 0.00000E+00 |

In the magnification-variable optical system ZL5, the on-axis air spaces d8 and d9 between the first lens group G1 and the second lens group G2, the on-axis air space d14 between the second lens group G2 and the third lens group G3, the on-axis air space d18 between the third lens group G3 and the fourth lens group G4, the on-axis air space d24 between the fourth lens group G4 and the fifth lens group G5, and the on-axis air space d31 between the fifth lens group G5 and the filter FL change at magnification change and focusing. Table 19 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 19

| [Variable distance data] | | | |
|---|---|---|---|
| Wide-angle state | | Intermediate focal-length state | Telescopic state |
| -Focusing on an object at infinity- | | | |
| f | 14.398 | 17.997 | 19.996 | 23.295 |
| d0 | ∞ | ∞ | ∞ | ∞ |
| d8 | 23.4594 | 12.0282 | 7.3795 | 1.5000 |
| d9 | 0.0000 | 0.0000 | 0.0000 | 0.0000 |
| d14 | 5.9621 | 10.0114 | 10.4817 | 10.0986 |
| d18 | 3.2198 | 4.9501 | 5.7201 | 6.6670 |
| d24 | 6.9306 | 2.1947 | 1.0000 | 0.0000 |
| d31 | 0.5000 | 6.1010 | 9.5647 | 15.3030 |
| -Focusing on an object at a close distance- | | | |
| β | −0.025 | −0.025 | −0.025 | −0.025 |
| d0 | 543.8708 | 688.9750 | 769.4422 | 902.0778 |
| d8 | 23.4594 | 12.0282 | 7.3795 | 1.5000 |
| d9 | 0.7957 | 0.6366 | 0.5823 | 0.5176 |
| d14 | 5.1665 | 9.3748 | 9.8994 | 9.5810 |
| d18 | 3.2198 | 4.9501 | 5.7201 | 6.6670 |
| d24 | 6.9306 | 2.1947 | 1.0000 | 0.0000 |
| d31 | 0.5000 | 6.1010 | 9.5647 | 15.3030 |
| -Focusing on an object at the closest distance- | | | |
| β | −0.104 | −0.126 | −0.140 | −0.163 |
| d0 | 113.1249 | 117.8508 | 119.0910 | 119.6750 |
| d8 | 23.4594 | 12.0282 | 7.3795 | 1.5000 |
| d9 | 3.1636 | 3.0691 | 3.0949 | 3.1924 |
| d14 | 2.7985 | 6.9423 | 7.3868 | 6.9061 |
| d18 | 3.2198 | 4.9501 | 5.7201 | 6.6670 |
| d24 | 6.9306 | 2.1947 | 1.0000 | 0.0000 |
| d31 | 0.5000 | 6.1010 | 9.5647 | 15.3030 |

Table 20 below shows values compliant to the condition expressions in the magnification-variable optical system ZL5. In the magnification-variable optical system ZL5, the specific negative lens is the biconcave negative lens L13, and the specific lens is each of the biconvex positive lens L51 and the biconvex positive lens L54.

TABLE 20

| $\Sigma \nu 1n = 190.75$ |
|---|
| $\Sigma (\nu 1n \times f1n) = -8509.219$ |
| STLw = 83.425 |
| fL1 = −32.395 |
| fL2 = −50.648 |

| [Values compliant to conditional expressions] |
|---|
| (1) $\nu 1n = 95.23$ |
| (2) nL2/nL1 = 1.160 |
| (3) N1n = 3 |
| (4) 2ωw = 114.745° |
| (5) nL1 = 1.623 |
| (6) fw × (−f1)/Fnow = 105.570 mm² |
| (7) (L1r2 + L1r1)/(L1r2 − L1r1) = −1.280 |
| (8) $(\Sigma \nu 1n)/N1n = 63.583$ |
| (9) $(\Sigma (\nu 1n \times f1n))/(N1n \times f1) = 132.952$ |
| (10) Bfw/fw = 2.640 |
| (11) STLw/TLw = 0.521 |
| (12) (−f1)/fw = 1.482 |
| (13) (−f1)/ft = 0.916 |
| (14) fL1/f1 = 1.518 |
| (15) fL2/f1 = 2.374 |
| (16) TLw/Bfw = 4.212 |
| (17) (L2r2 + L2r1)/(L2r2 − L2r1) = −1.667 |
| (18) (L3r2 + L3r1)/(L3r2 − L3r1) = 0.058 |
| (19) νr = 82.57 |
| (20) Fnow = 2.91 |
| (21) Fnot = 2.91 |

As described above, the magnification-variable optical system ZL5 satisfies all Conditional Expressions (1) to (21) described above.

FIG. 10 shows a variety of aberration diagrams of the magnification-variable optical system ZL5 in the wide-angle state and the telescopic state at focusing on an object at infinity. The variety of aberration diagrams show that the magnification-variable optical system ZL5 allows favorable correction of the variety of aberrations from the wide-angle state to the telescopic state and provides excellent imaging performance.

Sixth Example

FIG. 11 shows a configuration of a magnification-variable optical system ZL6 according to the sixth example. The magnification-variable optical system ZL6 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, a fourth lens group G4 having negative refractive power, and a fifth lens group G5 having positive refractive power.

In the magnification-variable optical system ZL6, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, a biconcave negative lens L13, and a plano-convex positive lens L14 having a convex surface facing the object side. The second lens group G2 is formed of a cemented lens formed by cementing a negative meniscus lens L21 having a convex surface facing the object side and a biconvex positive lens L22 to each other sequentially from the object side. The third lens group G3 is formed of a cemented lens formed by cementing a negative meniscus lens L31 having a convex surface facing the object side and a biconvex positive lens L32 to each other sequentially from the object side. The fourth lens group G4 includes, sequentially from the object side, negative meniscus lens L41 having a concave surface facing the object side, and a cemented lens formed by cementing a biconcave negative lens L42 and a biconvex positive lens L43 to each other. The fifth lens group G5 includes, sequentially from the object side, a cemented lens formed by cementing a biconvex positive lens L51 and a negative meniscus lens L52 having a concave surface facing the object side to each other, a cemented lens formed by cementing a negative meniscus lens L53 having a convex surface facing the object side and a biconvex positive lens L54 to each other, and an aspheric negative lens L55 having an aspheric lens surface on the image side and shaped in a negative meniscus lens having a concave surface facing the object side. A filter FL is disposed between the fifth lens group G5 and an image plane I.

In the magnification-variable optical system ZL6, at magnification change from the wide-angle state to the telescopic state, the first lens group G1 moves to the image side and the second lens group G2, the third lens group G3, the fourth lens group G4, and the fifth lens group G5 move to the object side so that the distance between the first lens group G1 and the second lens group G2 decreases, the distance between the second lens group G2 and the third lens group G3 changes, the distance between the third lens group G3 and the fourth lens group G4 increases, the distance between the fourth lens group G4 and the fifth lens group G5 decreases, and the distance (back focus) between the fifth lens group G5 and the image plane I increases. An aperture stop S is disposed between the third lens group G3 and the fourth lens group G4 and moves together with the fourth lens group G4 at magnification change.

The magnification-variable optical system ZL6 performs focusing upon from an infinite distance object to a close distance object by moving the second lens group G2 to the image side.

Table 21 below shows the values of specifications of the magnification-variable optical system ZL6.

In Table 21, the sixteenth surface corresponds to the aperture stop S, and the ninth surface, the twenty-second surface, and the thirty-first surface correspond to virtual surfaces. An auxiliary aperture may be disposed at the twenty-second surface.

In a case in which a filter is disposed on the object side in the magnification-variable optical system ZL6, the filter is disposed at a position separated by 6.10 mm on the object side from the first surface.

TABLE 21

Sixth example

[Overall specifications]

| | Wide-angle state | | Intermediate focal-length state | | Telescopic state |
|---|---|---|---|---|---|
| f = | 14.400 | to | 18.000 to 20.000 | to | 23.300 |
| FNO = | 2.91 | to | 2.91 to 2.91 | to | 2.91 |
| 2ω (°) = | 114.742 | to | 100.593 to 93.838 | to | 84.517 |
| Ymax = | 21.600 | to | 21.600 to 21.600 | to | 21.600 |
| TL (air equivalent length) = | 155.513 | to | 152.665 to 152.329 | to | 152.315 |
| Bf (air equivalent length) = | 38.123 | to | 43.258 to 46.065 | to | 51.259 |

[Lens data]

| m | r | d | nd | vd |
|---|---|---|---|---|
| Object plane | ∞ | | | |
| 1* | 201.4901 | 3.1000 | 1.516800 | 64.13 |
| 2* | 15.2473 | 15.4015 | | |
| 3 | 603.8279 | 2.0000 | 1.795256 | 45.25 |
| 4* | 42.2007 | 8.2350 | | |
| 5 | −63.7303 | 1.7000 | 1.497820 | 82.57 |
| 6 | 37.4616 | 0.2008 | | |
| 7 | 34.7568 | 5.6708 | 1.883000 | 40.66 |
| 8 | 0.0000 | d8 | | |
| 9 | 0.0000 | d9 | | |
| 10 | 44.7965 | 1.1000 | 1.963000 | 24.11 |
| 11 | 20.5527 | 4.6000 | 1.698950 | 30.13 |
| 12 | −190.9319 | d12 | | |
| 13 | 49.0558 | 1.1000 | 1.963000 | 24.11 |
| 14 | 29.9609 | 5.8000 | 1.516800 | 64.13 |
| 15 | −38.9734 | d15 | | |
| 16 | 0.0000 | 2.7000 | | Aperture stop S |
| 17 | −51.6576 | 1.1000 | 1.883000 | 40.66 |
| 18 | −116.3501 | 1.3131 | | |
| 19 | −38.6822 | 1.1000 | 1.883000 | 40.66 |
| 20 | 25.7541 | 3.9000 | 1.963000 | 24.11 |
| 21 | −180.3900 | 1.2000 | | |
| 22 | 0.0000 | d22 | | |
| 23 | 31.7152 | 8.6000 | 1.497820 | 82.57 |
| 24 | −21.9588 | 1.2000 | 1.834810 | 42.73 |
| 25 | −35.9397 | 0.2000 | | |
| 26 | 64.5388 | 1.2000 | 1.902650 | 35.72 |
| 27 | 23.4943 | 10.0000 | 1.497820 | 82.57 |
| 28 | −24.5354 | 0.2000 | | |
| 29 | −29.0690 | 1.2000 | 1.860999 | 37.10 |
| 30* | −47.9865 | d30 | | |
| 31 | 0.0000 | 35.2000 | | |
| 32 | 0.0000 | 2.0000 | 1.516800 | 64.13 |
| 33 | 0.0000 | 1.0502 | | |
| Image plane | ∞ | | | |

[Focal length of lens groups]

| Lens group | First surface | Focal length |
|---|---|---|
| First lens group | 1 | −21.025 |
| Second lens group | 10 | 81.077 |
| Third lens group | 13 | 56.282 |
| Fourth lens group | 17 | −42.270 |
| Fifth lens group | 23 | 37.527 |

In the magnification-variable optical system ZL6, the first surface, the second surface, the fourth surface, and the thirtieth surface have aspheric lens surfaces. Table 22 below shows the surface number m and data of the aspheric surfaces, in other words, the values of the conical constant K and the aspheric coefficients A4 to A12.

ZL6. In the magnification-variable optical system ZL6, the specific negative lens is the biconcave negative lens L13, and the specific lens is each of the biconvex positive lens L51 and the biconvex positive lens L54.

TABLE 22

[Data on aspherical surface]

| | |
|---|---|
| First surface | K = 1.0000 |
| | A4 = 5.05392E−06  A6 = −4.62096E−09  A8 = 4.79306E−12 |
| | A10 = −2.73669E−15  A12 = 8.66720E−19  A14 = 0.00000E+00 |
| Second surface | K = 0.0000 |
| | A4 = 3.76598E−06  A6 = 8.88285E−09  A8 = −7.50984E−12 |
| | A10 = −1.78288E−14  A12 = −8.37710E−17  A14 = 0.00000E+00 |
| Fourth surface | K = 2.0000 |
| | A4 = 1.41674E−05  A6 = 2.34561E−09  A8 = 1.37528E−10 |
| | A10 = −4.20057E−13  A12 = 1.08030E−15  A14 = 0.00000E+00 |
| Thirtieth surface | K = 1.0000 |
| | A4 = 9.98516E−06  A6 = 4.68513E−09  A8 = 1.00957E−10 |
| | A10 = −3.98485E−13  A12 = 9.87550E−16  A14 = 0.00000E+00 |

In the magnification-variable optical system ZL6, the on-axis air spaces d8 and d9 between the first lens group G1 and the second lens group G2, an on-axis air space d12 between the second lens group G2 and the third lens group G3, an on-axis air space d15 between the third lens group G3 and the fourth lens group G4, an on-axis air space d22 between the fourth lens group G4 and the fifth lens group G5, and an on-axis air space d30 between the fifth lens group G5 and the filter FL change at magnification change and focusing. Table 23 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 23

[Variable distance data]

| | Wide-angle state | Intermediate focal-length state | Telescopic state | |
|---|---|---|---|---|
| -Focusing on an object at infinity- | | | | |
| f | 14.400 | 18.000 | 20.000 | 23.300 |
| d0 | ∞ | ∞ | ∞ | ∞ |
| d8 | 20.6874 | 10.5726 | 6.5831 | 1.5000 |
| d9 | 0.0000 | 0.0000 | 0.0000 | 0.0000 |
| d12 | 6.6363 | 9.9733 | 10.6667 | 10.4559 |
| d15 | 1.5000 | 3.6282 | 4.9450 | 6.2785 |
| d22 | 5.7449 | 2.4116 | 1.2488 | 0.0000 |
| d30 | 0.5000 | 5.5629 | 8.4375 | 13.6950 |
| -Focusing on an object at a close distance- | | | | |
| β | −0.025 | −0.025 | −0.025 | −0.025 |
| d0 | 544.5834 | 689.3773 | 769.7371 | 902.2544 |
| d8 | 20.6874 | 10.5726 | 6.5831 | 1.5000 |
| d9 | 0.7871 | 0.6675 | 0.6213 | 0.5623 |
| d12 | 5.8493 | 9.3059 | 10.0454 | 9.8936 |
| d15 | 1.5000 | 3.6282 | 4.9450 | 6.2785 |
| d22 | 5.7449 | 2.4116 | 1.2488 | 0.0000 |
| d30 | 0.5000 | 5.5629 | 8.4375 | 13.6950 |
| -Focusing on an object at the closest distance- | | | | |
| β | −0.101 | −0.124 | −0.138 | −0.162 |
| d0 | 117.7057 | 120.5537 | 120.8893 | 120.9039 |
| d8 | 20.6874 | 10.5726 | 6.5831 | 1.5000 |
| d9 | 3.0261 | 3.1485 | 3.2479 | 3.4206 |
| d12 | 3.6103 | 6.8249 | 7.4188 | 7.0353 |
| d15 | 1.5000 | 3.6282 | 4.9450 | 6.2785 |
| d22 | 5.7449 | 2.4116 | 1.2488 | 0.0000 |
| d30 | 0.5000 | 5.5629 | 8.4375 | 13.6950 |

Table 24 below shows values compliant to the condition expressions in the magnification-variable optical system

TABLE 24

| |
|---|
| Σv1n = 191. 95 |
| Σ (v1n × f1n) = −8535.853 |
| STLw = 77.732 |
| fL1 = −32.101 |
| fL2 = −57.143 |

[Values compliant to conditional expressions]

| |
|---|
| (1) v1n = 82.57 |
| (2) nL2/nL1 = 1.184 |
| (3) N1n = 3 |
| (4) 2ωw = 114.742° |
| (5) nL1 = 1.517 |
| (6) fw × (−f1)/Fnow = 104.042 mm$^2$ |
| (7) (L1r2 + L1r1)/(L1r2 − L1r1) = −1.164 |
| (8) (Σv1n)/N1n = 63.983 |
| (9) (Σ (v1n × f1n))/(N1n × f1) = 135.328 |
| (10) Bfw/fw = 2.647 |
| (11) STLw/TLw = 0.500 |
| (12) (−f1)/fw = 1.460 |
| (13) (−f1)/ft = 0.902 |
| (14) fL1/f1 = 1.527 |
| (15) fL2/f1 = 2.718 |
| (16) TLw/Bfw = 4.079 |
| (17) (L2r2 + L2r1)/(L2r2 − L2r1) = −1.150 |
| (18) (L3r2 + L3r1)/(L3r2 − L3r1) = −0.260 |
| (19) vr = 82.57 |
| (20) Fnow = 2.91 |
| (21) Fnot =2.91 |

As described above, the magnification-variable optical system ZL6 satisfies all Conditional Expressions (1) to (21) described above.

FIG. 12 shows a variety of aberration diagrams of the magnification-variable optical system ZL6 in the wide-angle state and the telescopic state at focusing on an object at infinity. The variety of aberration diagrams show that the magnification-variable optical system ZL6 allows favorable correction of the variety of aberrations from the wide-angle state to the telescopic state and provides excellent imaging performance.

Seventh Example

FIG. 13 shows a configuration of a magnification-variable optical system ZL7 according to the seventh example. The magnification-variable optical system ZL7 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, a fourth lens group G4 having negative refractive power, and a fifth lens group G5 having positive refractive power.

In the magnification-variable optical system ZL7, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, a biconcave negative lens L13, and a biconvex positive lens L14. The second lens group G2 includes, sequentially from the object side, a cemented lens formed by cementing a negative meniscus lens L21 having a convex surface facing the object side and a biconvex positive lens L22 to each other, and a negative meniscus lens L23 having a concave surface facing the object side. The third lens group G3 is formed of a cemented lens formed by cementing a negative meniscus lens L31 having a convex surface facing the object side and a biconvex positive lens L32 to each other sequentially from the object side. The fourth lens group G4 is formed of a cemented lens formed by cementing a biconcave negative lens L41 and a biconvex positive lens L42 to each other sequentially from the object side. The fifth lens group G5 includes, sequentially from the object side, a cemented lens formed by cementing a negative meniscus lens L51 having a convex surface facing the object side and a biconvex positive lens L52 to each other, and a cemented lens formed by cementing a negative meniscus lens L53 having a convex surface facing the object side, a biconvex positive lens L54, and an aspheric negative lens L55 having an aspheric lens surface on the image side and shaped in a negative meniscus lens having a concave surface facing the object side to each other. A filter FL is disposed between the fifth lens group G5 and an image plane I.

In the magnification-variable optical system ZL7, at magnification change from the wide-angle state to the telescopic state, the first lens group G1 moves to the image side and the second lens group G2, the third lens group G3, the fourth lens group G4, and the fifth lens group G5 move to the object side so that the distance between the first lens group G1 and the second lens group G2 decreases, the distance between the third lens group G3 and the fourth lens group G4 increases, the distance between the fourth lens group G4 and the fifth lens group G5 decreases, and the distance (back focus) between the fifth lens group G5 and the image plane I increases. The second lens group G2 and the third lens group G3 integrally move at magnification change. An aperture stop S is disposed between the third lens group G3 and the fourth lens group G4 and moves together with the fourth lens group G4 at magnification change.

The magnification-variable optical system ZL7 performs focusing upon from an infinite distance object to a close distance object by moving the second lens group G2 to the image side.

Table 25 below shows the values of specifications of the magnification-variable optical system ZL7.

In Table 25, the eighteenth surface corresponds to the aperture stop S, and the ninth surface, the twenty-second surface, and the thirtieth surface correspond to virtual surfaces. An auxiliary aperture may be disposed at the twenty-second surface.

In a case in which a filter is disposed on the object side in the magnification-variable optical system ZL7, the filter is disposed at a position separated by 6.10 mm on the object side from the first surface.

TABLE 25

Seventh example

[Overall specifications]

| | Wide-angle state | | Intermediate focal-length state | | Telescopic state |
|---|---|---|---|---|---|
| f = | 14.400 | to 18.000 | to 20.000 | to | 23.300 |
| FNO = | 2.91 | to 2.91 | to 2.91 | to | 2.91 |
| 2ω (°) = | 114.733 | to 100.450 | to 93.835 | to | 84.548 |
| Ymax = | 21.600 | to 21.600 | to 21.600 | to | 21.600 |
| TL (air equivalent length) = | 162.664 | to 155.206 | to 153.078 | to | 151.580 |
| Bf (air equivalent length) = | 38.030 | to 42.928 | to 45.480 | to | 49.783 |

[Lens data]

| m | r | d | nd | νd |
|---|---|---|---|---|
| Object plane | ∞ | | | |
| 1* | 115.7220 | 3.1000 | 1.622910 | 58.30 |
| 2* | 16.6323 | 14.8987 | | |
| 3 | 370.8034 | 2.0000 | 1.882023 | 37.22 |
| 4* | 41.1683 | 9.2575 | | |
| 5 | −46.1330 | 1.6000 | 1.497820 | 82.57 |
| 6 | 80.3534 | 3.1175 | | |
| 7 | 55.6397 | 6.7000 | 1.637964 | 38.48 |
| 8 | −73.0750 | d8 | | |
| 9 | 0.0000 | d9 | | |
| 10 | 40.8572 | 1.1000 | 1.953721 | 32.33 |
| 11 | 23.4797 | 6.2000 | 1.662956 | 32.26 |
| 12 | −46.4852 | 1.4528 | | |
| 13 | −42.2265 | 1.1000 | 1.953745 | 32.33 |
| 14 | −128.2484 | d14 | | |
| 15 | 38.1116 | 1.1000 | 1.963000 | 24.11 |
| 16 | 23.4511 | 6.5000 | 1.520273 | 68.04 |
| 17 | −55.7009 | d17 | | |
| 18 | 0.0000 | 3.8271 | | Aperture stop S |
| 19 | −56.4383 | 1.1000 | 1.919778 | 33.15 |
| 20 | 23.9956 | 4.2000 | 1.808090 | 22.74 |
| 21 | −281.4369 | | | |
| 22 | 0.0000 | d22 | | |
| 23 | 26.3769 | 1.2000 | 1.615813 | 50.88 |
| 24 | 19.6278 | 7.5000 | 1.497820 | 82.57 |
| 25 | −40.0111 | 0.2000 | | |
| 26 | 439.2276 | 1.2000 | 1.756739 | 39.10 |
| 27 | 20.1301 | 7.8000 | 1.497820 | 82.57 |
| 28 | −66.7106 | 1.2000 | 1.882023 | 37.22 |
| 29* | −87.9719 | d29 | | |
| 30 | 0.0000 | 35.2000 | | |
| 31 | 0.0000 | 2.0000 | 1.516800 | 64.13 |
| 32 | 0.0000 | 1.2022 | | |
| Image plane | ∞ | | | |

[Focal length of lens groups]

| Lens group | First surface | Focal length |
|---|---|---|
| First lens group | 1 | −22.762 |
| Second lens group | 10 | 92.534 |
| Third lens group | 15 | 64.107 |
| Fourth lens group | 19 | −55.689 |
| Fifth lens group | 23 | 45.190 |

In the magnification-variable optical system ZL7, the first surface, the second surface, the fourth surface, and the twenty-ninth surface have aspheric lens surfaces. Table 26 below shows the surface number m and data of the aspheric surfaces, in other words, the values of the conical constant K and the aspheric coefficients A4 to A12.

TABLE 26

[Data on aspherical surface]

| First surface | K = 1.0000 | | |
|---|---|---|---|
| | A4 = 4.80598E−06 | A6 = −2.42564E−09 | A8 = 1.78291E−12 |
| | A10 = −1.05251E−15 | A12 = 6.26000E−19 | A14 = 0.00000E+00 |
| Second surface | K = 0.0000 | | |
| | A4 = 3.68669E−06 | A6 = 1.22584E−08 | A8 = 6.05239E−12 |
| | A10 = 2.50928E−14 | A12 = −1.70140E−16 | A14 = 0.00000E+00 |
| Fourth surface | K = 1.0000 | | |
| | A4 = 1.44539E−05 | A6 = −5.00574E−10 | A8 = 5.52057E−11 |
| | A10 = −5.98876E−14 | A12 = 3.04350E−16 | A14 = 0.00000E+00 |
| Twenty-ninth surface | K = 1.0000 | | |
| | A4 = 1.07870E−05 | A6 = 7.32487E−09 | A8 = 1.83159E−10 |
| | A10 = −9.56431E−13 | A12 = 3.09390E−15 | A14 = 0.00000E+00 |

In the magnification-variable optical system ZL7, the on-axis air spaces d8 and d9 between the first lens group G1 and the second lens group G2, on-axis air space d14 between the second lens group G2 and the third lens group G3, on-axis air space d17 between the third lens group G3 and the fourth lens group G4, the on-axis air space d22 between the fourth lens group G4 and the fifth lens group G5, and an on-axis air space d29 between the fifth lens group G5 and the filter FL change at magnification change and focusing. Table 27 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 27

[Variable distance data]

| | Wide-angle state | Intermediate focal-length state | Telescopic state | |
|---|---|---|---|---|
| -Focusing on an object at infinity- | | | | |
| f | 14.400 | 18.000 | 20.000 | 23.300 |
| d0 | ∞ | ∞ | ∞ | ∞ |
| d8 | 24.3283 | 11.9508 | 7.2794 | 1.5000 |
| d9 | 0.0000 | 0.0000 | 0.0000 | 0.0000 |
| d14 | 5.4427 | 5.4427 | 5.4427 | 5.4427 |
| d17 | 1.5000 | 3.8035 | 5.2139 | 7.3002 |
| d22 | 5.8094 | 3.5281 | 2.1089 | 0.0000 |
| d29 | 0.5000 | 5.2980 | 7.9112 | 12.2190 |
| -Focusing on an object at a close distance- | | | | |
| β | −0.025 | −0.025 | −0.025 | −0.025 |
| d0 | 544.5834 | 689.3773 | 770.0044 | 902.4751 |
| d8 | 24.3283 | 11.9508 | 7.2794 | 1.5000 |
| d9 | 0.9072 | 0.7587 | 0.7018 | 0.6289 |
| d14 | 4.5355 | 4.6840 | 4.7409 | 4.8138 |
| d17 | 1.5000 | 3.8035 | 5.2139 | 7.3002 |
| d22 | 5.8094 | 3.5281 | 2.1089 | 0.0000 |
| d29 | 0.5000 | 5.2980 | 7.9112 | 12.2190 |
| -Focusing on an object at the closest distance- | | | | |
| β | −0.106 | −0.127 | −0.139 | −0.161 |
| d0 | 110.5549 | 118.0123 | 120.1404 | 121.6387 |
| d8 | 24.3283 | 11.9508 | 7.2794 | 1.5000 |
| d9 | 3.6767 | 3.6540 | 3.7024 | 3.8252 |
| d14 | 1.7660 | 1.7887 | 1.7403 | 1.6175 |
| d17 | 1.5000 | 3.8035 | 5.2139 | 7.3002 |
| d22 | 5.8094 | 3.5281 | 2.1089 | 0.0000 |
| d29 | 0.5000 | 5.2980 | 7.9112 | 12.2190 |

Table 28 below shows values compliant to the condition expressions in the magnification-variable optical system ZL7. In the magnification-variable optical system ZL7, the specific negative lens is the biconcave negative lens L13, and the specific lens is each of the biconvex positive lens L51 and the biconvex positive lens L54.

TABLE 28

Σv1n = 178.09
Σ (v1n × f1n) = −8640.434
STLw = 83.398
fL1 = −31.562
fL2 = −52.654

[Values compliant to conditional expressions]

(1) v1n = 82.57
(2) nL2/nL1 = 1.160
(3) N1n = 3
(4) 2ωw = 114.733°
(5) nL1 = 1.623
(6) fw × (−f1)/Fnow = 112.637 mm$^2$
(7) (L1r2 + L1r1)/(L1r2 − L1r1) = −1.336
(8) (Σv1n)/N1n = 59.363
(9) (Σ (v1n × f1n))/(N1n × f1) = 126.533
(10) Bfw/fw = 2.641
(11) STLw/TLw = 0.550
(12) (−f1)/fw = 1.581
(13) (−f1)/ft = 0.977
(14) fL1/f1 = 1.387
(15) fL2/f1 = 2.313
(16) TLw/Bfw = 4.277
(17) (L2r2 + L2r1)/(L2r2 − L2r1) = −1.250
(18) (L3r2 + L3r1)/(L3r2 − L3r1) = 0.271
(19) vr = 82.57
(20) Fnow = 2.91
(21) Fnot = 2.91

As described above, the magnification-variable optical system ZL7 satisfies all Conditional Expressions (1) to (21) described above.

FIG. 14 shows a variety of aberration diagrams of the magnification-variable optical system ZL7 in the wide-angle state and the telescopic state at focusing on an object at infinity. The variety of aberration diagrams show that the magnification-variable optical system ZL7 allows favorable correction of the variety of aberrations from the wide-angle state to the telescopic state and provides excellent imaging performance.

Eighth Example

FIG. 15 shows a configuration of a magnification-variable optical system ZL8 according to the eighth example. The magnification-variable optical system ZL8 includes, sequentially from the object side, a first lens group G1 having negative refractive power and a rear group GR having positive refractive power. The rear group GR includes, sequentially from the object side, the second lens group G2 having positive refractive power and the third lens group G3 having positive refractive power.

In the magnification-variable optical system ZL8, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, a biconcave negative lens L13, and a biconvex positive lens L14. The second lens group G2 is formed of a cemented lens formed by cementing negative meniscus lens L21 having a convex surface facing the object side and a positive meniscus lens L22 having a convex surface facing the object side to each other sequentially from the object side. The third lens group G3 includes, sequentially from the object side, a cemented lens formed by cementing a negative meniscus lens L31 having a convex surface facing the object side and a biconvex positive lens L32 to each other, a cemented lens formed by cementing a biconcave negative lens L33 and a biconvex positive lens L34 to each other, a biconvex positive lens L35, a cemented lens formed by cementing a negative meniscus lens L36 having a convex surface facing the object side and a positive meniscus lens L37 having a convex surface facing the object side to each other, a cemented lens formed by cementing a biconvex positive lens L38 and a biconcave negative lens L39 to each other, and an aspheric positive lens L310 having an aspheric lens surface on the object side and shaped in a positive meniscus lens having a concave surface facing the object side. A filter FL is disposed between the third lens group G3 and an image plane I.

In the magnification-variable optical system ZL8, at magnification change from the wide-angle state to the telescopic state, the first lens group G1 moves to the image side and the second lens group G2 and the third lens group G3 move to the object side so that the distance between the first lens group G1 and the second lens group G2 decreases, the distance between the second lens group G2 and the third lens group G3 decreases, and the distance (back focus) between the third lens group G3 and an image plane I increases. An aperture stop S is disposed in the third lens group G3 (between the cemented lens formed by cementing the negative meniscus lens L31 and the biconvex positive lens L32 to each other and the cemented lens formed by cementing the biconcave negative lens L33 and the biconvex positive lens L34 to each other), and moves together with the third lens group G3 at magnification change.

The magnification-variable optical system ZL8 performs focusing upon from an infinite distance object to a close distance object by moving the second lens group G2 to the image side.

Table 29 below shows the values of specifications of the magnification-variable optical system ZL8.

In Table 29, the sixteenth surface corresponds to the aperture stop S, and the ninth surface and the twentieth surface correspond to virtual surfaces. An auxiliary aperture may be disposed at the twentieth surface.

In a case in which a filter is disposed on the object side in the magnification-variable optical system ZL8, the filter is disposed at a position separated by 6.10 mm on the object side from the first surface.

TABLE 29

Eighth example

[Overall specifications]

| | Wide-angle state | | Intermediate focal-length state | | Telescopic state |
|---|---|---|---|---|---|
| f = | 14.400 | to | 16.000 | to | 18.000 | to | 23.300 |
| FNO = | 2.91 | to | 2.91 | to | 2.91 | to | 2.91 |
| 2ω (°) = | 115.176 | to | 108.256 | to | 100.691 | to | 84.861 |
| Ymax = | 21.600 | to | 21.600 | to | 21.600 | to | 21.600 |
| TL (air equivalent length) = | 137.332 | to | 134.390 | to | 131.934 | to | 129.823 |
| Bf (air equivalent length) = | 22.585 | to | 24.937 | to | 27.848 | to | 35.493 |

[Lens data]

| m | r | d | nd | vd |
|---|---|---|---|---|
| Object plane | ∞ | | | |
| 1* | 342.7914 | 3.0000 | 1.588870 | 61.13 |
| 2* | 16.1106 | 11.6048 | | |
| 3 | 49.2913 | 2.0000 | 1.820980 | 42.50 |
| 4* | 25.8983 | 11.3832 | | |
| 5 | −45.4837 | 1.5000 | 1.497820 | 82.57 |
| 6 | 54.3748 | 0.5376 | | |
| 7 | 38.8825 | 6.6444 | 1.635257 | 33.41 |
| 8 | −91.9824 | d8 | | |
| 9 | 0.0000 | 0.0000 | | |
| 10 | 33.1746 | 1.1000 | 1.963000 | 24.11 |
| 11 | 19.3866 | 4.3000 | 1.654152 | 32.42 |
| 12 | 119.3997 | d12 | | |
| 13 | 24.1338 | 1.1000 | 1.846660 | 23.80 |
| 14 | 17.5000 | 6.2000 | 1.511153 | 65.39 |
| 15 | −363.4978 | 1.5000 | | |
| 16 | 0.0000 | 2.8214 | | Aperture stop S |
| 17 | −41.4313 | 1.1000 | 1.953750 | 32.33 |
| 18 | 27.1802 | 5.4000 | 1.846660 | 23.80 |
| 19 | −54.0998 | 0.3995 | | |
| 20 | 0.0000 | −0.3000 | | |
| 21 | 24.5452 | 6.0000 | 1.497820 | 82.57 |
| 22 | −55.5602 | 0.2000 | | |
| 23 | 51.0776 | 1.1000 | 1.834810 | 42.73 |
| 24 | 17.5706 | 5.0000 | 1.497820 | 82.57 |
| 25 | 163.6668 | 0.2000 | | |
| 26 | 37.0379 | 7.0000 | 1.497820 | 82.57 |
| 27 | −18.4013 | 1.1000 | 1.834810 | 42.73 |
| 28 | 86.5739 | 3.9979 | | |
| 29* | −60.3503 | 2.0000 | 1.860999 | 37.10 |
| 30 | −50.2613 | d30 | | |
| 31 | 0.0000 | 1.6000 | 1.516800 | 64.13 |
| 32 | 0.0000 | 1.0688 | | |
| Image plane | ∞ | | | |

[Focal length of lens groups]

| Lens group | First surface | Focal length |
|---|---|---|
| First lens group | 1 | −21.915 |
| Second lens group | 9 | 122.590 |
| Third lens group | 13 | 39.056 |

In the magnification-variable optical system ZL8, the first surface, the second surface, the fourth surface, and the twenty-ninth surface have aspheric lens surfaces. Table 30 below shows the surface number m and data of the aspheric surfaces, in other words, the values of the conical constant K and the aspheric coefficients A4 to A12.

TABLE 30

[Data on aspherical surface]

| | | | |
|---|---|---|---|
| First surface | K = 1.0000 | | |
| | A4 = 1.19707E−05 | A6 = −1.76977E−08 | A8 = 1.6943E−11 |
| | A10 = −8.85755E−15 | A12 = 1.9766E−18 | A14 = 0.00000E+00 |
| Second surface | K = 0.0000 | | |
| | A4 = 7.01276E−06 | A6 = 2.77908E−08 | A8 = 3.97015E−11 |
| | A10 = −5.16043E−13 | A12 = 6.2126E−16 | A14 = 0.00000E+00 |
| Fourth surface | K = 1.3632 | | |
| | A4 = 1.34780E−05 | A6 = −1.71246E−09 | A8 = 5.11129E−11 |
| | A10 = 3.88045E−13 | A12 = 1.1914E−18 | A14 = 0.00000E+00 |
| Twenty-ninth surface | K = 1.0000 | | |
| | A4 = −2.04742E−05 | A6 = −5.87424E−08 | A8 = 2.99693E−10 |
| | A10 = −3.41851E−12 | A12 = 7.3793E−15 | A14 = 0.00000E+00 |

In the magnification-variable optical system ZL8, the on-axis air space d8 between the first lens group G1 and the second lens group G2, the on-axis air space d12 between the second lens group G2 and the third lens group G3, and an on-axis air space d30 between the third lens group G3 and the filter FL change at magnification change and focusing. Table 31 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 31

[Variable distance data]

| | Wide-angle state | Intermediate focal-length state | Telescopic state | |
|---|---|---|---|---|
| -Focusing on an object at infinity- | | | | |
| f | 14.400 | 16.000 | 18.000 | 23.300 |
| d0 | ∞ | ∞ | ∞ | ∞ |
| d8 | 19.3279 | 14.5264 | 9.8351 | 1.5000 |
| d12 | 8.5296 | 8.0374 | 7.3623 | 5.9410 |
| d30 | 20.4803 | 22.8718 | 25.7862 | 33.4872 |
| -Focusing on an object at a close distance- | | | | |
| β | −0.025 | −0.025 | −0.025 | −0.025 |
| d0 | 547.1797 | 611.4703 | 691.7918 | 904.4881 |
| d8 | 20.3497 | 15.4876 | 10.7327 | 2.2703 |
| d12 | 7.5079 | 7.0762 | 6.4647 | 5.1707 |
| d30 | 20.4803 | 22.8718 | 25.7862 | 33.4872 |
| -Focusing on an object at the closest distance- | | | | |
| β | −0.091 | −0.099 | −0.110 | −0.142 |
| d0 | 136.0234 | 138.9653 | 141.4208 | 143.5318 |
| d8 | 22.8593 | 18.1510 | 13.5843 | 5.5992 |
| d12 | 4.9982 | 4.4129 | 3.6131 | 1.8418 |
| d30 | 20.4803 | 22.8718 | 25.7862 | 33.4872 |

Table 32 below shows values compliant to the condition expressions in the magnification-variable optical system ZL8. In the magnification-variable optical system ZL8, the specific negative lens is the biconcave negative lens L13, and the specific lens is each of the biconvex positive lens L35, the positive meniscus lens L37, and the biconvex positive lens L38.

TABLE 32

Σν1n = 186.20
Σ (ν1n × f1n) = −8786.587
STLw = 78.728
fL1 = −28.806
fL2 = −69.134

TABLE 32-continued

[Values compliant to conditional expressions]

(1) ν1n = 82.57
(2) nL2/nL1 = 1.146
(3) N1n = 3
(4) 2ωw = 115.176°
(5) nL1 = 1.589
(6) fw × (−f1)/Fnow = 108.445 mm²
(7) (L1r2 + L1r1)/(L1r2 − L1r1) = −1.099
(8) (Σν1n)/N1n = 62.067
(9) (Σ (ν1n × f1n))/(N1n × f1) = 133.647
(10) Bfw/fw = 1.568
(11) STLw/TLw = 0.573
(12) (−f1)/fw = 1.522
(13) (−f1)/ft = 0.941
(14) fL1/f1 = 1.314
(15) fL2/f1 = 3.155
(16) TLw/Bfw = 6.081
(17) (L2r2 + L2r1)/(L2r2 − L2r1) = −3.214
(18) (L3r2 + L3r1)/(L3r2 − L3r1) = 0.089
(19) νr = 82.57
(20) Fnow = 2.91
(21) Fnot =2.91

As described above, the magnification-variable optical system ZL8 satisfies all Conditional Expressions (1) to (21) described above.

FIG. 16 shows a variety of aberration diagrams of the magnification-variable optical system ZL8 in the wide-angle state and the telescopic state at focusing on an object at infinity. The variety of aberration diagrams show that the magnification-variable optical system ZL8 allows favorable correction of the variety of aberrations from the wide-angle state to the telescopic state and provides excellent imaging performance.

Ninth Example

FIG. 17 shows a configuration of a magnification-variable optical system ZL9 according to the ninth example. The magnification-variable optical system ZL9 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, and a fourth lens group G4 having negative refractive power.

In the magnification-variable optical system ZL9, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, a biconcave negative lens L13, and a biconvex positive lens L14. The second lens group G2 is formed of a cemented lens formed by cementing a negative meniscus lens L21 having a convex surface facing the object side and a positive meniscus lens L22 having a convex surface facing the object side to each other sequentially from the object side. The third lens group G3 includes, sequentially from the object side, a cemented lens formed by cementing a negative meniscus lens L31 having a convex surface facing the object side and a positive meniscus lens L32 having a convex surface facing the object side to each other, a cemented lens formed by cementing a biconcave negative lens L33 and a biconvex positive lens L34 to each other, a biconvex positive lens L35, and a cemented lens formed by cementing a negative meniscus lens L36 having a convex surface facing the object side and a biconvex positive lens L37 to each other. The fourth lens group G4 includes, sequentially from the object side, a cemented lens formed by cementing a biconvex positive lens L41 and a biconcave negative lens L42, and an aspheric positive lens L43 having an aspheric lens surface on the object side and shaped in a positive meniscus lens having a concave surface facing the object side. A filter FL is disposed between the fourth lens group G4 and an image plane I.

In the magnification-variable optical system ZL9, at magnification change from the wide-angle state to the telescopic state, the first lens group G1 moves to the image side and the second lens group G2, the third lens group G3, and the fourth lens group G4 move to the object side so that the distance between the first lens group G1 and the second lens group G2 decreases, the distance between the second lens group G2 and the third lens group G3 decreases, the distance between the third lens group G3 and the fourth lens group G4 increases, and the distance (back focus) between the fourth lens group G4 and the image plane I increases. An aperture stop S is disposed in the third lens group G3 (between the cemented lens formed by cementing the negative meniscus lens L31 and the biconvex positive lens L32 to each other and the cemented lens formed by cementing the biconcave negative lens L33 and the biconvex positive lens L34 to each other), and moves together with the third lens group G3 at magnification change.

The magnification-variable optical system ZL9 performs focusing upon from an infinite distance object to a close distance object by moving the second lens group G2 to the image side.

Table 33 below shows the values of specifications of the magnification-variable optical system ZL9.

In Table 33, the sixteenth surface corresponds to the aperture stop S, and the ninth surface and the twentieth surface correspond to virtual surfaces. An auxiliary aperture may be disposed at the twentieth surface.

In a case in which a filter is disposed on the object side in the magnification-variable optical system ZL9, the filter is disposed at a position separated by 6.10 mm on the object side from the first surface.

TABLE 33

Ninth example

[Overall specifications]

| | Wide-angle state | | Intermediate focal-length state | | | | Telescopic state |
|---|---|---|---|---|---|---|---|
| f = | 14.400 | to | 16.000 | to | 18.000 | to | 23.300 |
| FNO = | 2.91 | to | 2.91 | to | 2.91 | to | 2.91 |
| 2ω (°) = | 115.123 | to | 107.999 | to | 100.301 | to | 84.436 |

TABLE 33-continued

Ninth example

| | | | | | | |
|---|---|---|---|---|---|---|
| Ymax = | 21.600 | to | 21.600 | to | 21.600 | to | 21.600 |
| TL (air equivalent length) = | 137.421 | to | 134.414 | to | 131.760 | to | 129.485 |
| Bf (air equivalent length) = | 21.808 | to | 24.029 | to | 26.719 | to | 34.219 |

[Lens data]

| m | r | d | nd | vd |
|---|---|---|---|---|
| Object plane | ∞ | | | |
| 1* | 211.8265 | 3.0000 | 1.588870 | 61.13 |
| 2* | 15.9992 | 11.6180 | | |
| 3 | 48.6821 | 2.0000 | 1.820980 | 42.50 |
| 4* | 25.7140 | 11.5301 | | |
| 5 | −43.5876 | 1.5000 | 1.497820 | 82.57 |
| 6 | 54.1333 | 0.5681 | | |
| 7 | 40.3289 | 6.60 69 | 1.625844 | 34.24 |
| 8 | −86.6000 | d8 | | |
| 9 | 0.0000 | 0.0000 | | |
| 10 | 36.9813 | 1.1000 | 1.963000 | 24.11 |
| 11 | 19.6099 | 4.3000 | 1.680196 | 30.69 |
| 12 | 1248.2429 | d12 | | |
| 13 | 26.0906 | 1.1000 | 1.846660 | 23.80 |
| 14 | 17.5000 | 6.2000 | 1.489456 | 69.86 |
| 15 | 1516.2872 | 1.5382 | | |
| 16 | 0.0000 | 2.6920 | | Aperture stop S |
| 17 | −46.0077 | 1.1000 | 1.953750 | 32.33 |
| 18 | 26.5003 | 5.4000 | 1.846660 | 23.80 |
| 19 | −55.7140 | 0.3744 | | |
| 20 | 0.0000 | −0.3000 | | |
| 21 | 25.7684 | 6.0000 | 1.497820 | 82.57 |
| 22 | −51.7236 | 0.2000 | | |
| 23 | 53.1758 | 1.1000 | 1.834810 | 42.73 |
| 24 | 17.7067 | 5.0000 | 1.497820 | 82.57 |
| 25 | −115.0285 | d25 | | |
| 26 | 57.4820 | 7.0000 | 1.497820 | 82.57 |
| 27 | −18.9711 | 1.1000 | 1.834810 | 42.73 |
| 28 | 69.6403 | 3.9109 | | |
| 29* | −41.3607 | 2.0000 | 1.860999 | 37.10 |
| 30 | −35.5329 | d30 | | |
| 31 | 0.0000 | 1.6000 | 1.516800 | 64.13 |
| 32 | 0.0000 | 0.9492 | | |
| Image plane | ∞ | | | |

[Focal length of lens groups]

| Lens group | First surface | Focal length |
|---|---|---|
| First lens group | 1 | −21.475 |
| Second lens group | 10 | 88.427 |
| Third lens group | 13 | 32.839 |
| Fourth lens group | 26 | −65.349 |

In the magnification-variable optical system ZL9, the first surface, the second surface, the fourth surface, and the twenty-ninth surface have aspheric lens surfaces. Table 34 below shows the surface number m and data of the aspheric surfaces, in other words, the values of the conical constant K and the aspheric coefficients A4 to A12.

TABLE 34

[Data on aspherical surface]

| | |
|---|---|
| First surface | K = 1.0000 |
| | A4 = 1.09229E−05    A6 = −1.69852E−08    A8 = 1.67481E−11 |
| | A10 = −8.86570E−15    A12 = 1.92870E−18    A14 = 0.00000E+00 |
| Second surface | K = 0.0000 |
| | A4 = 9.21479E−06    A6 = 2.30867E−08    A8 = 1.30262E−11 |
| | A10 = −4.06315E−13    A12 = 4.84400E−16    A14 = 0.00000E+00 |
| Fourth surface | K = 1.3178 |
| | A4 = 1.27593E−05    A6 = −2.12909E−09    A8 = 9.99165E−11 |
| | A10 = 8.39923E−14    A12 = 6.41400E−16    A14 = 0.00000E+00 |
| Twenty-ninth surface | K = 1.0000 |
| | A4 = −1.73924E−05    A6 = −5.17645E−08    A8 = 1.21697E−10 |
| | A10 = −2.24340E−12    A12 = 2.49200E−15    A14 = 0.00000E+00 |

In the magnification-variable optical system ZL9, the on-axis air space d8 between the first lens group G1 and the second lens group G2, the on-axis air space d12 between the second lens group G2 and the third lens group G3, an on-axis air space d24 between the third lens group G3 and the fourth lens group G4, and an on-axis air space d30 between the fourth lens group G4 and the filter FL change at magnification change and focusing. Table 35 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 35

[Variable distance data]

| | Wide-angle state | Intermediate focal-length state | Telescopic state | |
|---|---|---|---|---|
| -Focusing on an object at infinity- | | | | |
| f | 14.400 | 16.000 | 18.000 | 23.300 |
| d0 | ∞ | ∞ | ∞ | ∞ |
| d8 | 19.8415 | 14.9293 | 10.0773 | 1.6769 |
| d12 | 7.6288 | 7.1950 | 6.5331 | 5.0307 |
| d25 | 1.5037 | 1.6216 | 1.7924 | 1.9194 |
| d30 | 19.7474 | 21.9244 | 24.6266 | 32.2154 |
| -Focusing on an object at a close distance- | | | | |
| β | −0.025 | −0.025 | −0.025 | −0.025 |
| d0 | 547.1797 | 611.4703 | 691.7918 | 904.4881 |
| d8 | 20.6724 | 15.6966 | 10.7821 | 2.2646 |
| d12 | 6.7979 | 6.4278 | 5.8283 | 4.4429 |
| d25 | 1.5037 | 1.6216 | 1.7924 | 1.9194 |
| d30 | 19.7474 | 21.9244 | 24.6266 | 32.2154 |
| -Focusing on an object at the closest distance- | | | | |
| β | −0.091 | −0.099 | −0.110 | −0.142 |
| d0 | 136.0234 | 138.9653 | 141.4208 | 143.5318 |
| d8 | 22.7133 | 17.8241 | 13.0223 | 4.8109 |
| d12 | 4.7570 | 4.3002 | 3.5882 | 1.8967 |
| d25 | 1.5037 | 1.6216 | 1.7924 | 1.9194 |
| d30 | 19.7474 | 21.9244 | 24.6266 | 32.2154 |

Table 36 below shows values compliant to the condition expressions in the magnification-variable optical system ZL9. In the magnification-variable optical system ZL9, the specific negative lens is the biconcave negative lens L13, and the specific lens is each of the biconvex positive lens L35, the biconvex positive lens L37, and the biconvex positive lens L41.

TABLE 36

$\Sigma v1n = 186.20$
$\Sigma (v1n \times f1n) = -8728.096$
$STLw = 78.532$
$fL1 = -29.557$
$fL2 = -69.099$

[Values compliant to conditional expressions]

(1) $v1n = 82.57$
(2) $nL2/nL1 = 1.146$
(3) $N1n = 3$
(4) $2\omega w = 115.123°$
(5) $nL1 = 1.589$
(6) $fw \times (-f1)/Fnow = 106.270$ mm$^2$
(7) $(L1r2 + L1r1)/(L1r2 - L1r1) = -1.163$
(8) $(\Sigma v1n)/N1n = 62.067$
(9) $(\Sigma (v1n \times f1n))/(N1n \times f1) = 135.474$
(10) $Bfw/fw = 1.514$
(11) $STLw/TLw = 0.571$
(12) $(-f1)/fw = 1.491$
(13) $(-f1)/ft = 0.922$
(14) $fL1/f1 = 1.376$
(15) $fL2/f1 = 3.218$
(16) $TLw/Bfw = 6.301$
(17) $(L2r2 + L2r1)/(L2r2 - L2r1) = -3.239$
(18) $(L3r2 + L3r1)/(L3r2 - L3r1) = 0.108$
(19) $vr = 82.57$
(20) $Fnow = 2.91$
(21) $Fnot = 2.91$ As described above, the magnification-variable optical system ZL9 satisfies all Conditional Expressions (1) to (21) described above.

FIG. 18 shows a variety of aberration diagrams of the magnification-variable optical system ZL9 in the wide-angle state and the telescopic state at focusing on an object at infinity. The variety of aberration diagrams show that the magnification-variable optical system ZL9 allows favorable correction of the variety of aberrations from the wide-angle state to the telescopic state and provides excellent imaging performance.

Tenth Example

FIG. 19 shows a configuration of a magnification-variable optical system ZL10 according to the tenth example. The magnification-variable optical system ZL10 includes, sequentially from the object side, a first lens group G1 having negative refractive power and a rear group GR having positive refractive power. The rear group GR includes, sequentially from the object side, a second lens group G2 having positive refractive power, a third lens group G3 having positive refractive power, a fourth lens group G4 having positive refractive power, and a fifth lens group G5 having negative refractive power.

In the magnification-variable optical system ZL10, the first lens group G1 includes, sequentially from the object side, an aspheric negative lens L11 having an aspheric lens surface on the object side and an aspheric lens surface on the image side and shaped in a negative meniscus lens having a convex surface facing the object side, an aspheric negative lens L12 having an aspheric lens surface on the image side and shaped in a negative meniscus lens having a convex surface facing the object side, and a cemented lens formed by cementing a biconcave negative lens L13 and a biconvex positive lens L14 to each other. The second lens group G2 includes, sequentially from the object side, a biconvex positive lens L21, and a cemented lens formed by cementing a biconvex positive lens L22 and a biconcave negative lens L23 to each other. The third lens group G3 is formed of a cemented lens formed by cementing a negative meniscus lens L31 having a convex surface facing the object side and a positive meniscus lens L32 having a convex surface facing the object side to each other sequentially from the object side. The fourth lens group G4 includes, sequentially from the object side, a cemented lens formed by cementing a biconcave negative lens L41 and a biconvex positive lens L42, a biconvex positive lens L43, and a cemented lens formed by cementing a negative meniscus lens L44 having a convex surface facing the object side and a biconvex positive lens L45 to each other. The fifth lens group G5 includes, sequentially from the object side, a cemented lens formed by cementing a biconcave negative lens L51 and a biconvex positive lens L52, and an aspheric positive lens L53 having an aspheric lens surface on the image side and shaped in a positive meniscus lens having a concave surface facing the object side. A filter FL is disposed between the fifth lens group G5 and an image plane I.

In the magnification-variable optical system ZL10, at magnification change from the wide-angle state to the telescopic state, the first lens group G1 moves to the image side and the second lens group G2, the third lens group G3, the fourth lens group G4, and the fifth lens group G5 move to the object side so that the distance between the first lens group G1 and the second lens group G2 decreases, the distance between the second lens group G2 and the third lens group G3 changes, the distance between the third lens group G3 and the fourth lens group G4 decreases, the distance between the fourth lens group G4 and the fifth lens group G5 increases, and the distance (back focus) between the fifth lens group G5 and the image plane I increases. An aperture stop S is disposed between the third lens group G3 and the fourth lens group G4 and moves together with the fourth lens group G4 at magnification change.

The magnification-variable optical system ZL10 performs focusing upon from an infinite distance object to a close distance object by moving the second lens group G2 to the image side.

Table 37 below shows the values of specifications of the magnification-variable optical system ZL10.

In Table 37, the eighteenth surface corresponds to the aperture stop S, and the eighth surface, the fourteenth surface, and the thirty-second surface correspond to virtual surfaces. An auxiliary aperture may be disposed at the fourteenth surface.

In a case in which a filter is disposed on the object side in the magnification-variable optical system ZL10, the filter is disposed at a position separated by 6.10 mm on the object side from the first surface.

TABLE 37

Tenth example

[Overall specifications]

| | Wide-angle state | | Intermediate focal-length state | | Telescopic state |
|---|---|---|---|---|---|
| f = | 14.400 | to | 18.000 to 20.000 | to | 23.300 |
| FNO = | 2.91 | to | 2.91 to 2.91 | to | 2.91 |
| 2ω (°) = | 114.664 | to | 99.908 to 93.228 | to | 83.941 |
| Ymax = | 21.600 | to | 21.600 to 21.600 | to | 21.600 |
| TL (air equivalent length) = | 143.298 | to | 136.392 to134.454 | to | 133.191 |
| Bf (air equivalent length) = | 21.176 | to | 26.098 to 28.849 | to | 33.508 |

[Lens data]

| m | r | d | nd | vd |
|---|---|---|---|---|
| Object plane | ∞ | | | |
| 1* | 73.3719 | 3.2000 | 1.588870 | 61.13 |
| 2* | 14.5908 | 13.6216 | | |
| 3 | 63.8356 | 2.0000 | 1.860999 | 37.10 |
| 4* | 30.0096 | 10.9163 | | |
| 5 | −50.1332 | 2.7239 | 1.433848 | 95.23 |
| 6 | 36.7661 | 5.9645 | 1.806100 | 33.34 |
| 7 | −2583.8501 | d7 | | |
| 8 | 0.0000 | d8 | | |
| 9 | 98.9830 | 3.3713 | 1.728250 | 28.38 |
| 10 | −69.3563 | 0.2000 | | |
| 11 | 45.8254 | 4.5650 | 1.698950 | 30.13 |
| 12 | −44.1835 | 1.2000 | 1.963000 | 24.11 |
| 13 | 51.6189 | d13 | | |
| 14 | 0.0000 | 0.0000 | | |
| 15 | 22.9396 | 1.2004 | 1.834000 | 37.18 |
| 16 | 16.5758 | 5.1257 | 1.487490 | 70.32 |
| 17 | 159.7987 | d17 | | |
| 18 | 0.0000 | 3.8360 | | Aperture stop S |
| 19 | −72.2635 | 1.2000 | 1.834810 | 42.73 |
| 20 | 32.7563 | 4.3411 | 1.497820 | 82.57 |
| 21 | −55.5942 | 0.2082 | | |
| 22 | 37.2299 | 3.8685 | 1.749500 | 35.25 |
| 23 | −97.4255 | 0.9285 | | |
| 24 | 29.0556 | 1.2430 | 1.834000 | 37.18 |
| 25 | 18.1863 | 5.7887 | 1.497820 | 82.57 |
| 26 | −93.6887 | d26 | | |
| 27 | −61.0712 | 1.2008 | 1.953747 | 32.32 |
| 28 | 18.9225 | 5.7947 | 1.672700 | 32.18 |
| 29 | −118.9626 | 2.9252 | | |
| 30 | −46.6184 | 1.3000 | 1.860999 | 37.10 |
| 31* | −43.1724 | d31 | | |
| 32 | 0.0000 | 18.4181 | | |
| 33 | 0.0000 | 1.6000 | 1.516800 | 64.13 |
| 34 | 0.0000 | 1.1070 | | |
| Image plane | ∞ | | | |

[Focal length of lens groups]

| Lens group | First surface | Focal length |
|---|---|---|
| First lens group | 1 | −20.602 |
| Second lens group | 9 | 91.157 |
| Third lens group | 15 | 76.110 |
| Fourth lens group | 19 | 30.004 |
| Fifth lens group | 27 | −45.641 |

In the magnification-variable optical system ZL10, the first surface, the second surface, the fourth surface, and the thirty-first surface have aspheric lens surfaces. Table 38 below shows the surface number m and data of the aspheric surfaces, in other words, the values of the conical constant K and the aspheric coefficients A4 to A12.

TABLE 38

[Data on aspherical surface]

| | | | |
|---|---|---|---|
| First surface | K = 1.0000 | | |
| | A4 = −8.22269E−06 | A6 = 2.29849E−08 | A8 = −3.24259E−11 |
| | A10 = 2.63839E−14 | A12 = −1.1616E−17 | A14 = 2.16740E−21 |
| Second surface | K = 0.0000 | | |
| | A4 = −9.13167E−07 | A6 = −9.42128E−09 | A8 = 8.71937E−11 |
| | A10 = 1.90838E−13 | A12 = −1.19570E−15 | A14 = 1.26750E−18 |
| Fourth surface | K = 2.0000 | | |
| | A4 = 4.11958E−06 | A6 = 9.92408E−09 | A8 = 1.20069E−11 |
| | A10 = −2.46956E−13 | A12 = 1.41440E−15 | A14 = −2.30990E−18 |
| Thirty-first surface | K = 1.0000 | | |
| | A4 = 1.54778E−05 | A6 = −8.95438E−09 | A8 = 3.82731E−10 |
| | A10 = −2.13552E−12 | A12 = 4.78640E−15 | A14 = 0.00000E+00 |

In the magnification-variable optical system ZL10, the on-axis air spaces d7 and d8 between the first lens group G1 and the second lens group G2, an on-axis air space d13 between the second lens group G2 and the third lens group G3, the on-axis air space d17 between the third lens group G3 and the fourth lens group G4, an on-axis air space d26 between the fourth lens group G4 and the fifth lens group G5, and the on-axis air space d31 between the fifth lens group G5 and the filter FL change at magnification change and focusing. Table 39 below shows the values of variable distances at focal lengths in the wide-angle state, the intermediate focal-length state, and the telescopic state at each of focusing on an object at infinity, focusing on an object at a close distance, and focusing on an object at the closest distance.

TABLE 39

[Variable distance data]

| | Wide-angle state | Intermediate focal-length state | | Telescopic state |
|---|---|---|---|---|
| -Focusing on an object at infinity- | | | | |
| f | 14.400 | 18.000 | 20.000 | 23.300 |
| d0 | ∞ | ∞ | ∞ | ∞ |
| d7 | 22.3946 | 11.1020 | 6.8926 | 1.5000 |
| d8 | 0.0000 | 0.0000 | 0.0000 | 0.0000 |
| d13 | 5.3794 | 5.6650 | 5.5441 | 5.7924 |
| d17 | 4.7709 | 3.2409 | 2.6170 | 1.4986 |
| d26 | 2.8531 | 3.5619 | 3.8286 | 4.1689 |
| d31 | 0.5000 | 5.5016 | 8.0722 | 12.9278 |
| -Focusing on an object at a close distance- | | | | |
| β | −0.025 | −0.025 | −0.025 | −0.025 |
| d0 | 545.2923 | 690.1690 | 770.5760 | 903.1960 |
| d7 | 22.3946 | 11.1020 | 6.8926 | 1.5000 |
| d8 | 0.8103 | 0.7197 | 0.6824 | 0.6343 |
| d13 | 4.5692 | 4.9453 | 4.8617 | 5.1581 |
| d17 | 4.7709 | 3.2409 | 2.6170 | 1.4986 |
| d26 | 2.8531 | 3.5619 | 3.8286 | 4.1689 |
| d31 | 0.5000 | 5.5016 | 8.0722 | 12.9278 |
| -Focusing on an object at the closest distance- | | | | |
| β | −0.094 | −0.112 | −0.124 | −0.144 |
| d0 | 130.1097 | 137.0620 | 138.9961 | 140.1704 |
| d7 | 22.3946 | 11.1020 | 6.8926 | 1.5000 |
| d8 | 2.6235 | 2.9752 | 3.0674 | 3.3170 |
| d13 | 2.7248 | 2.6934 | 2.4623 | 2.5422 |
| d17 | 4.7709 | 3.2409 | 2.6170 | 1.4986 |
| d26 | 2.8531 | 3.5619 | 3.8286 | 4.1689 |
| d31 | 0.5000 | 5.5016 | 8.0722 | 12.9278 |

Table 40 below shows values compliant to the condition expressions in the magnification-variable optical system ZL10. In the magnification-variable optical system ZL10, the specific negative lens is the biconcave negative lens L13, and the specific lens is each of the biconvex positive lens L42 and the biconvex positive lens L45.

TABLE 40

Σν1n = 193.46
Σ (ν1n × f1n) = −9050.378
STLw = 86.634
fL1 = −31.560
fL2 = −67.630

[Values compliant to conditional expressions]

(1) ν1n = 95.23
(2) nL2/nL1 = 1.171
(3) N1n = 3
(4) 2ωw = 114.664°
(5) nL1 = 1.589
(6) fw × (−f1)/Fnow = 101.938 mm$^2$
(7) (L1r2 + L1r1)/(L1r2 − L1r1) = −1.496
(8) (Σν1n)/N1n = 64.487
(9) (Σ (ν1n × f1n))/(N1n × f1) = 146.446
(10) Bfw/fw = 1.471
(11) STLw/TLw = 0.605
(12) (−f1)/fw = 1.431
(13) (−f1)/ft = 0.884
(14) fL1/f1 = 1.532
(15) fL2/f1 = 3.283
(16) TLw/Bfw = 6.767
(17) (L2r2 + L2r1)/(L2r2 − L2r1) = −2.774
(18) (L3r2 + L3r1)/(L3r2 − L3r1) = −0.154
(19) νr = 82.57
(20) Fnow = 2.91
(21) Fnot = 2.91

As described above, the magnification-variable optical system ZL10 satisfies all Conditional Expressions (1) to (21) described above.

FIG. 20 shows a variety of aberration diagrams of the magnification-variable optical system ZL10 in the wide-angle state and the telescopic state at focusing on an object at infinity. The variety of aberration diagrams show that the magnification-variable optical system ZL10 allows favorable correction of the variety of aberrations from the wide-angle state to the telescopic state and provides excellent imaging performance.

REFERENCE SIGNS LIST

1 Camera (optical apparatus)

ZL (ZL1 to ZL10) Magnification-variable optical system

G1 First lens group

GR Rear group

The invention claimed is:

1. A magnification-variable optical system comprising:
a first lens group having negative refractive power; and
a rear group including at least one lens group disposed on an image side of the first lens group, wherein
a distance between lens groups adjacent to each other changes at magnification change,
the first lens group consists of, sequentially from the object side, a negative single lens, a negative single lens, a negative single lens, and a positive single lens, and
the following conditional expressions are satisfied:

$$-4.00 < (L1r2+L1r1)/(L1r2-L1r1) < -0.50$$

$$100.00° < 2\omega w$$

$$1.42 < (-f1)/fw < 2.00$$

$$1.314 \leq fL1/f1 < 2.00$$

$$0.058 \leq (L3r2+L3r1)/(L3r2-L3r1) < 0.80$$

where
L1r1: radius of curvature of a lens surface of a lens closest to an object side in the first lens group, the lens surface being on the object side,
L1r2: radius of curvature of a lens surface of the lens closest to the object side in the first lens group, the lens surface being on an image side,
2ωw: full angle of view of the magnification-variable optical system in a wide-angle state,
fw: focal length of the magnification-variable optical system in the wide-angle state,
f1: focal length of the first lens group,
fL1: focal length of the lens closest to the object side in the first lens group,
L3r1: radius of curvature of a lens surface of a lens third closest to the object side in the first lens group, the lens surface being on the object side, and
L3r2: radius of curvature of a lens surface of the lens third closest to the object side in the first lens group, the lens surface being on the image side.

2. The magnification-variable optical system according to claim 1, wherein the following conditional expression is satisfied:

$$N1n \leq 4$$

where
N1n: the number of negative lenses included in the first lens group.

3. The magnification-variable optical system according to claim 1, wherein the following conditional expression is satisfied:

$$nL1 < 1.70$$

where
nL1: refractive index of a medium of a lens closest to the object side in the first lens group at a d line.

4. The magnification-variable optical system according to claim 1, wherein the following conditional expression is satisfied:

$$1.20 < Bfw/fw < 4.00$$

where
fw: focal length of the magnification-variable optical system in the wide-angle state, and
Bfw: back focus of the magnification-variable optical system in the wide-angle state.

5. The magnification-variable optical system according to claim 1, wherein the following conditional expression is satisfied:

$$0.40 < STLw/TLW < 0.70$$

where
TLw: total length of the magnification-variable optical system in the wide-angle state, and
STLw: distance on an optical axis from a lens surface closest to the object side to an aperture stop in the magnification-variable optical system in the wide-angle state.

6. The magnification-variable optical system according to claim 1, wherein the following conditional expression is satisfied:

$$0.65 < (-f1)/ft < 1.20$$

where
ft: focal length of the magnification-variable optical system in a telephoto end state, and
f1: focal length of the first lens group.

7. The magnification-variable optical system according to claim 1, wherein the following conditional expression is satisfied:

$$1.00 < fL2/f1 < 4.00$$

where
f1: focal length of the first lens group, and
fL2: focal length of a lens second closest to the object side in the first lens group.

8. The magnification-variable optical system according to claim 1, wherein the following conditional expression is satisfied:

$$3.50 < TLw/Bfw < 8.00$$

where
Bfw: back focus of the magnification-variable optical system in the wide-angle state, and
TLw: total length of the magnification-variable optical system in the wide-angle state.

9. The magnification-variable optical system according to claim 1, wherein
the following conditional expression is satisfied:

$$-4.00 < (L2r2+L2r1)/(L2r2-L2r1) < -0.50$$

in the expression,
L2r1: radius of curvature of a lens surface of a lens second closest to the object side in the first lens group, the lens surface being on the object side, and
L2r2: radius of curvature of a lens surface of the lens second closest to the object side in the first lens group, the lens surface being on the image side.

10. The magnification-variable optical system according to claim 1, wherein the first lens group moves in an optical axis direction at magnification change.

11. The magnification-variable optical system according to claim 1, wherein part of the rear group moves to the image side upon focusing from an infinite distance object to a close distance object.

12. The magnification-variable optical system according to claim 1, wherein the rear group includes one or more aspheric surfaces.

13. The magnification-variable optical system according to claim 1, wherein the rear group includes one or more lenses that satisfy the following conditional expression:

$$66.50 < vr$$

where
- vr: Abbe number of a medium of the respective lens included in the rear group at a d line.

14. The magnification-variable optical system according to claim 1, wherein the rear group has positive refractive power.

15. The magnification-variable optical system according to claim 1, wherein the following conditional expression is satisfied:

$$F\text{now}<4.20$$

where
- Fnow: maximum aperture of the magnification-variable optical system in a state of focusing at infinity in the wide-angle state.

16. The magnification-variable optical system according to claim 1, wherein the following conditional expression is satisfied:

$$F\text{not}<6.00$$

where
- Fnot: maximum aperture of the magnification-variable optical system in a state of focusing at infinity in a telephoto end state.

17. The magnification-variable optical system according to claim 1, further comprising a filter on the object side of the first lens group.

18. An optical apparatus comprising the magnification-variable optical system according to claim 1.

19. A method for manufacturing a magnification-variable optical system including a first lens group and a rear group, the first lens group having negative refractive power, the rear group including at least one lens group disposed on an image side of the first lens group, the method for manufacturing the magnification-variable optical system comprising:
- disposing the lens groups so that a distance between lens groups adjacent to each other changes at magnification change; and
- disposing the first lens group so that the first lens group consists of, sequentially from the object side, a negative single lens, a negative single lens, a negative single lens, and a positive single lens;
- the method further comprising:
- satisfying the following conditional expressions:

$$-4.00<(L1r2+L1r1)/(L1r2-L1r1)<-0.50$$

$$100.00°<2\omega w$$

$$1.42<(-f1)/fw<2.00$$

$$1.314 \leq fL1/f1 < 2.00$$

$$0.058 \leq (L3r2+L3r1)/(L3r2-L3r1)<0.80$$

where
- L1r1: radius of curvature of a lens surface of a lens closest to an object side in the first lens group, the lens surface being on the object side,
- L1r2: radius of curvature of a lens surface of the lens closest to the object side in the first lens group, the lens surface being on an image side,
- 2ωw: full angle of view of the magnification-variable optical system in a wide-angle state,
- fw: focal length of the magnification-variable optical system in the wide-angle state,
- f1: focal length of the first lens group,
- fL1: focal length of the lens closest to the object side in the first lens group,
- L3r1: radius of curvature of a lens surface of a lens third closest to the object side in the first lens group, the lens surface being on the object side, and
- L3r2: radius of curvature of a lens surface of the lens third closest to the object side in the first lens group, the lens surface being on the image side.

20. A magnification-variable optical system comprising:
- a first lens group having negative refractive power; and
- a rear group including at least one lens group disposed on an image side of the first lens group, wherein
- a distance between lens groups adjacent to each other changes at magnification change,
- the first lens group consists of, sequentially from the object side, a negative single lens, a negative single lens, a negative single lens, and a positive single lens, and
- the following conditional expressions are satisfied:

$$-4.00<(L1r2+L1r1)/(L1r2-L1r1)<-0.50$$

$$100.00°<2\omega w$$

$$1.42<(-f1)/fw<2.00$$

$$1.314 \leq fL1/f1 < 2.00$$

where
- L1r1: radius of curvature of a lens surface of a lens closest to an object side in the first lens group, the lens surface being on the object side,
- L1r2: radius of curvature of a lens surface of the lens closest to the object side in the first lens group, the lens surface being on an image side,
- 2ωw: full angle of view of the magnification-variable optical system in a wide-angle state,
- fw: focal length of the magnification-variable optical system in the wide-angle state,
- f1: focal length of the first lens group, and
- fL1: focal length of the lens closest to the object side in the first lens group.

* * * * *